(12) United States Patent
Ive et al.

(10) Patent No.: US 10,564,842 B2
(45) Date of Patent: Feb. 18, 2020

(54) ACCESSING SYSTEM USER INTERFACES ON AN ELECTRONIC DEVICE

(71) Applicant: Apple Inc., Cupertino, CA (US)

(72) Inventors: Jonathan P. Ive, San Jose, CA (US); Ari Y. Benbasat, San Jose, CA (US); Daniel Max Strongwater, San Francisco, CA (US); Marco Triverio, San Francisco, CA (US); Matthew Sundstrom, Campbell, CA (US); Todd J. Littlejohn, Sunnyvale, CA (US); Taylor G. Carrigan, San Francisco, CA (US); Kevin Tyler McAtee, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/146,594

(22) Filed: Sep. 28, 2018

(65) Prior Publication Data

US 2019/0369861 A1 Dec. 5, 2019

Related U.S. Application Data

(60) Provisional application No. 62/679,503, filed on Jun. 1, 2018.

(51) Int. Cl.
*G06F 3/0488* (2013.01)
*G06F 3/0481* (2013.01)
*G06F 21/84* (2013.01)

(52) U.S. Cl.
CPC ...... *G06F 3/04883* (2013.01); *G06F 3/04817* (2013.01); *G06F 21/84* (2013.01);
(Continued)

(58) Field of Classification Search
CPC ............ G06F 3/04883; G06F 3/04817; G06F 2203/04808
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |

(Continued)

FOREIGN PATENT DOCUMENTS

| | | |
|---|---|---|
| CN | 107908355 A | 4/2018 |
| JP | 2000-163031 A | 6/2000 |
| JP | 2002-342033 A | 11/2002 |

OTHER PUBLICATIONS

Denmark Search Report dated Aug. 31, 2018, for DK Patent Application No. PA201870332, four pages.
(Continued)

*Primary Examiner* — Phenuel S Salomon
(74) *Attorney, Agent, or Firm* — Kubota & Basol LLP

(57) ABSTRACT

In some embodiments, an electronic device in communication with a display and a touch-sensitive surface displays a user interface, and while displaying the user interface, the electronic device receives touch input comprising a contact detected on the touch-sensitive surface. In some embodiments, in response to receiving the touch input, and in accordance with a determination that the touch input satisfies first criteria, wherein the first criteria include a requirement that the contact continues to be detected in a predefined region of the touch-sensitive surface for longer than a time threshold, the electronic device displays a first indication that further input of a first type detected at the touch sensitive surface will cause the device to display a first system user interface. In some embodiments, in accordance with a determination that the touch input does not satisfy the
(Continued)

first criteria, the electronic device forgoes displaying the first indication.

69 Claims, 72 Drawing Sheets

(52) U.S. Cl.
CPC .............. *G06F 2203/04808* (2013.01); *G06F 2221/2149* (2013.01)

(56) References Cited

U.S. PATENT DOCUMENTS

| | | | |
|---|---|---|---|
| 5,825,352 A | 10/1998 | Bisset et al. | |
| 5,825,675 A * | 10/1998 | Want ................... | G06F 1/1626 708/142 |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 2002/0118175 A1* | 8/2002 | Liebenow ............. | G06F 1/1626 345/168 |
| 2005/0012723 A1* | 1/2005 | Pallakoff ............... | G06F 1/1616 345/173 |
| 2005/0272462 A1* | 12/2005 | Okamoto .............. | G06F 1/3203 455/550.1 |
| 2006/0197753 A1 | 9/2006 | Hotelling | |
| 2007/0220444 A1 | 9/2007 | Sunday et al. | |
| 2010/0037135 A1 | 2/2010 | Iwase et al. | |
| 2011/0003621 A1* | 1/2011 | Atsumi ............. | H04W 52/0254 455/566 |
| 2011/0209093 A1 | 8/2011 | Hinckley et al. | |
| 2014/0007008 A1 | 1/2014 | Baca et al. | |
| 2014/0078086 A1* | 3/2014 | Bledsoe .................. | G06F 3/041 345/173 |
| 2015/0067596 A1* | 3/2015 | Brown .................. | G06F 3/0416 715/808 |
| 2015/0067601 A1* | 3/2015 | Bernstein ............. | G06F 3/0488 715/823 |
| 2015/0082162 A1* | 3/2015 | Cho ........................ | G06F 3/016 715/702 |
| 2015/0160729 A1* | 6/2015 | Nakagawa ............. | G06F 3/016 345/173 |
| 2015/0379476 A1* | 12/2015 | Chaudhri .............. | G06F 3/0362 705/7.18 |
| 2016/0018872 A1* | 1/2016 | Tu ......................... | G06F 1/3234 345/173 |
| 2016/0062598 A1* | 3/2016 | Kocienda ............ | G06F 3/04817 715/765 |
| 2016/0134737 A1* | 5/2016 | Pulletikurty .......... | G06F 3/0227 715/735 |
| 2016/0162112 A1* | 6/2016 | Lee ....................... | G06F 1/1652 345/173 |
| 2016/0259413 A1* | 9/2016 | Anzures ................ | G06F 3/0482 |
| 2016/0259499 A1 | 9/2016 | Kocienda et al. | |
| 2017/0046024 A1* | 2/2017 | Dascola ............ | H04M 1/72522 |
| 2018/0046369 A1 | 2/2018 | Takano et al. | |
| 2018/0088797 A1 | 3/2018 | McAtee et al. | |
| 2018/0329605 A1* | 11/2018 | Venkateswararao ......................... | G06F 3/04842 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Anonymous, "You Can't Swipe to Close Apps in the App Switcher," Retrieved from the Internet: URL:https://forums.macrumors.com/threads/you-cant-swipe-to-close-apps-in-the-app-switcher.2083011/, Nov. 1, 2017, pp. 2-7.
Moto X Style: "Moto X Pure Edition—androphone," Retrieved from the Internet: URL:https://androphone.ru/wp-content/uploads/2015/07/Motorola-Moto-X-Pure-Editionpdf, Jul. 31, 2015, pp. 13, 16, 15.
Marziah Karch Karch: "Flow to Use the Quick Settings Menu on Android," Retrieved from the Internet: URL:https://web.archive.org/web/20170711024525/https://www.lifewire.com/quick-settings-menu-android-4121299, Jan. 6, 2017, pp. 1-5.
International Search Report and Written Opinion dated Jan. 17, 2019 for International Application No. PCT/US2019/034987, 12 pages.

* cited by examiner

ACCESSING SYSTEM USER INTERFACES ON AN ELECTRONIC DEVICE

CROSS REFERENCE TO RELATED APPLICATIONS

This application claims the benefit under 35 USC 119(e) of U.S. Provisional Patent Application No. 62/679,503, filed Jun. 1, 2018 and the contents of which are incorporated herein by reference in their entirety for all purposes.

FIELD OF THE DISCLOSURE

This relates generally to electronic devices that allow access to system user interfaces, and user interactions with such devices.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, system controls or notifications are accessible through user interfaces on such a device, and user interaction with such a device entails accessing such user interfaces. Enhancing these interactions improves the user's experience with the device and decreases user interaction time, which is particularly important where input devices are battery-operated.

SUMMARY OF THE DISCLOSURE

Some embodiments described in this disclosure are directed to one or more electronic devices that provide access to a system user interface (e.g., for controlling device functions and/or viewing or interacting with notifications) in response to touch inputs received in an application user interface or a wake screen user interface, and one or more operations related to the above that the electronic devices optionally perform. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Description of Embodiments

Figure 1A:
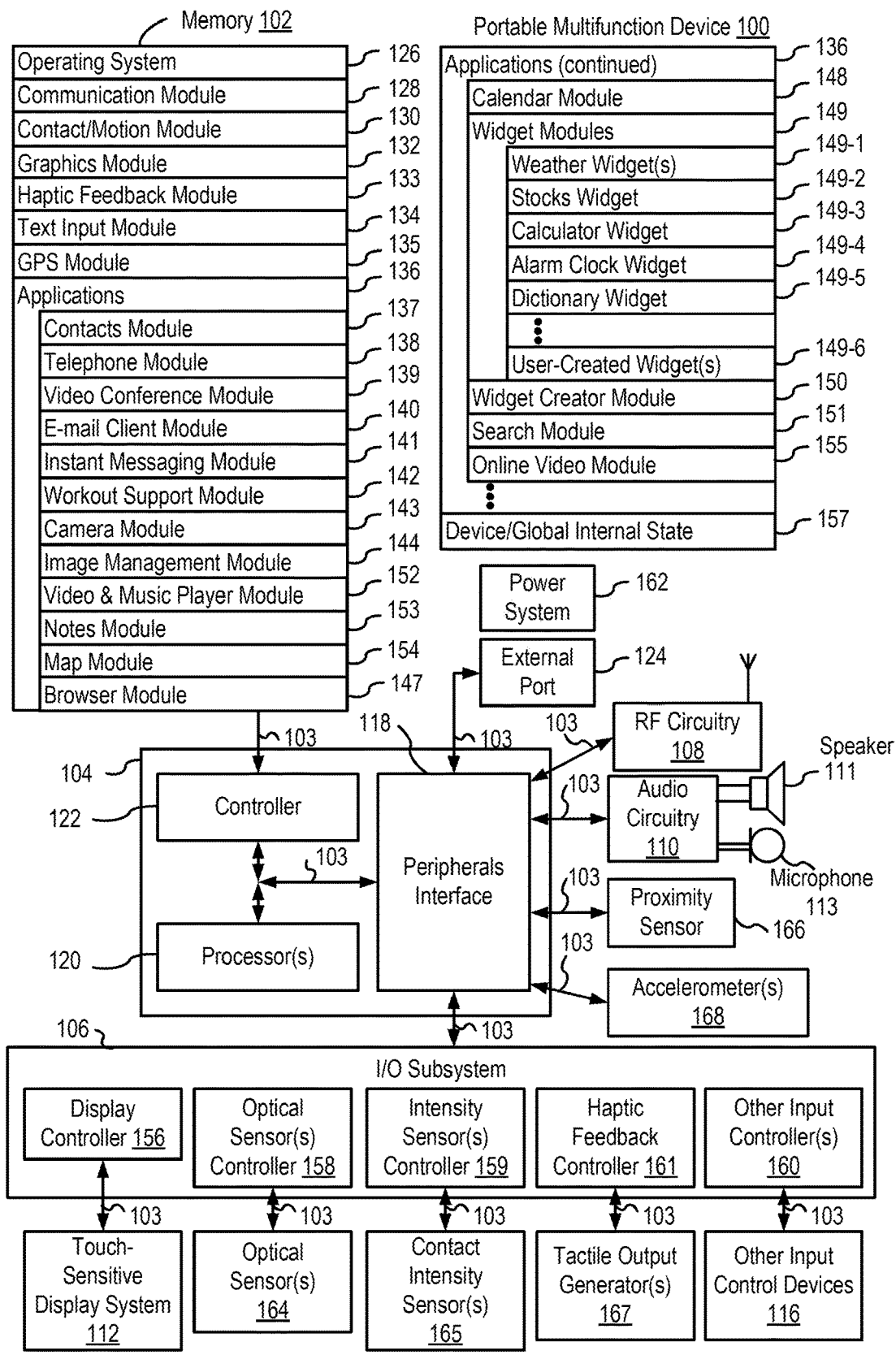
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for accessing a system user interface (e.g., for controlling device functions and/or viewing or interacting with notifications) in response to touch inputs received in an application user interface or a wake screen user interface. Such techniques can reduce the amount of time needed by a user to perform operations, thereby enhancing productivity and reducing the power usage of the device and increasing battery life for battery-powered devices.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
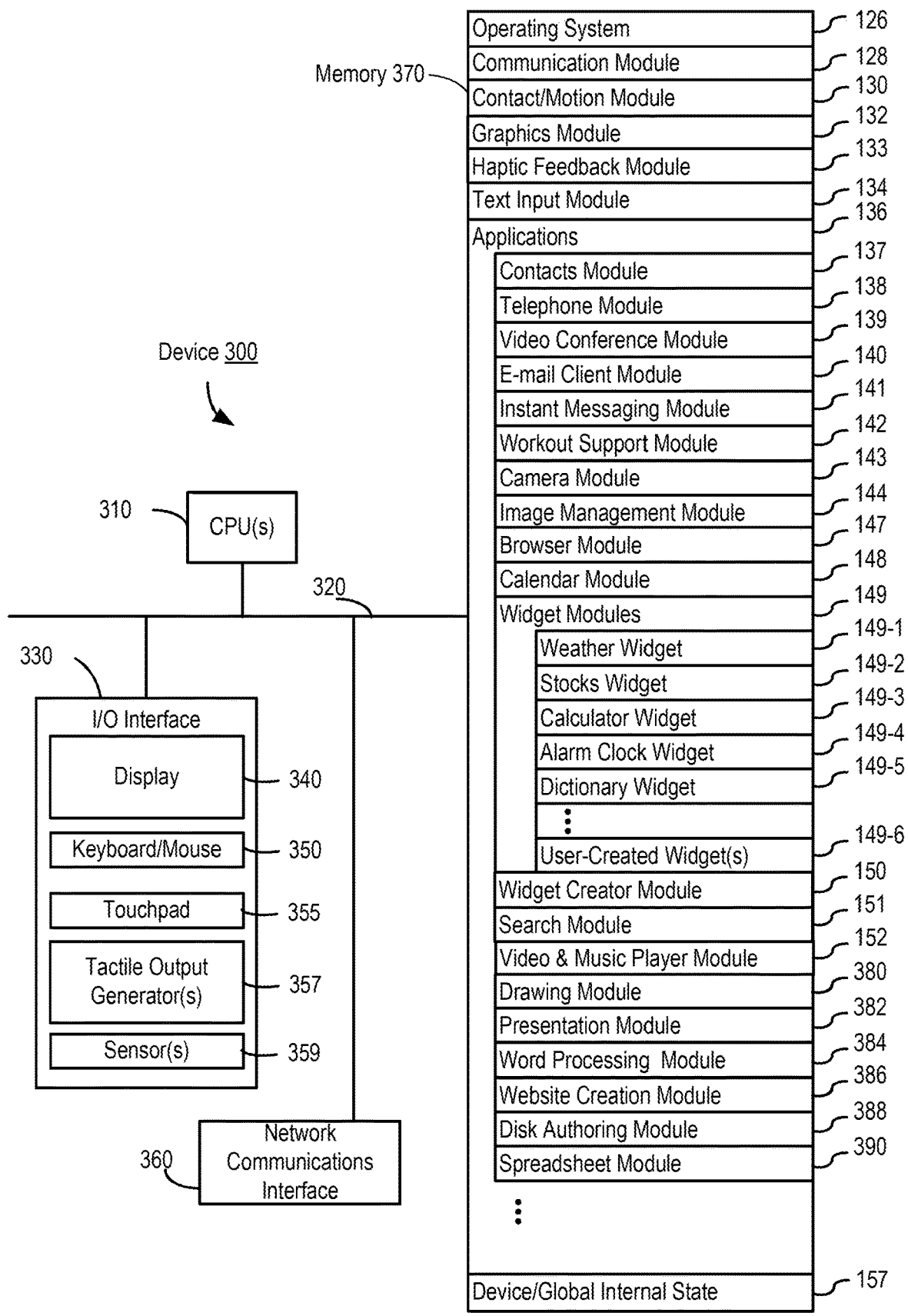
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
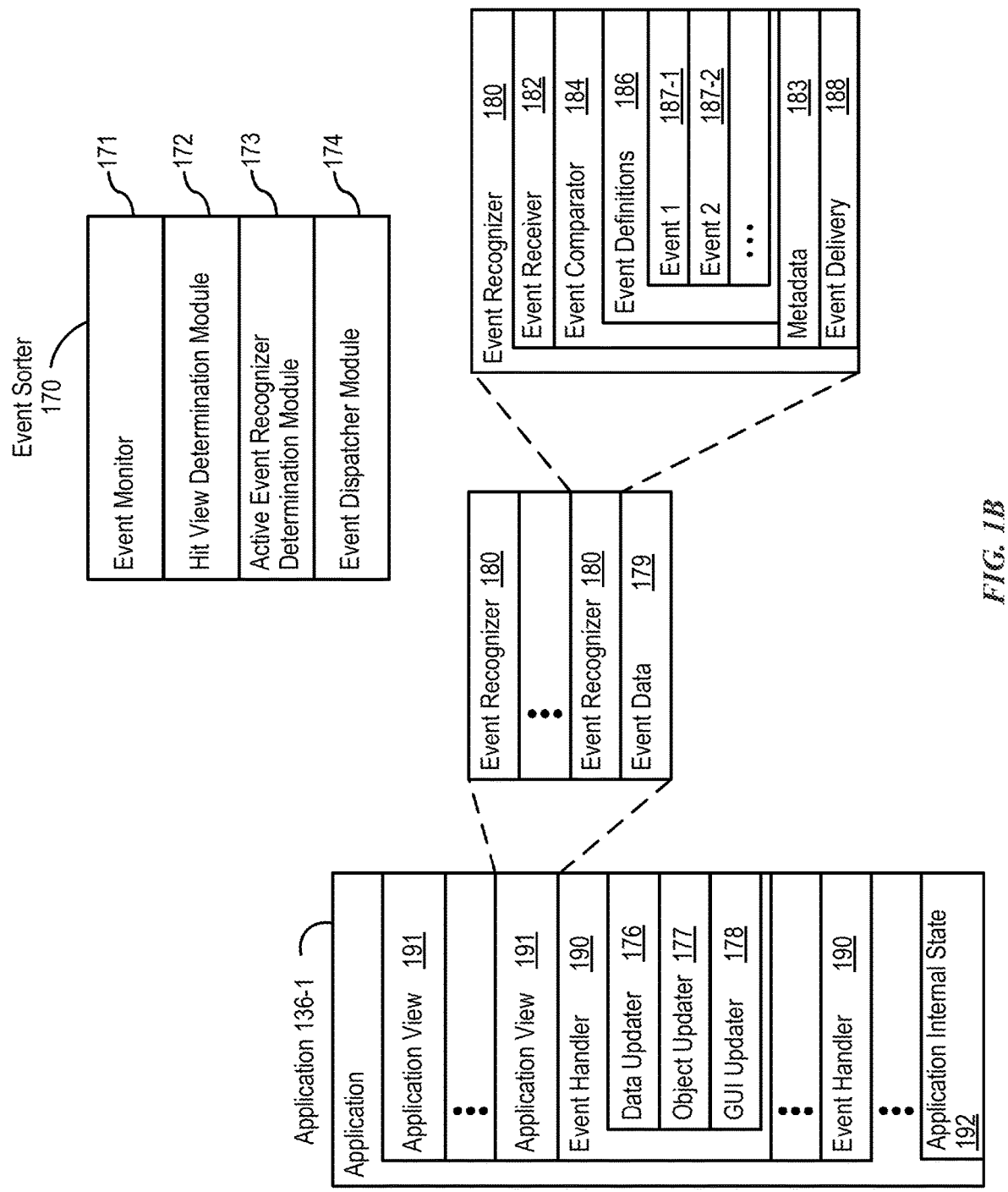
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
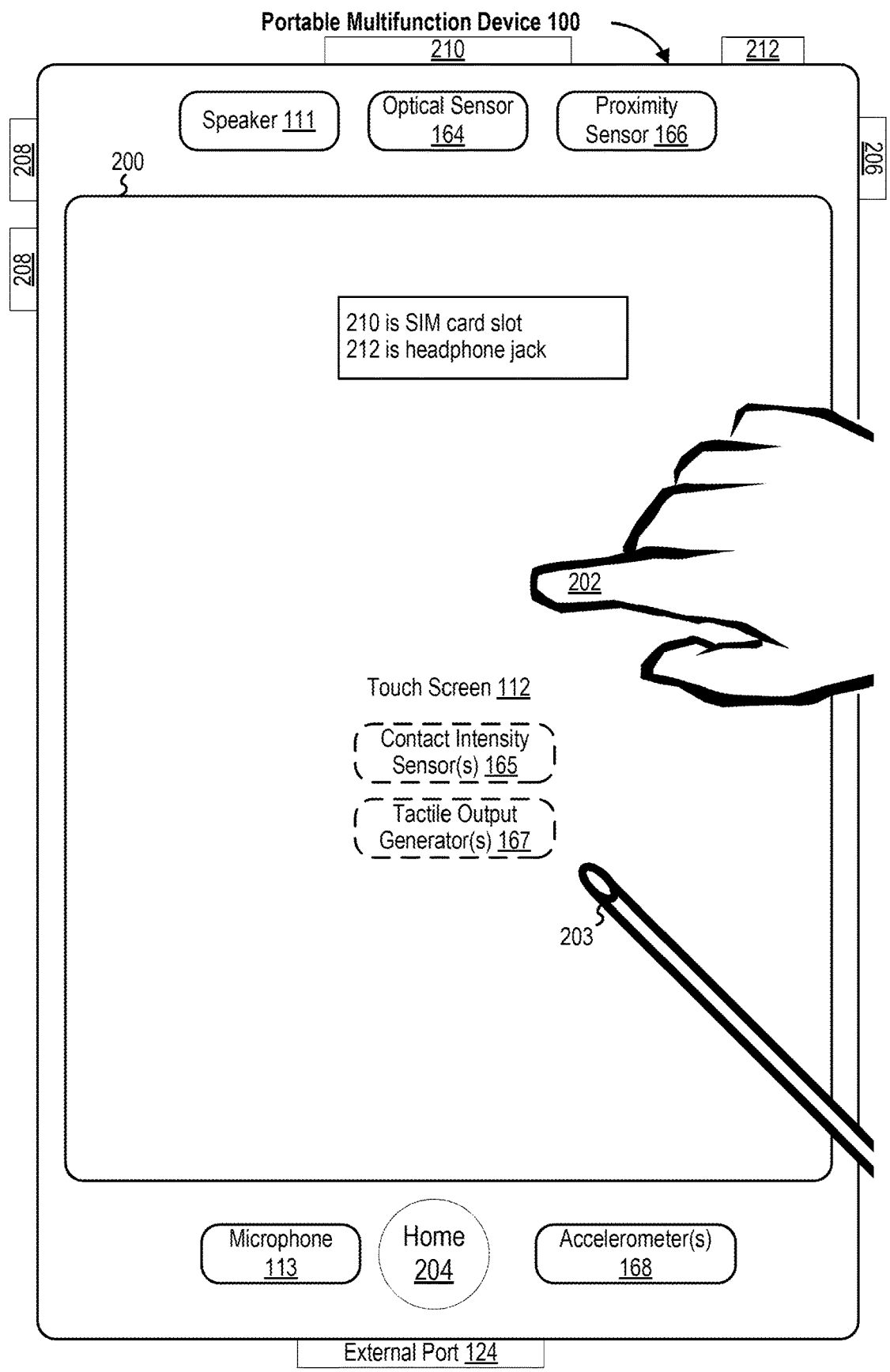
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
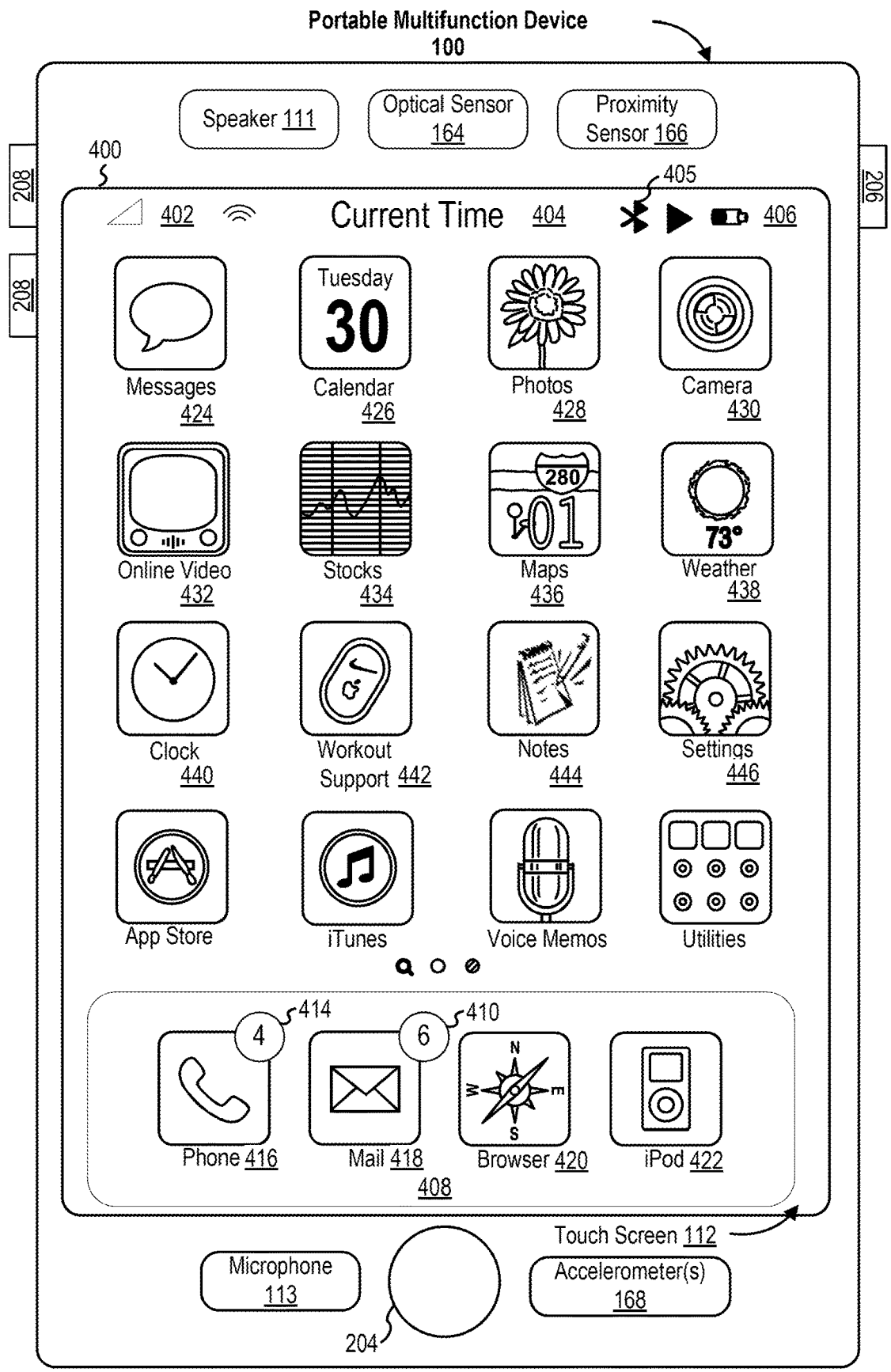
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
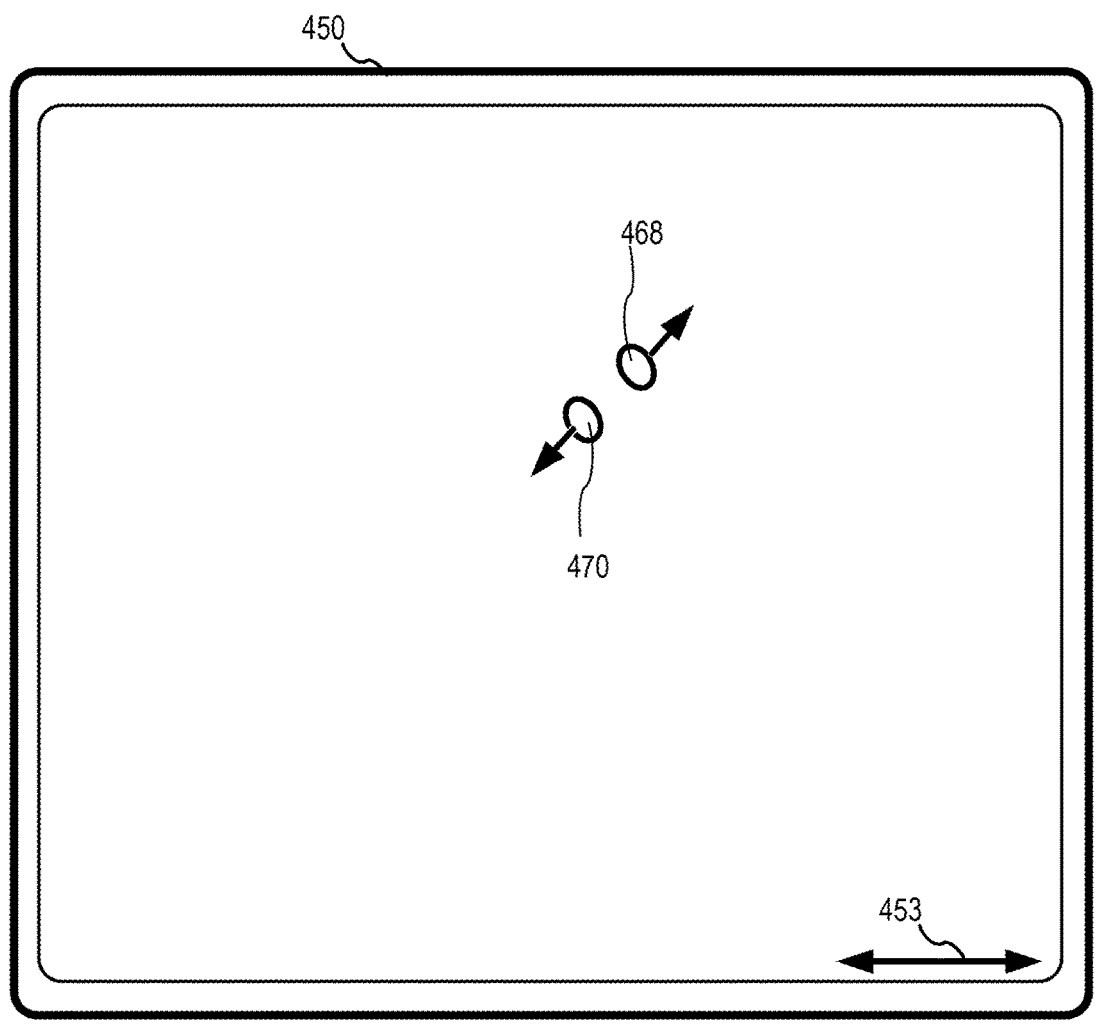
FIG. 4B illustrates an exemplary user interface for a multifunction device with a touch-sensitive surface that is separate from the display in accordance with some embodiments.
Figure 4B:
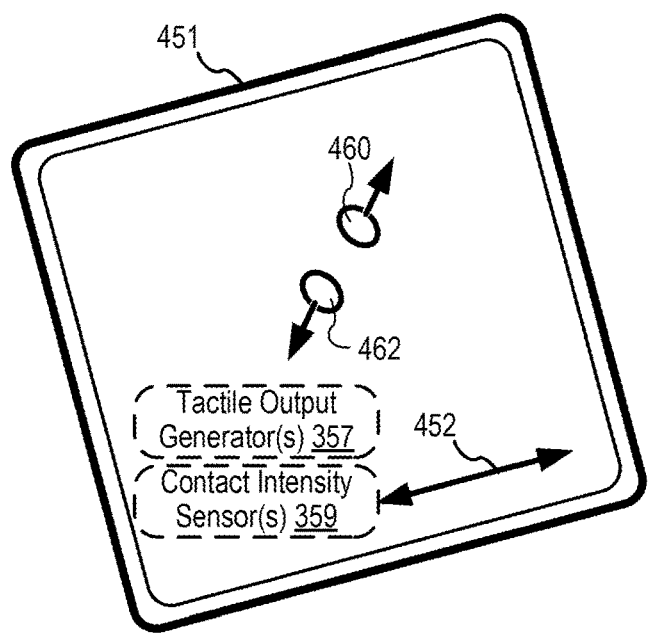

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
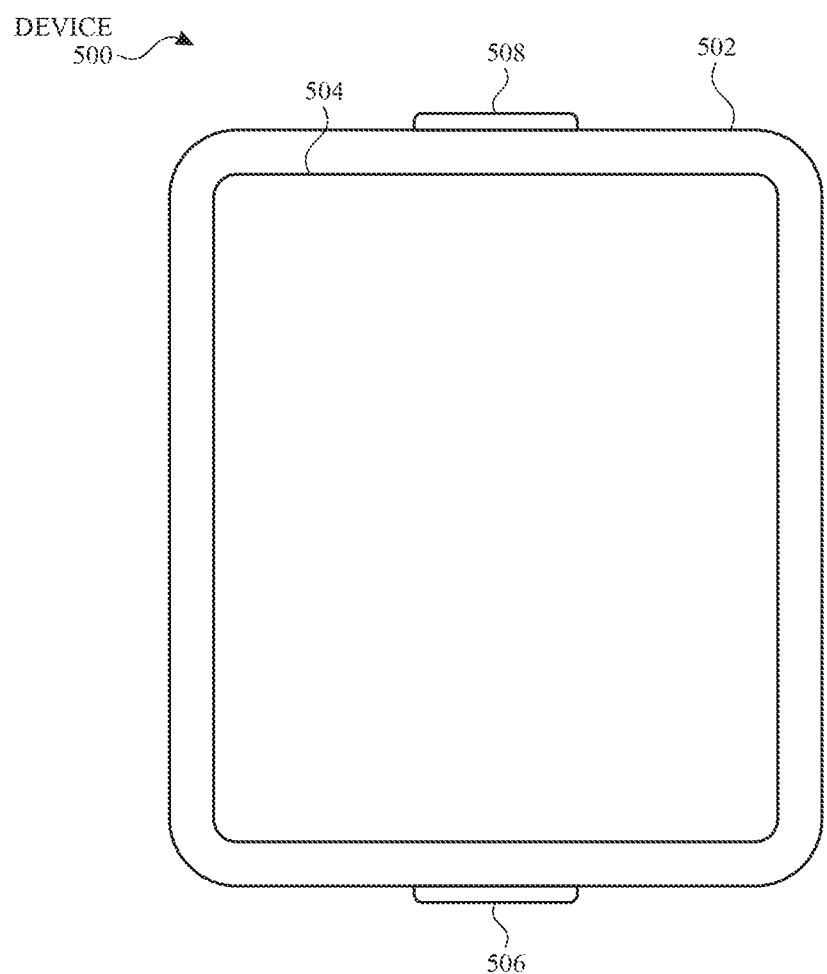
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications:

International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
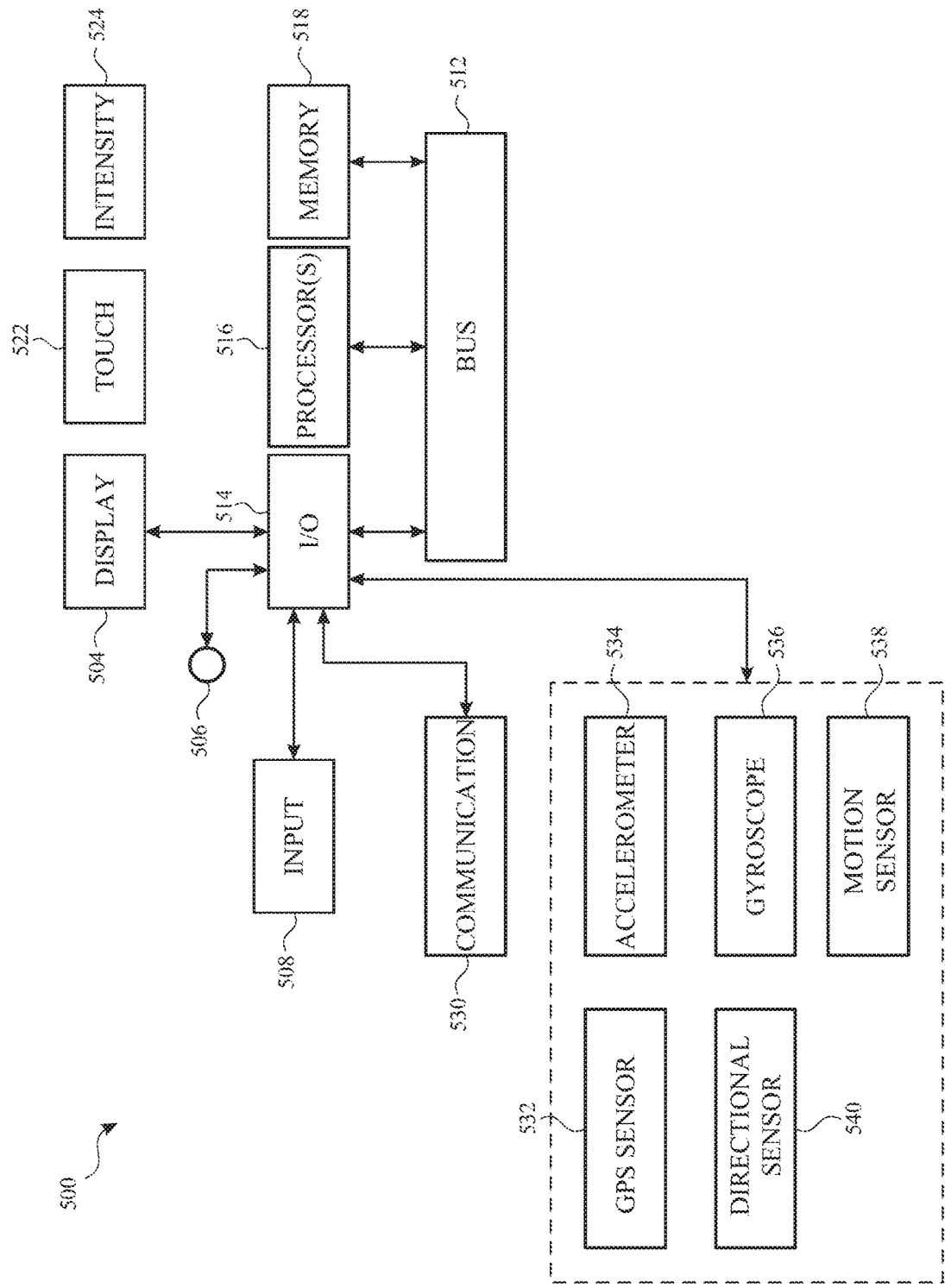
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
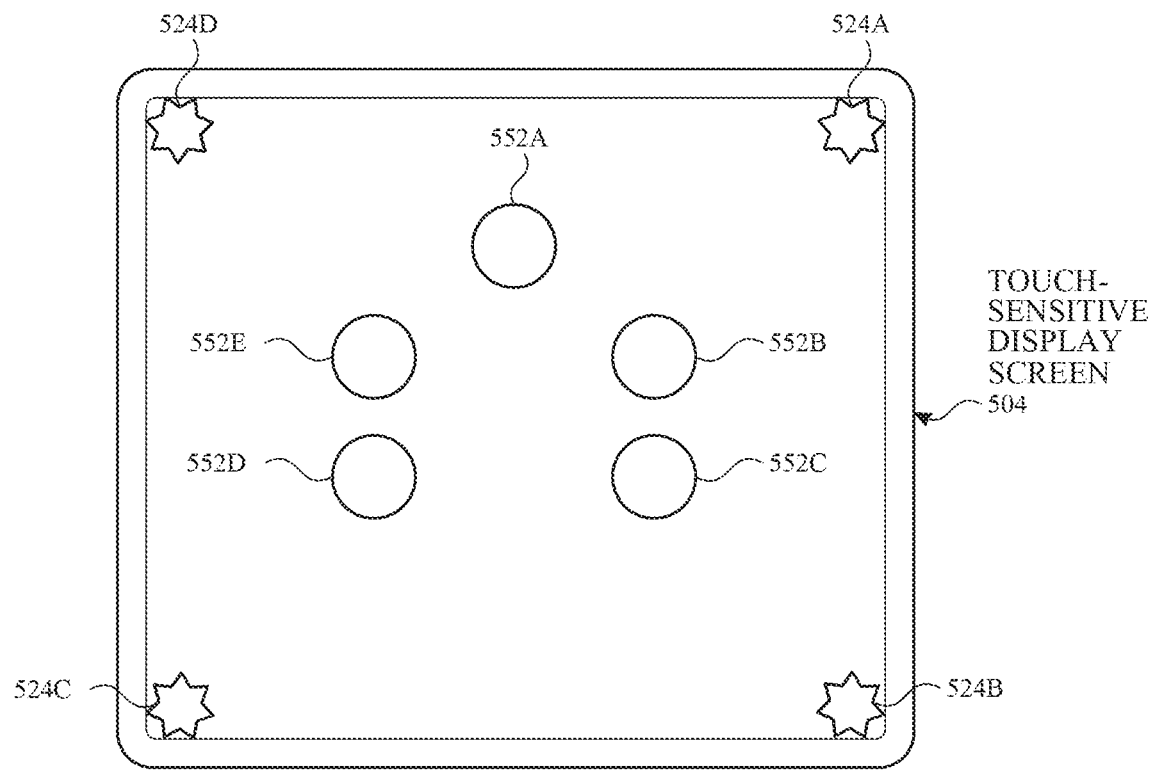
FIGS. 5C-5D illustrate exemplary components of a personal electronic device having a touch-sensitive display and intensity sensors in accordance with some embodiments.
Figure 5C:
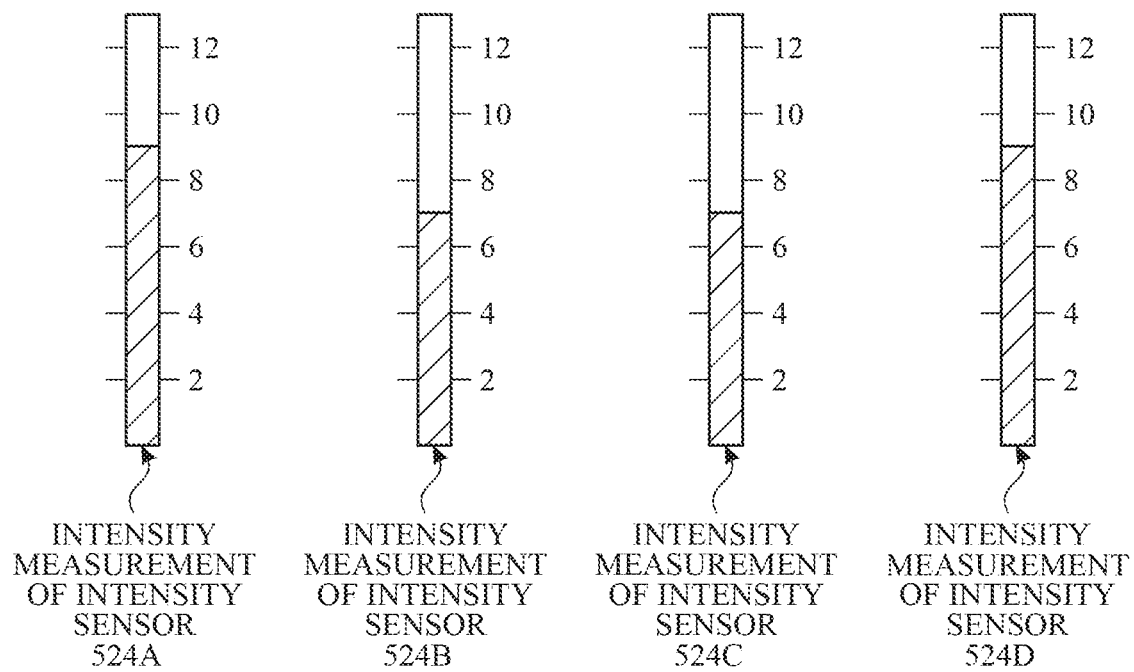
Figure 5D:
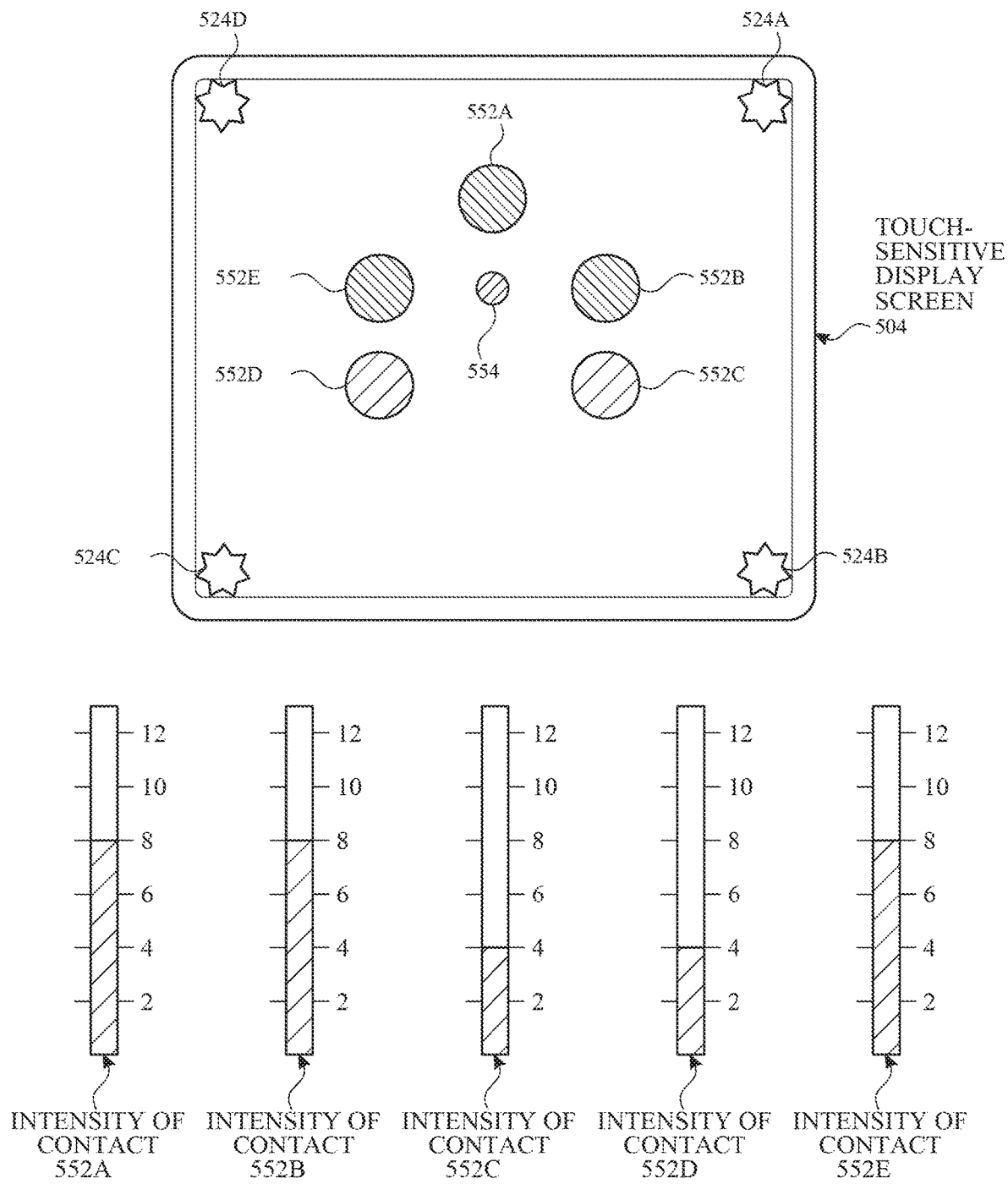

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
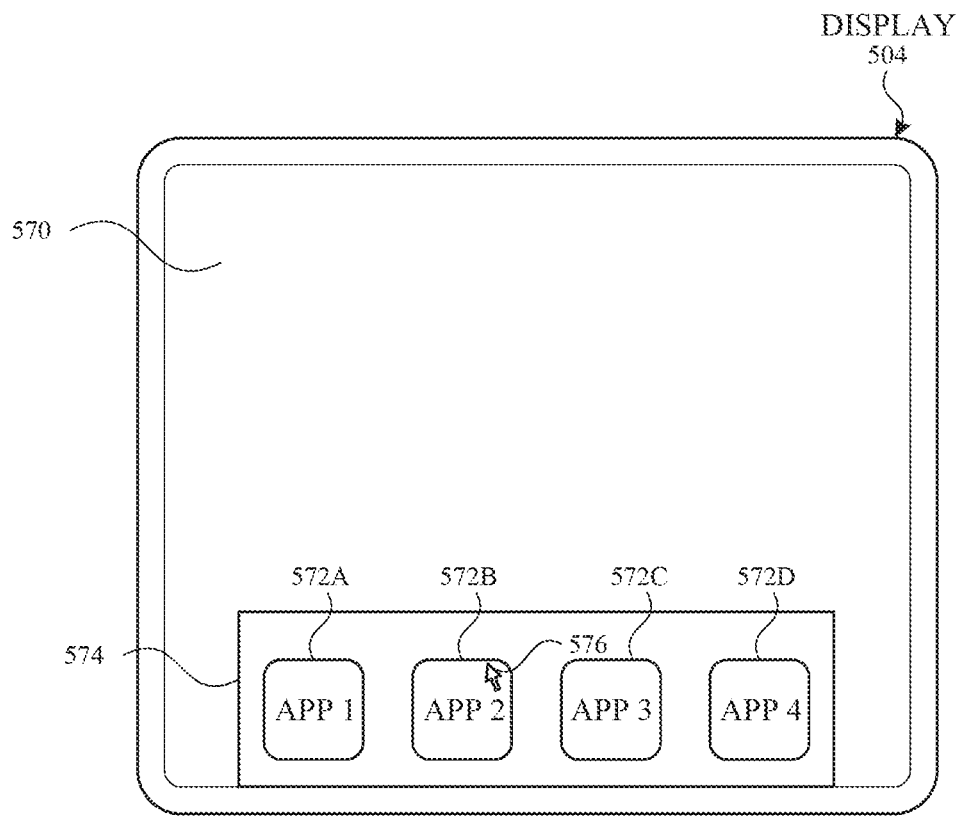
FIGS. 5E-5H illustrate exemplary components and user interfaces of a personal electronic device in accordance with some embodiments.
Figure 5E:
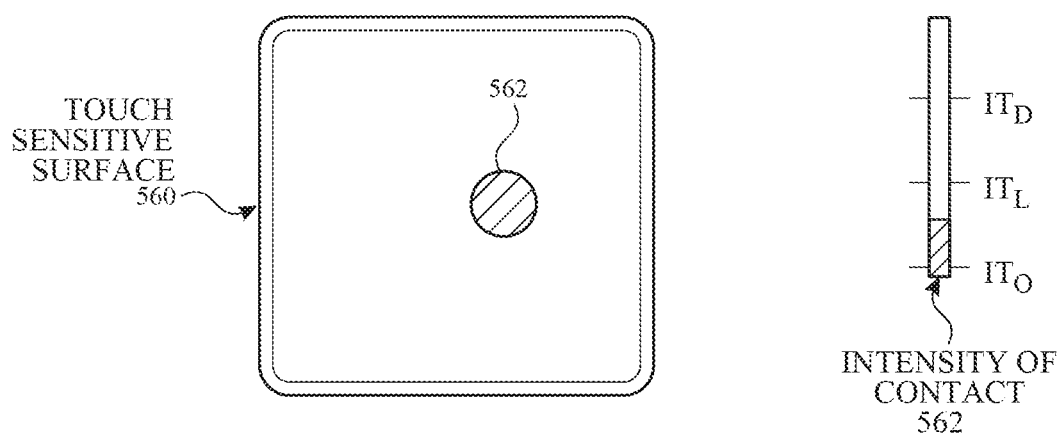
Figure 5F:
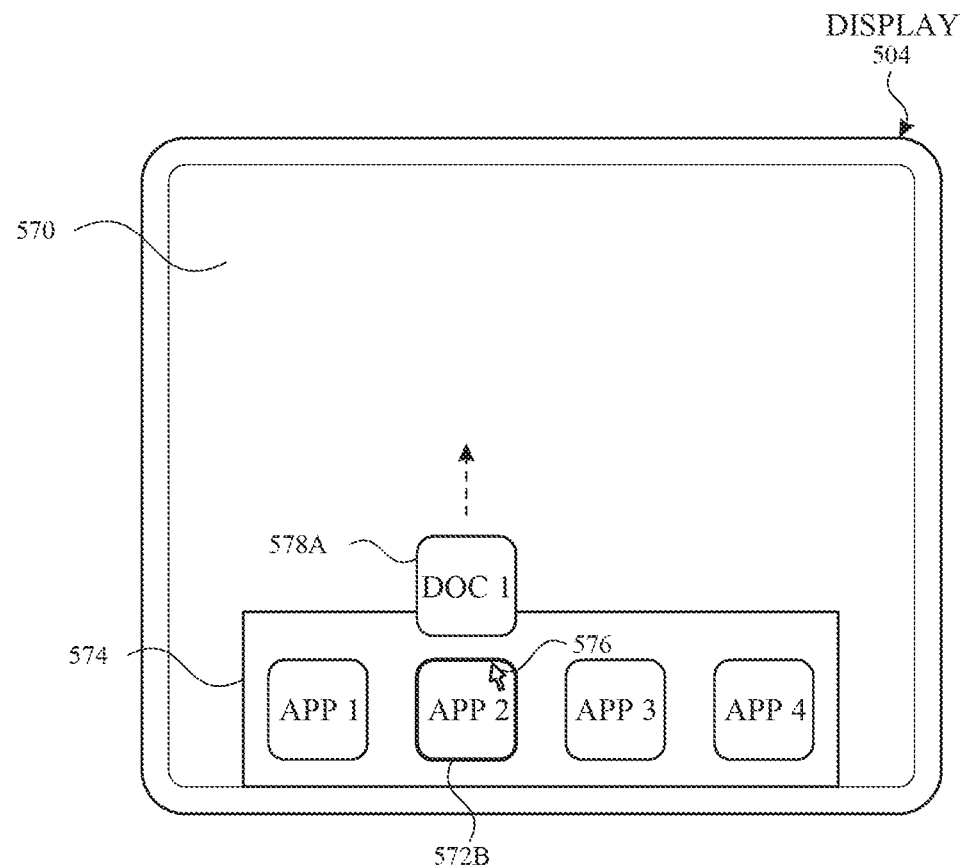
Figure 5F:
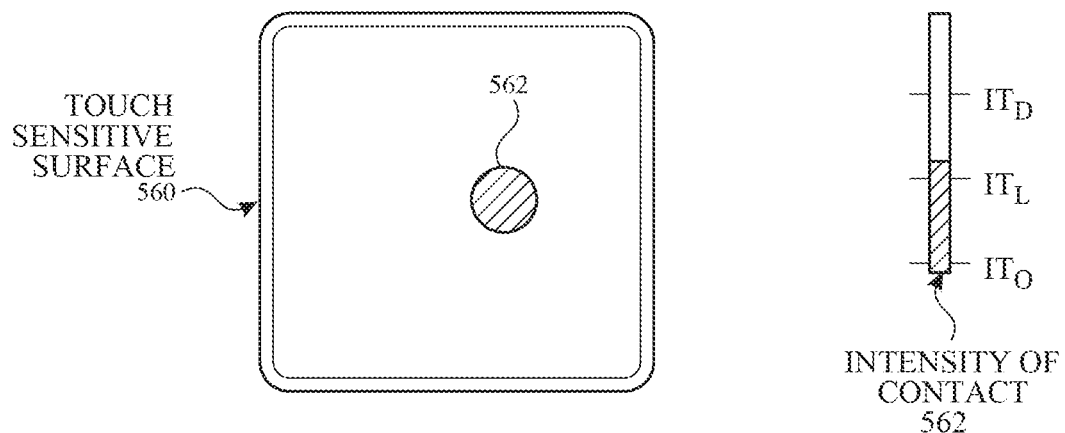
Figure 5G:
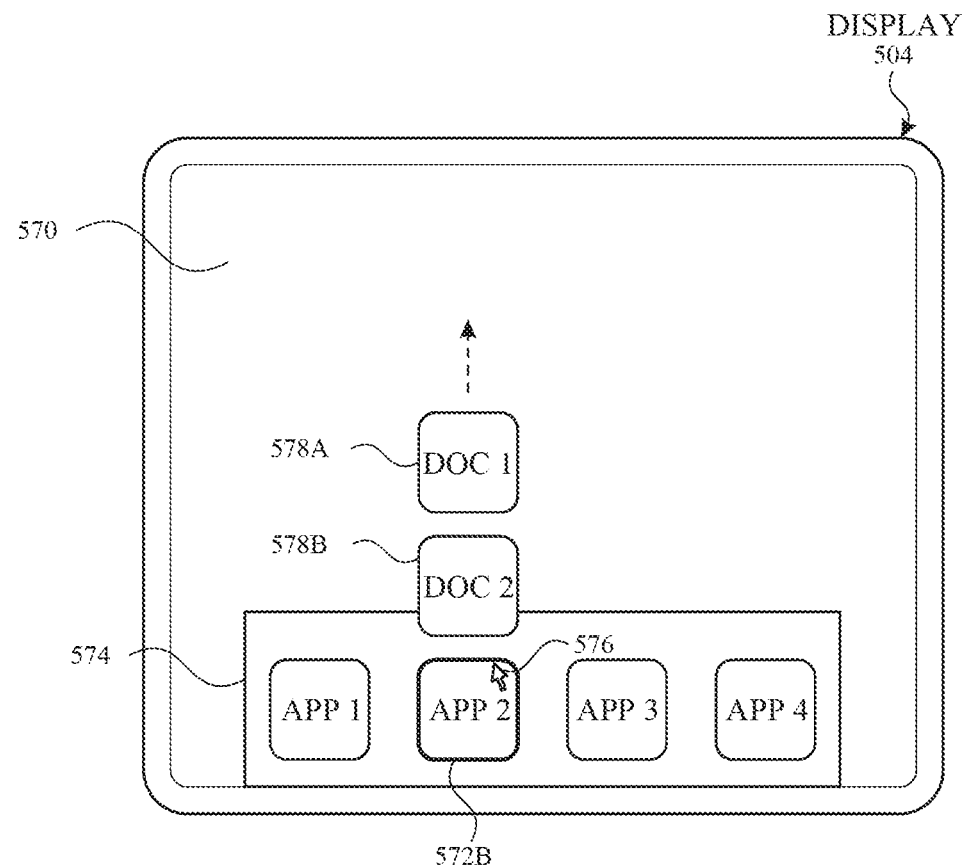
Figure 5G:
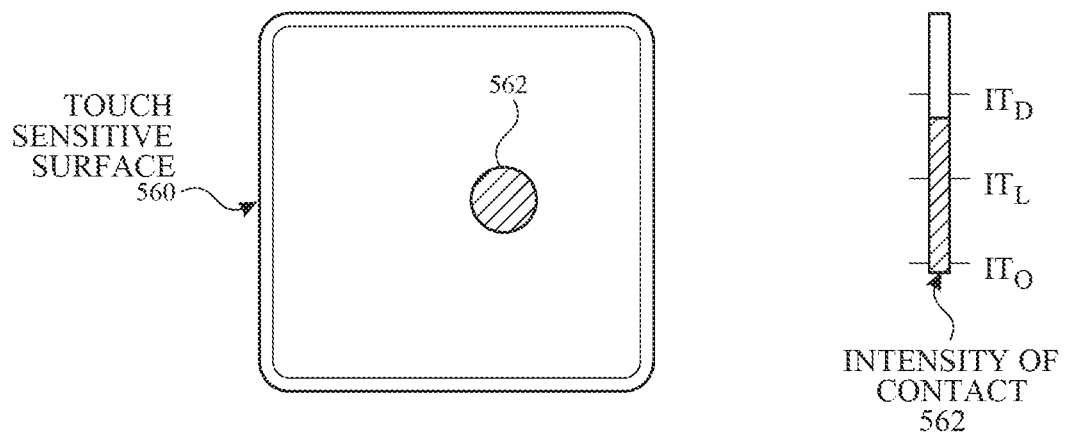
Figure 5H:
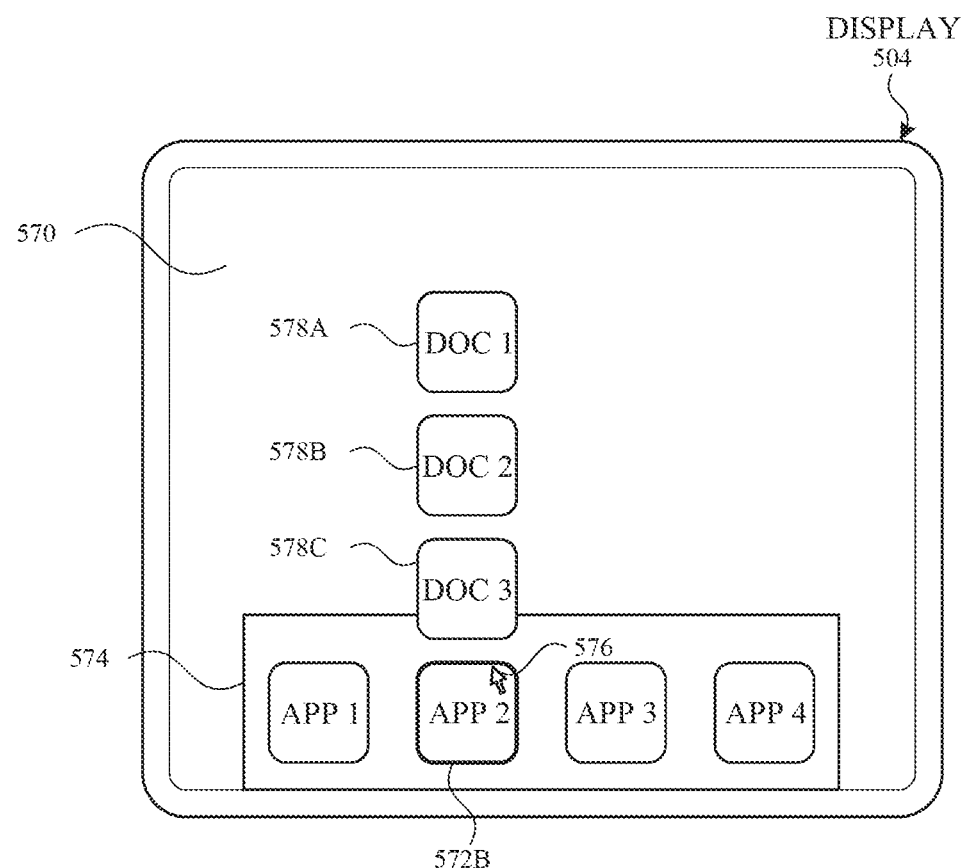
Figure 5H:
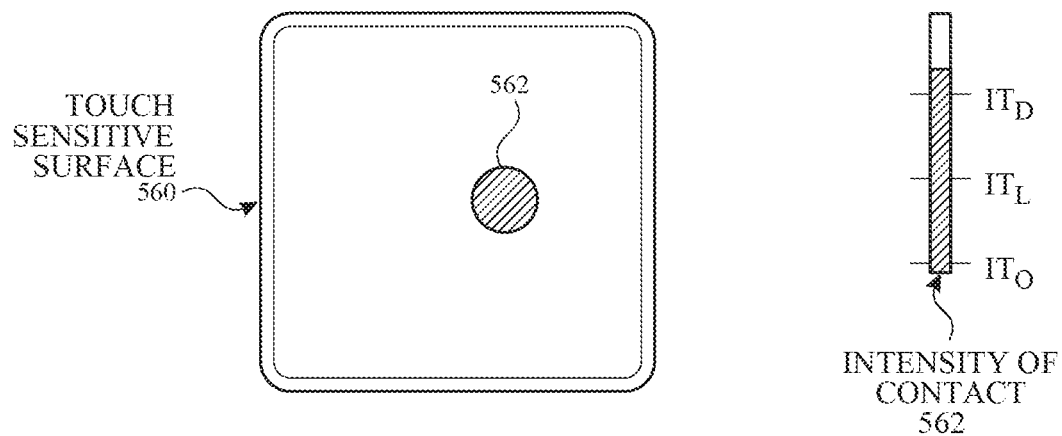

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Accessing System User Interfaces from Application or Wake Screen User Interfaces Users interact with electronic devices in many different manners, including interacting with wake screen user interfaces of the devices (e.g., the first user interface displayed on the devices when the devices exit from a sleep or idle state, such as a watch face user interface on a smart watch) and application user interfaces for applications that may be available on the electronic devices. For example, a user provides various types of touch inputs to application user interfaces displayed on a display of an electronic device. However, in some circumstances, the user wishes to quickly and expediently control various system functions and/or access various system and application notifications using various touch inputs, but cannot do so without first exiting a displayed application user interface and navigating to a different user interface from which such controls and/or notifications are accessible. The embodiments described below provide ways in which an electronic device provides access to a system user interface (e.g., for controlling device functions and/or viewing or interacting with notifications) in response to touch inputs received in an application user interface or a wake screen user interface, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
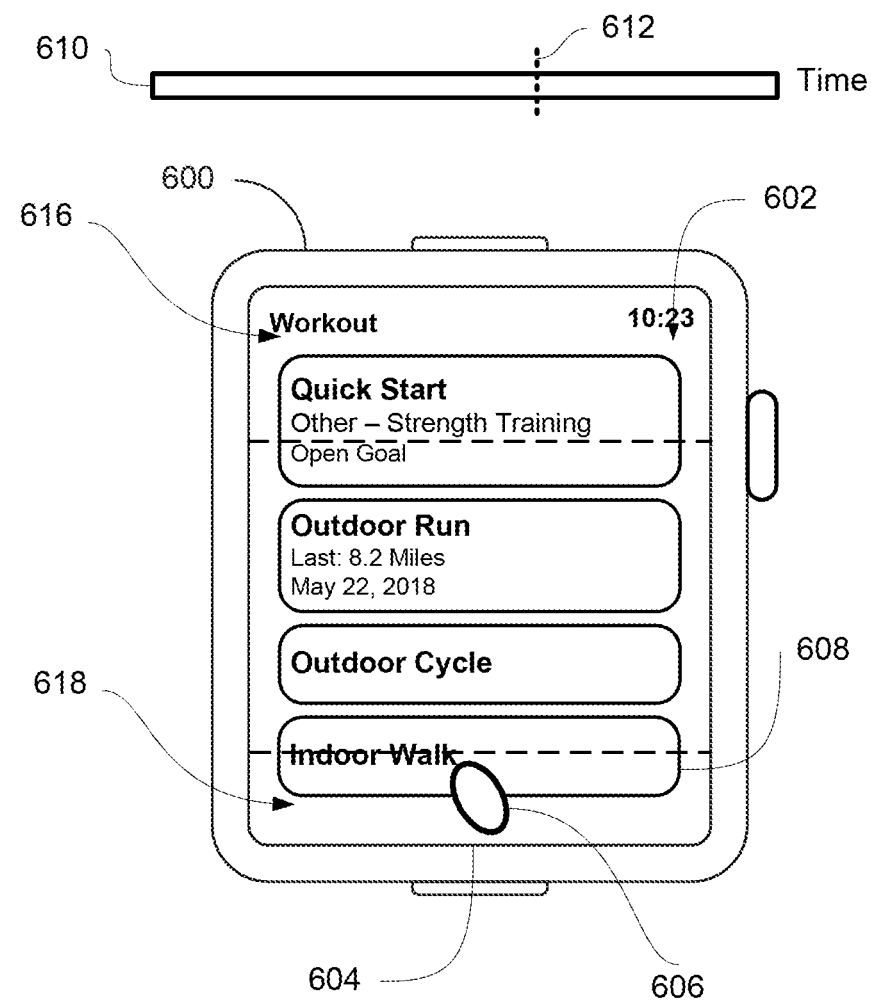
FIGS. 6A-6XX illustrate exemplary ways in which an electronic device provides access to a system user interface in response to touch inputs received in an application user interface or a wake screen user interface, in accordance with some embodiments of the disclosure.
Figure 6B:
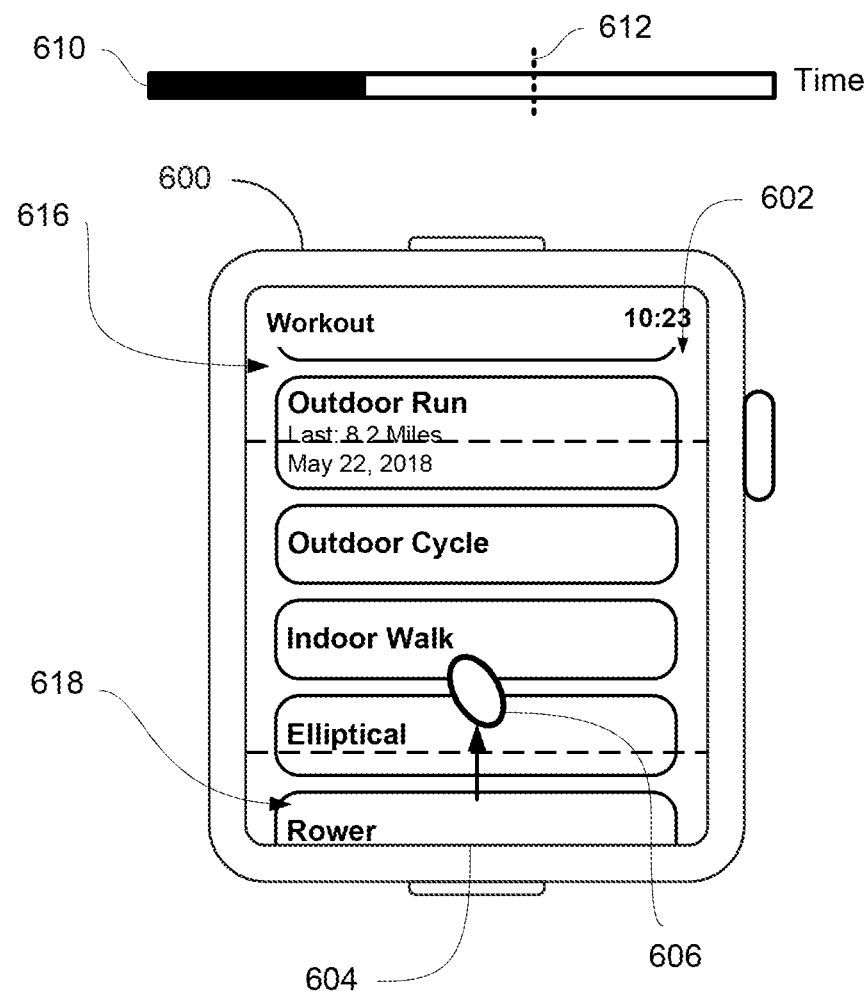
Figure 6C:
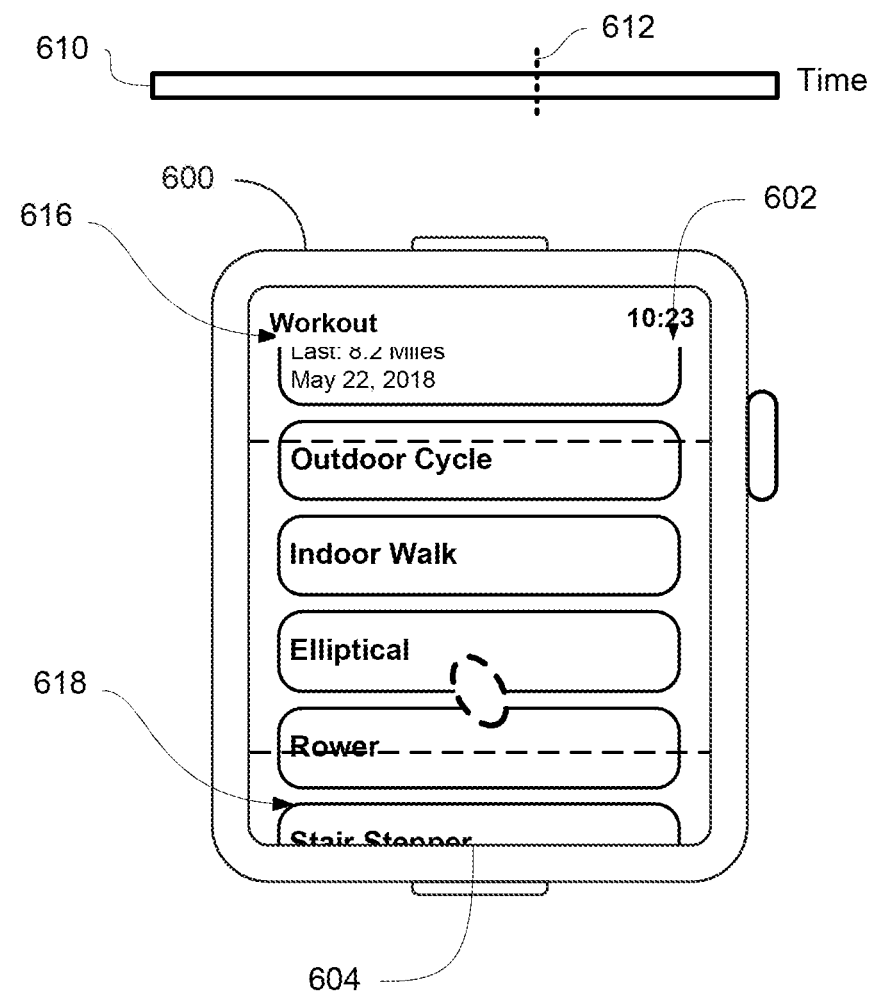
Figure 6D:
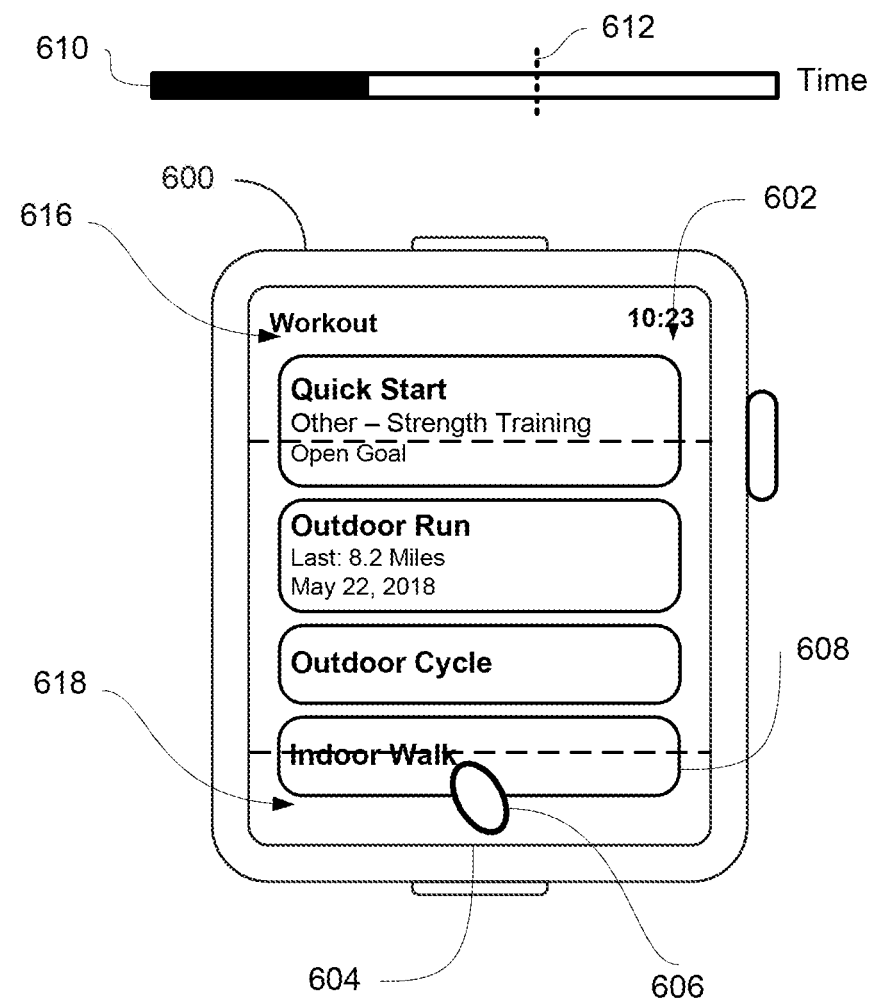
Figure 6E:
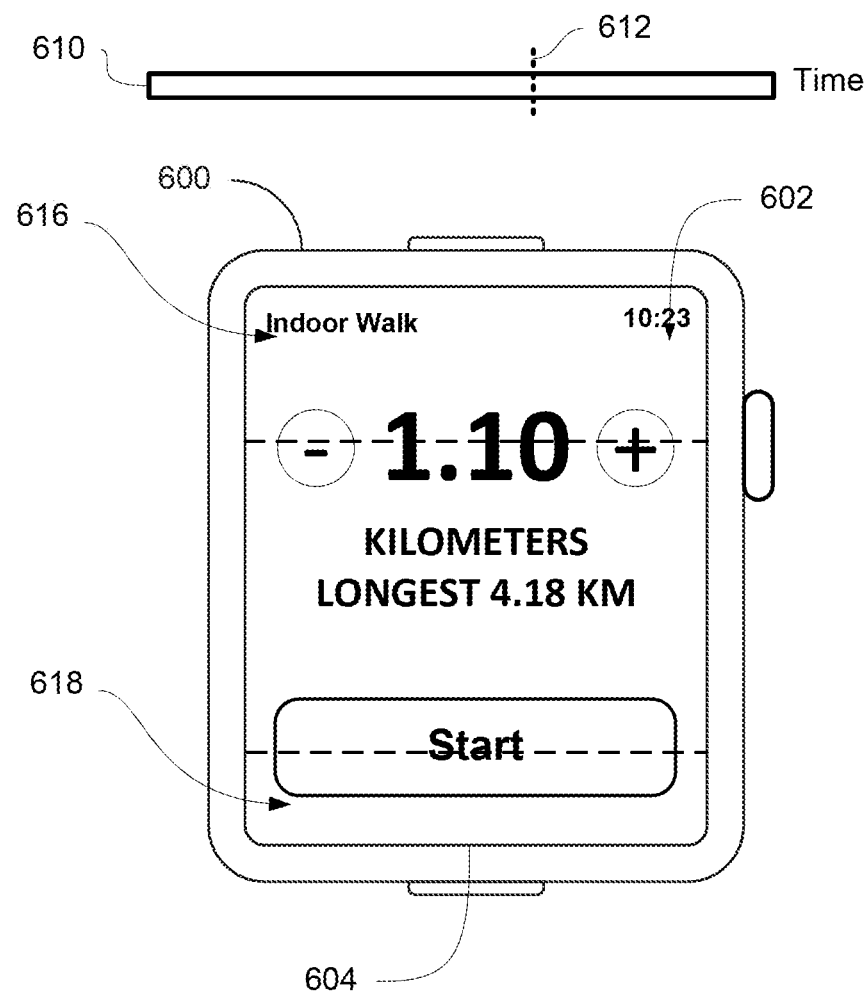
Figure 6F:
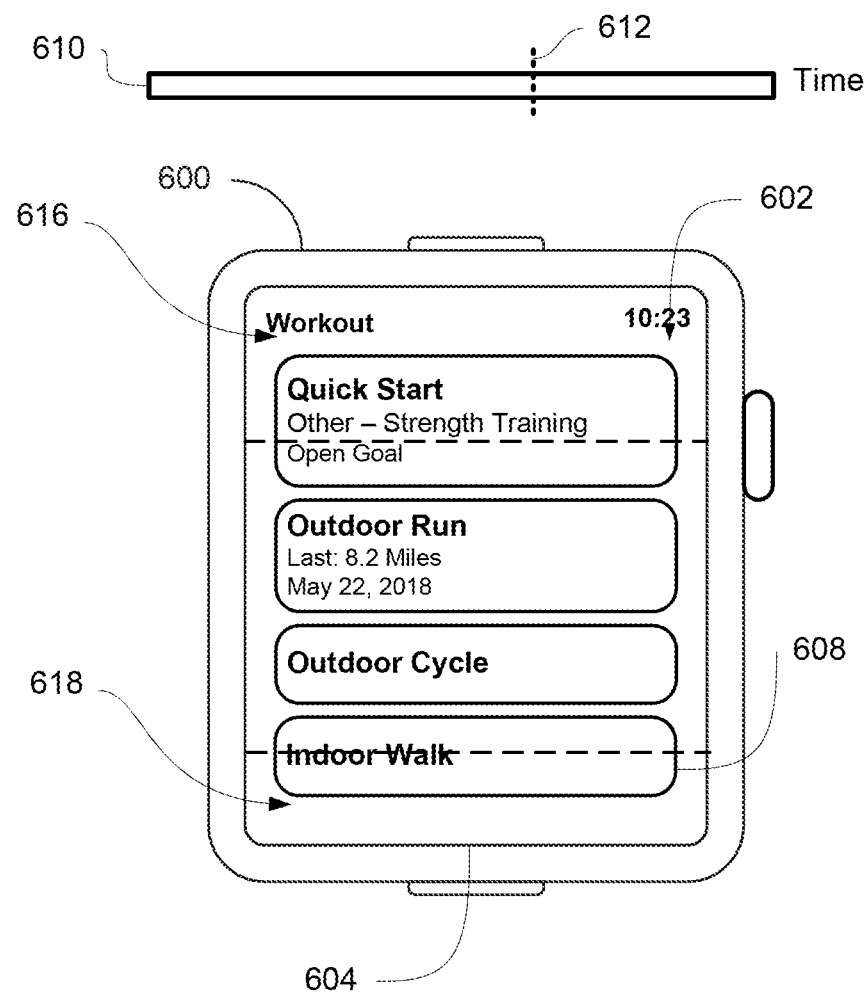
Figure 6G:
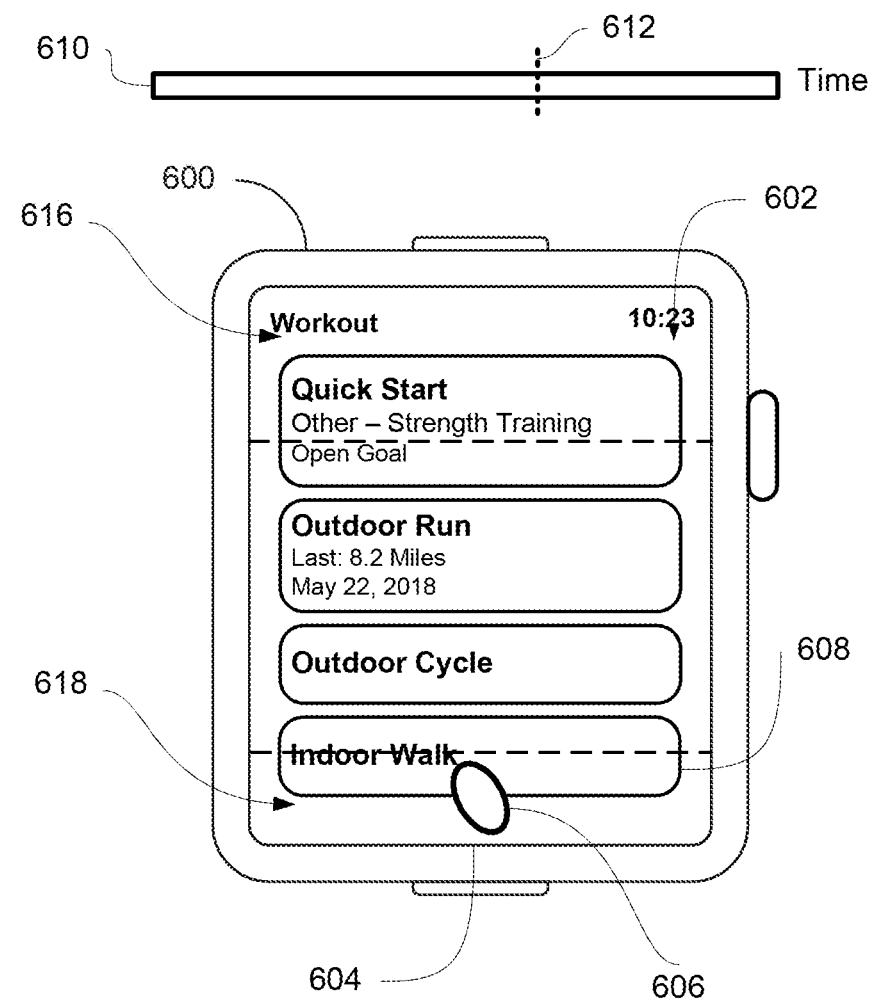
Figure 6H:
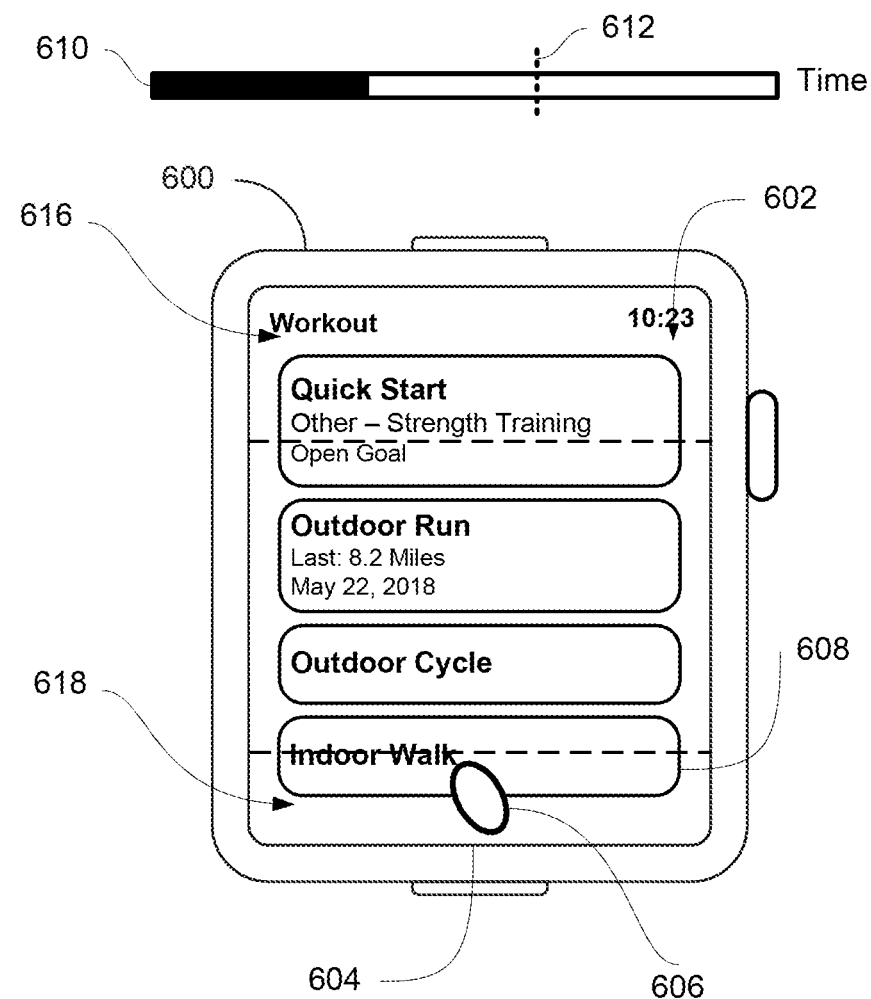
Figure 6I:
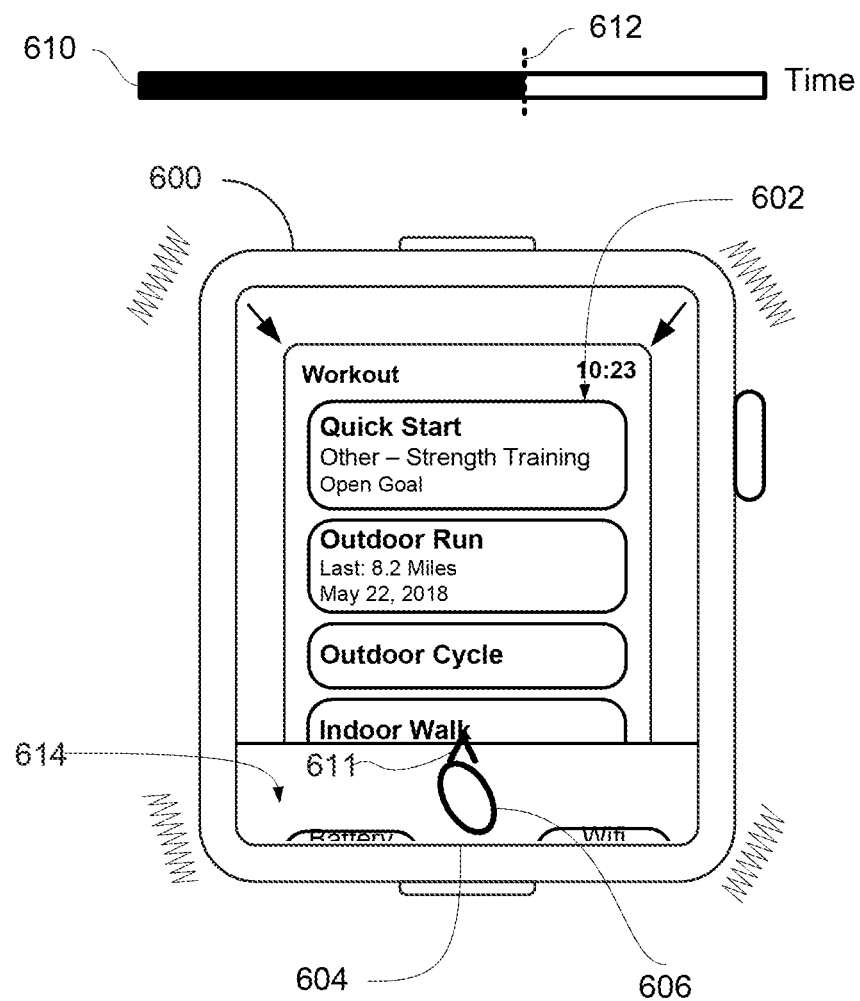
Figure 6J:
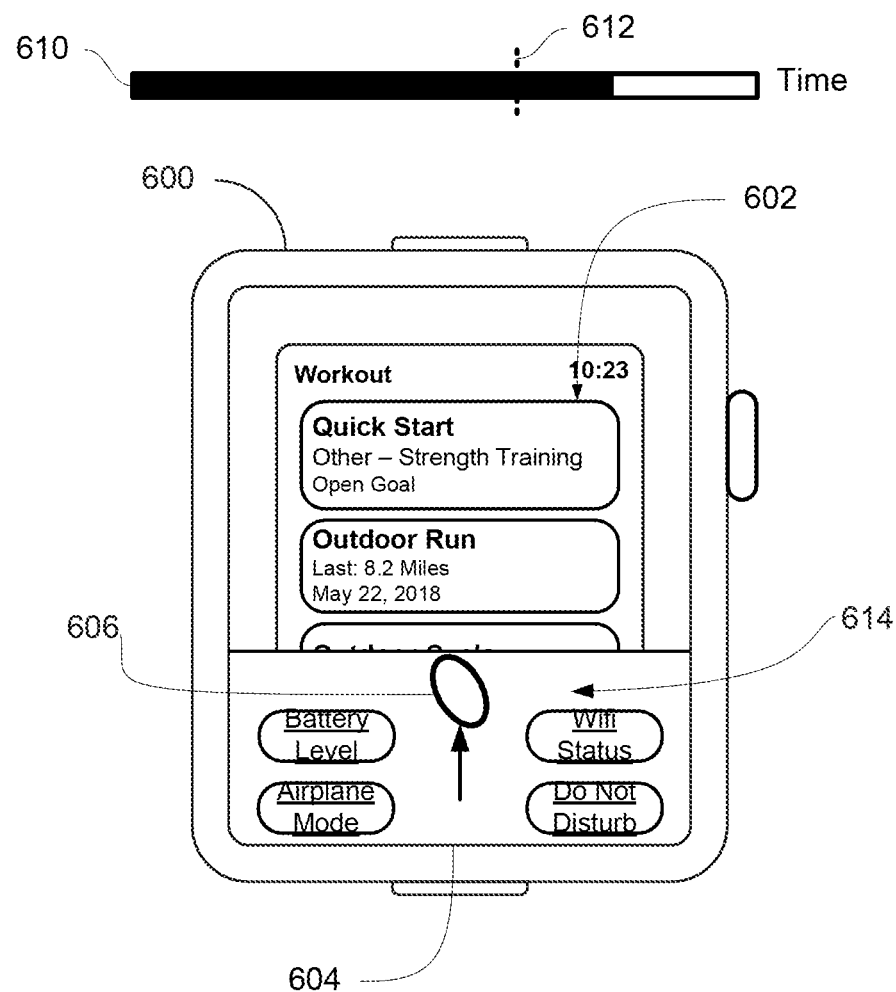
Figure 6K:
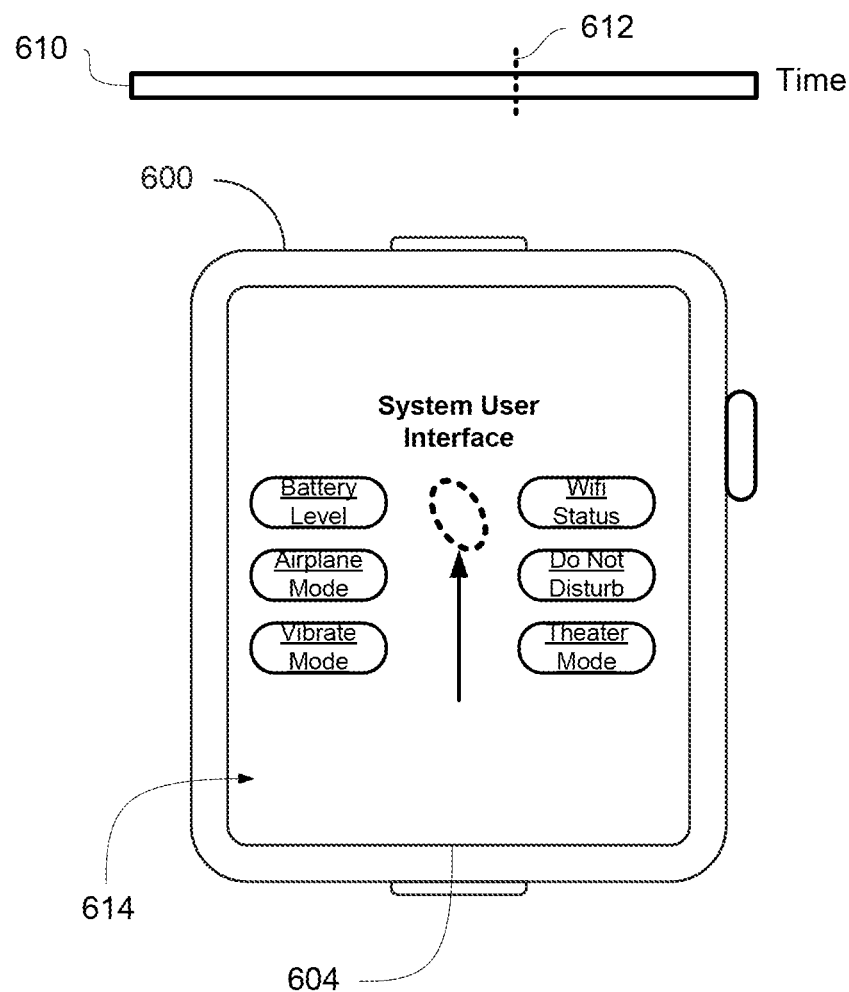
Figure 6L:
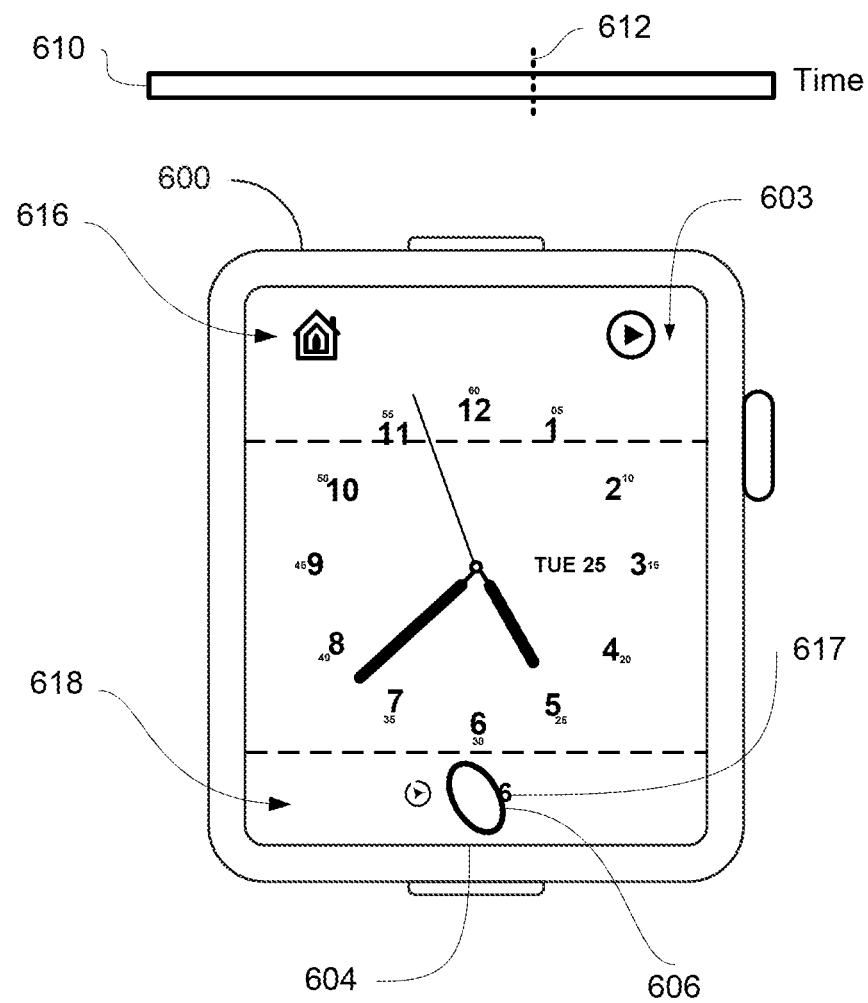
Figure 6M:
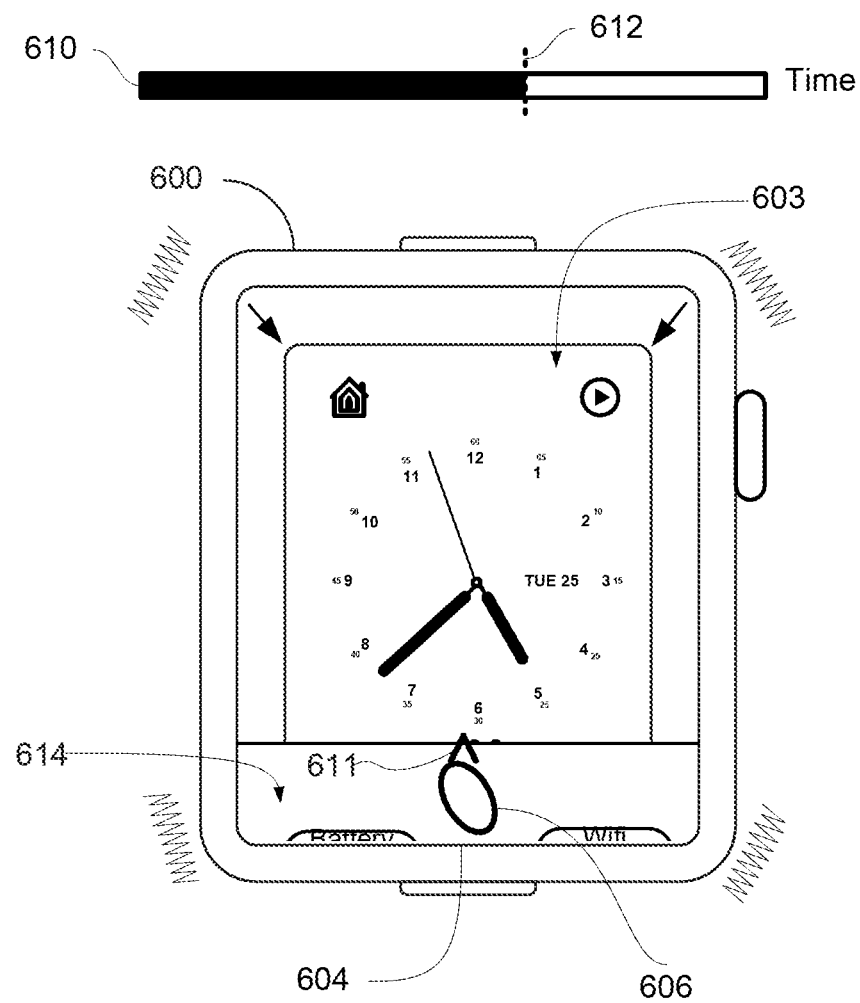
Figure 6N:
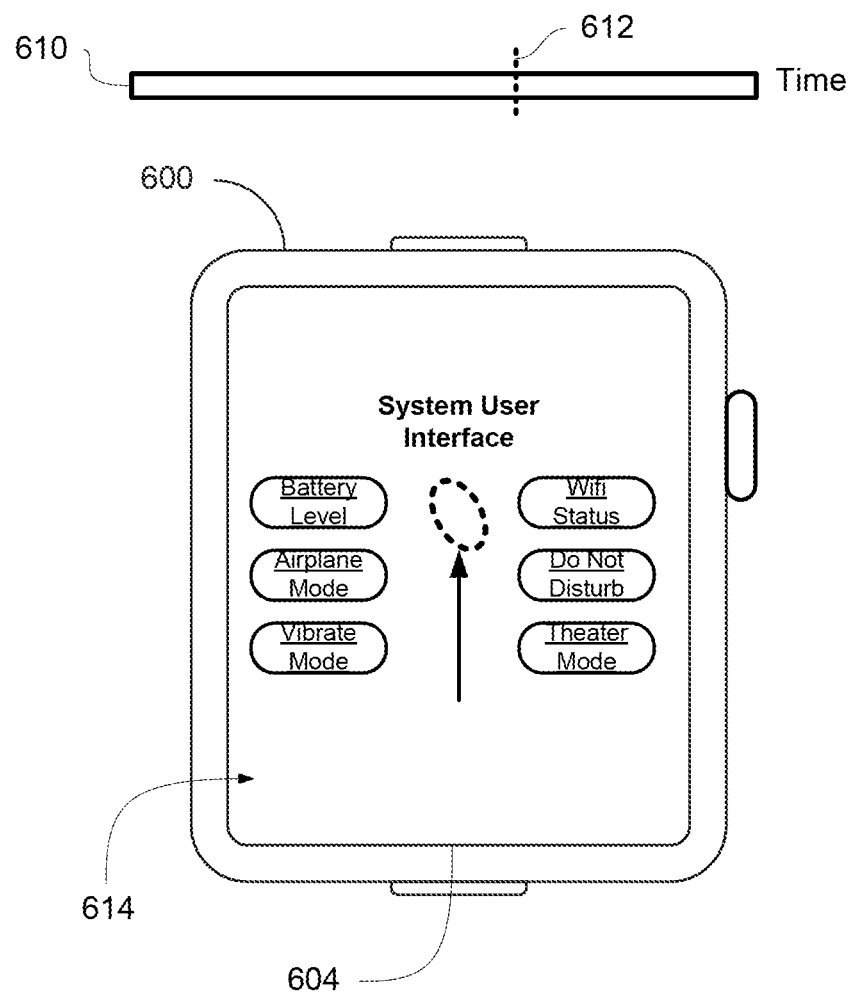
Figure 6O:
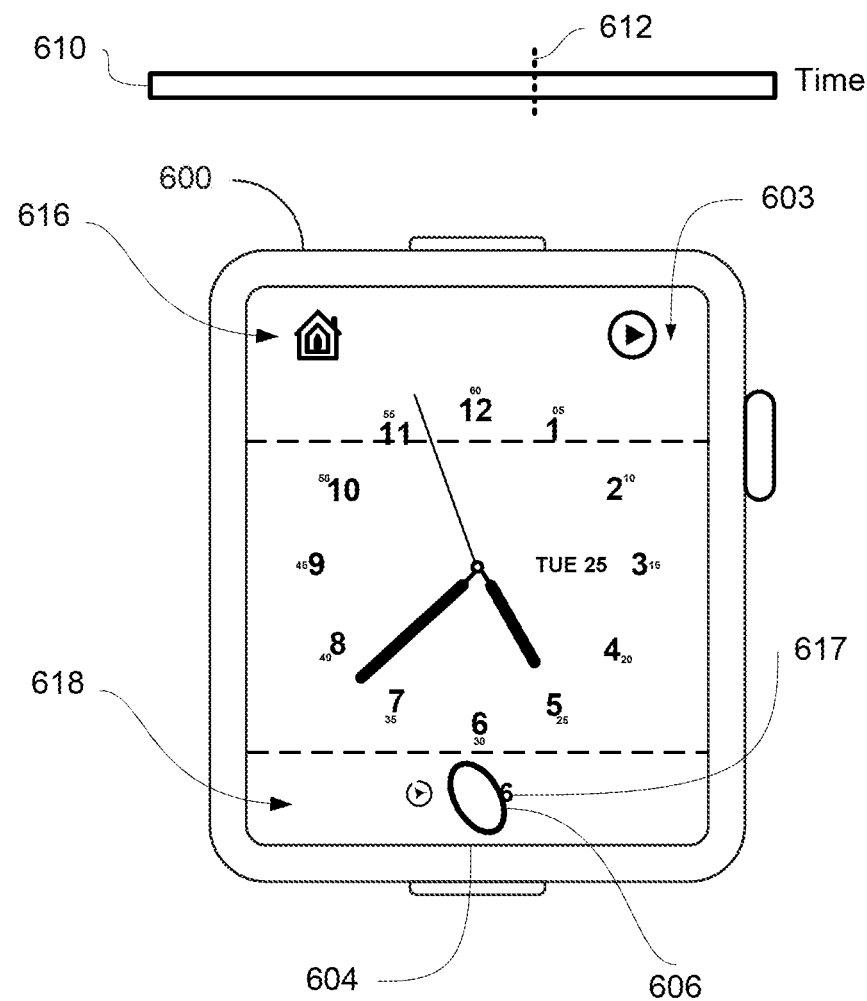
Figure 6P:
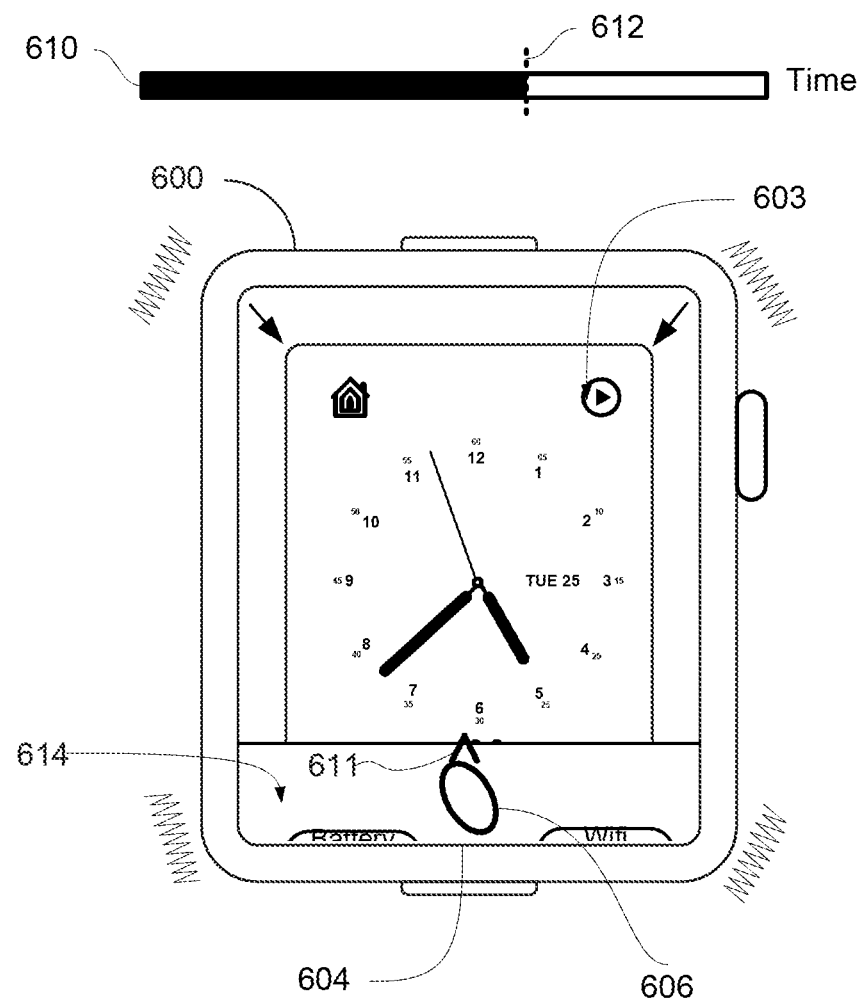
Figure 6Q:
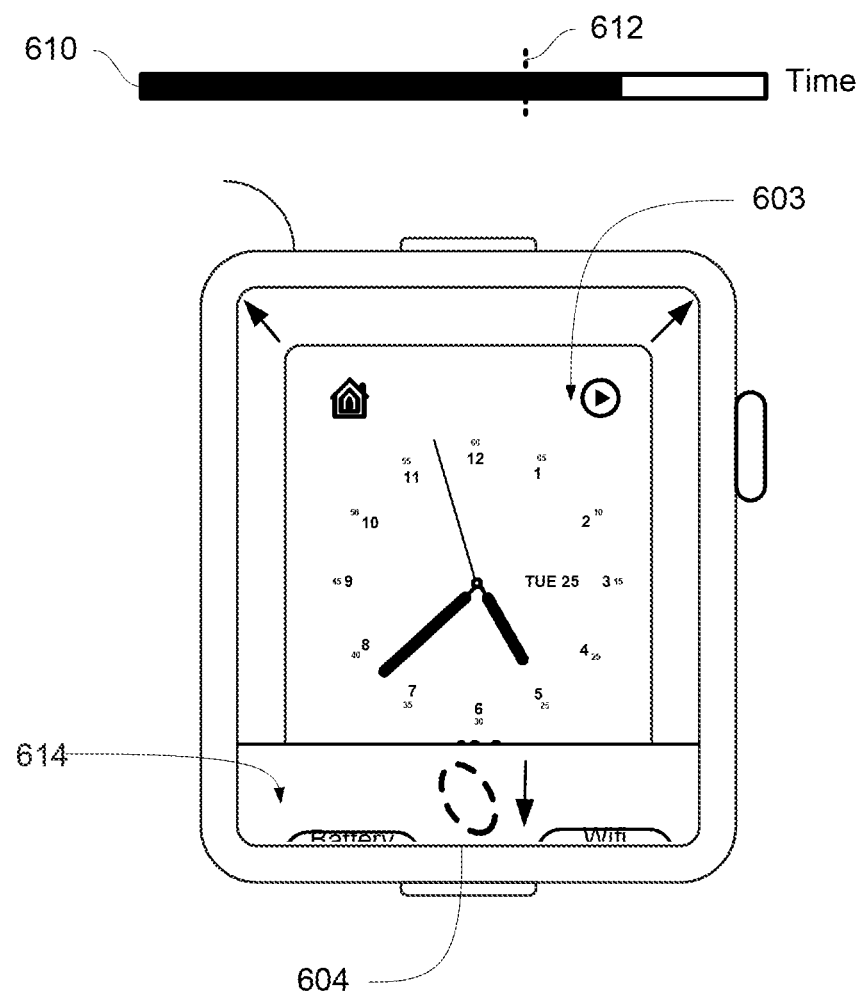
Figure 6R:
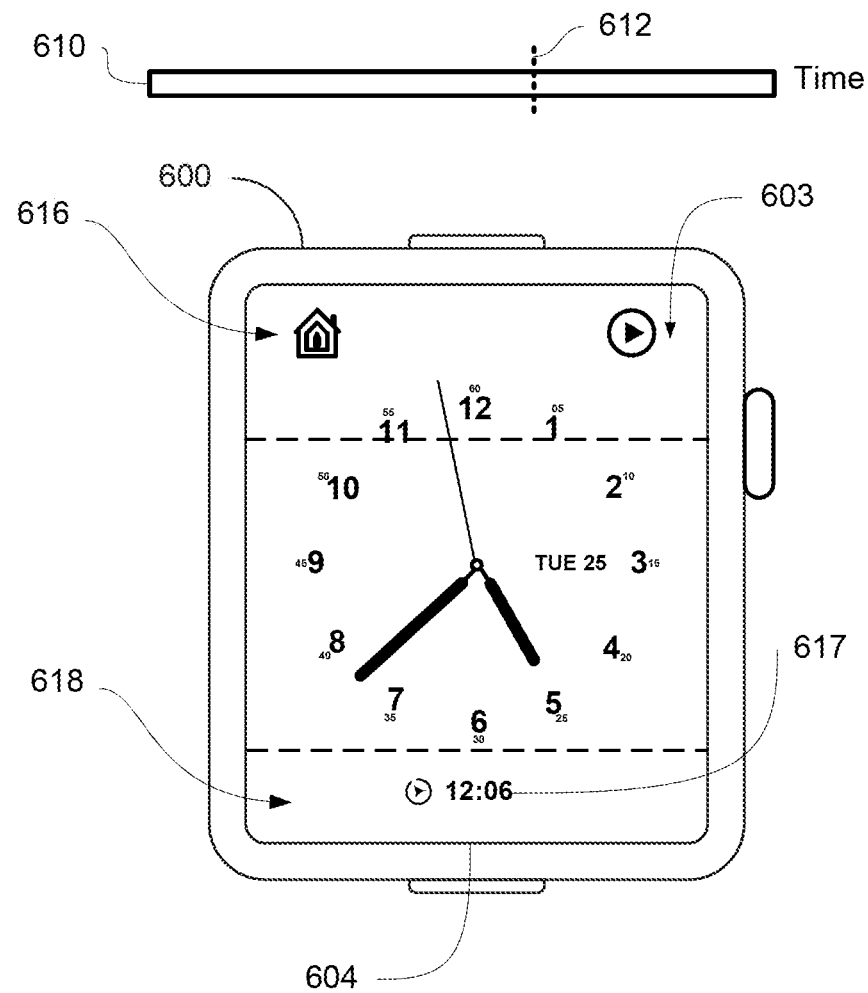
Figure 6S:
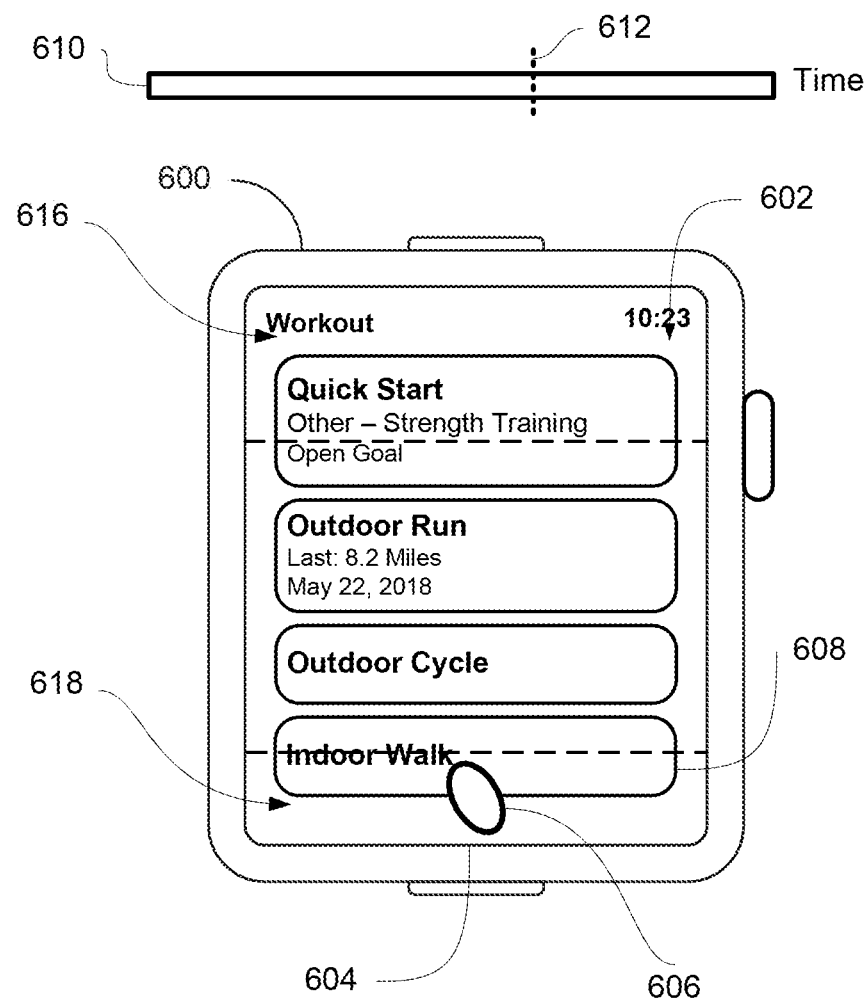
Figure 6T:
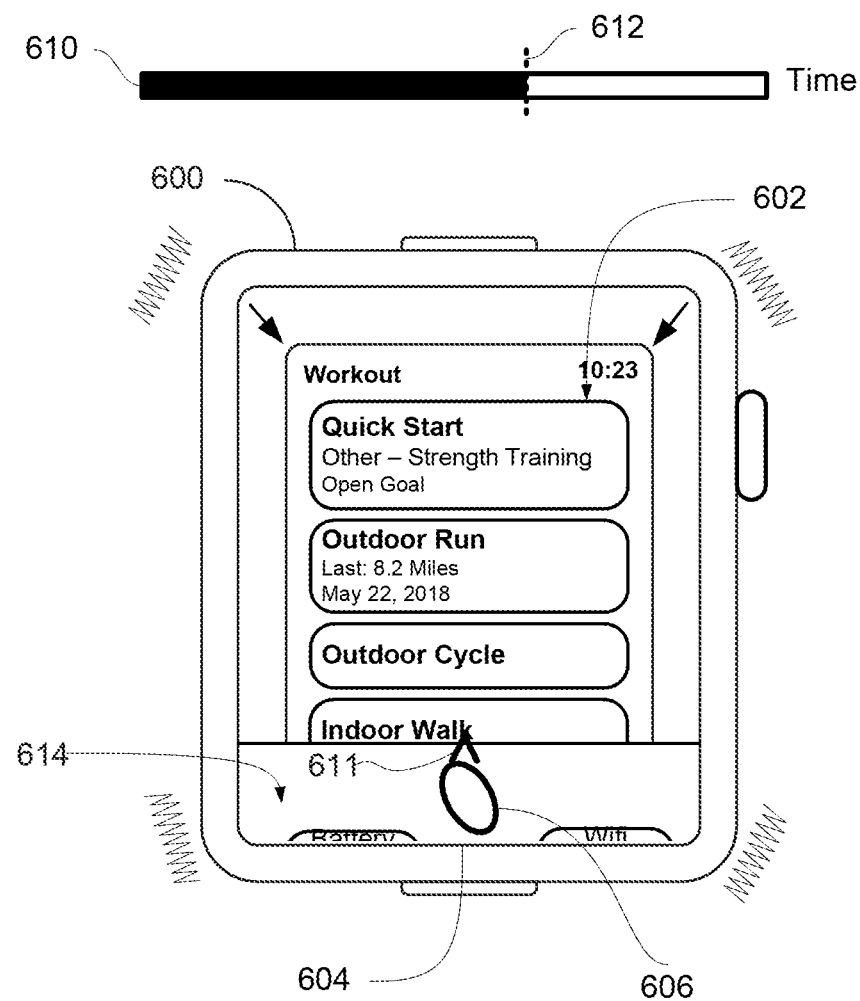
Figure 6U:
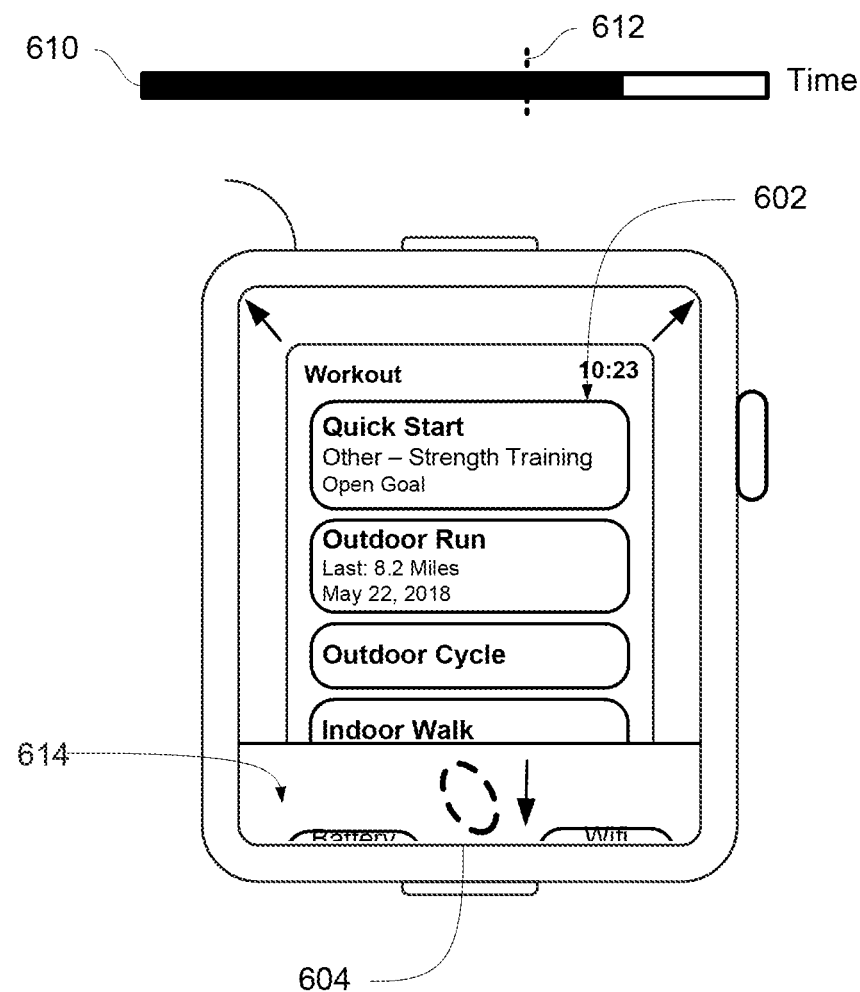
Figure 6V:
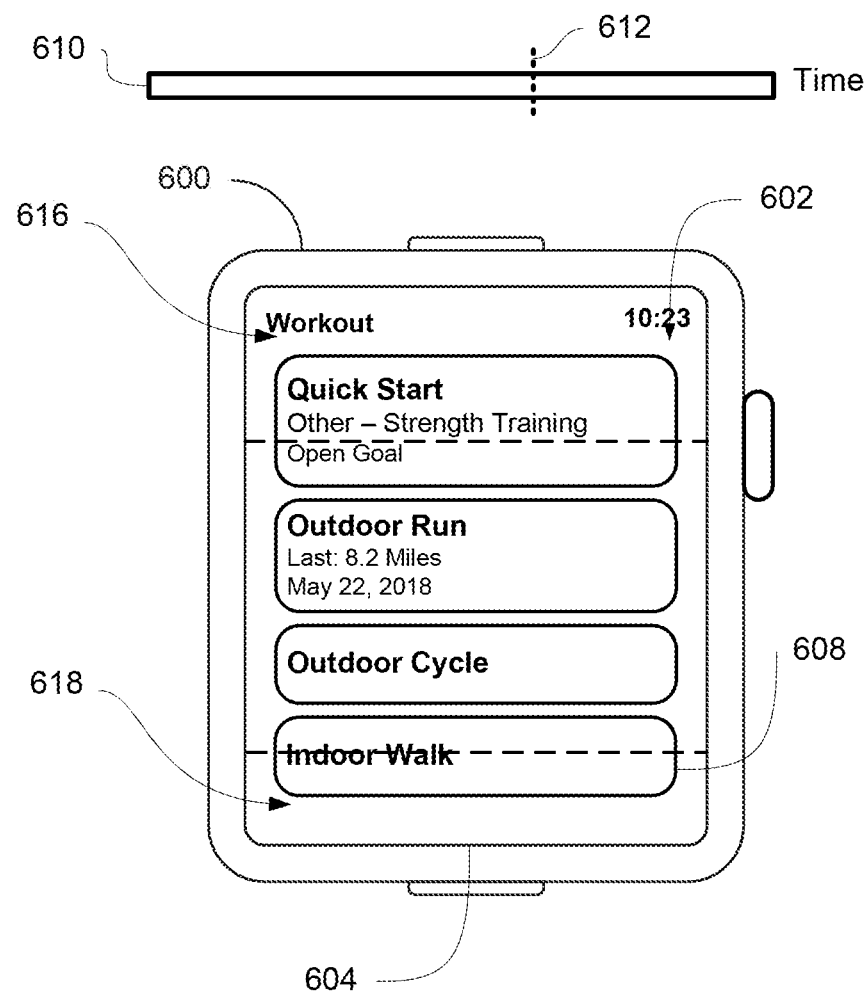
Figure 6W:
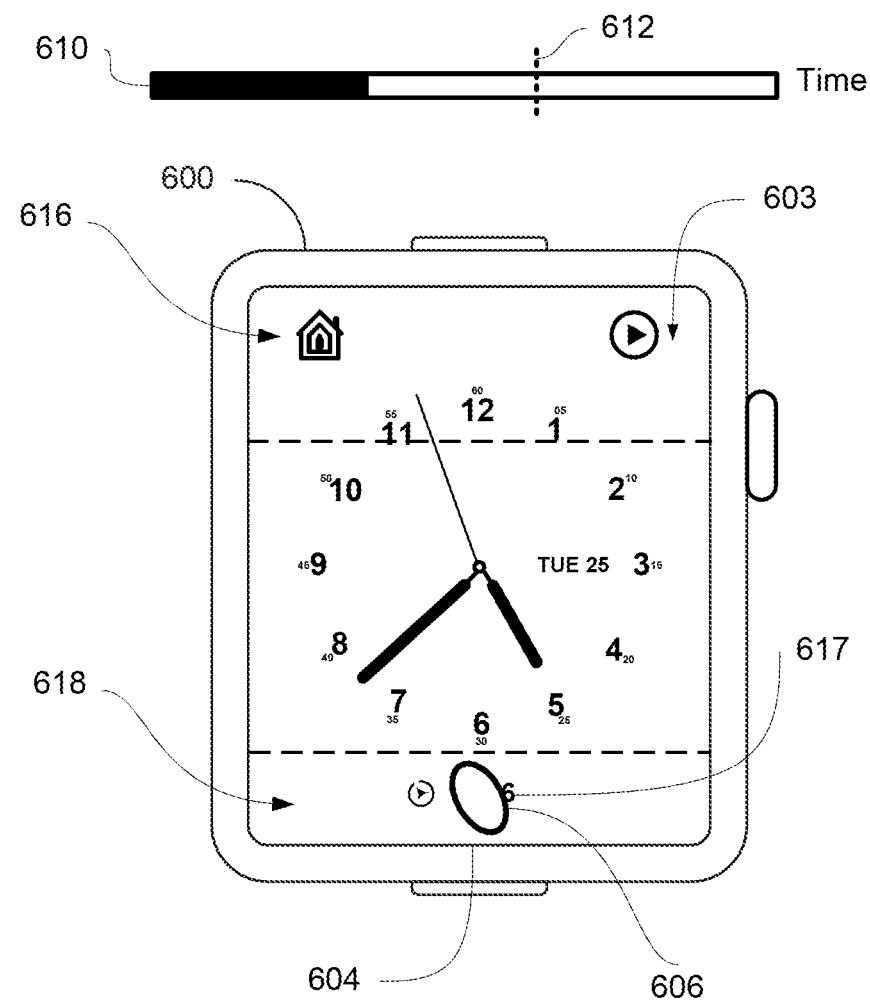
Figure 6X:
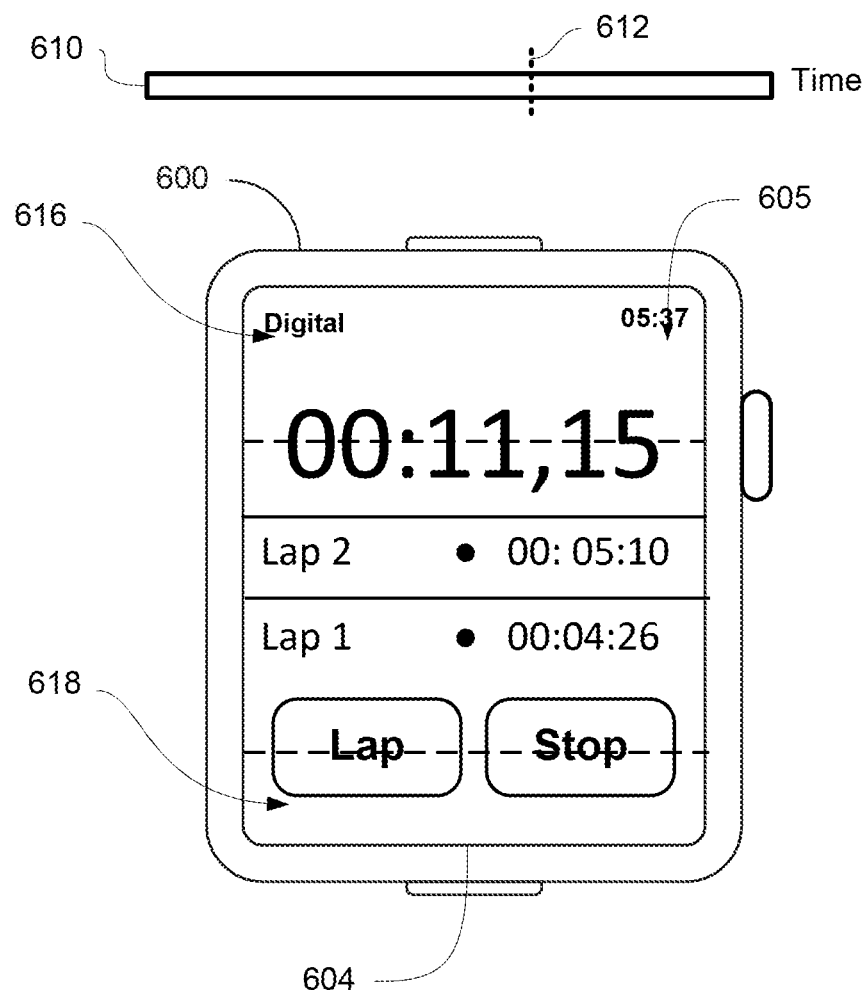

FIGS. 6A-6XX illustrate exemplary ways in which an electronic device provides access to a system user interface in response to touch inputs received in an application user interface or a wake screen user interface, in accordance with some embodiments of the disclosure. The embodiments in these figures are used to illustrate the processes described below, including the processes described with reference to FIGS. 7A-7H.

FIGS. 6A-6C illustrate various embodiments where a swipe input is detected on the touch screen of an electronic device while the touch screen displays an application user interface.

FIG. 6A illustrates exemplary device 600 with touch screen 604, such as described with reference to FIGS. 5A-5H. Touch screen 604 optionally displays one or more user interfaces that include various content. In the example illustrated in FIG. 6A, touch screen 604 displays a fitness tracking application user interface 602 of a fitness tracking application for tracking various data related to workout sessions of a user. In FIG. 6A, the fitness tracking application displays workout type browsing user interface 602, which includes multiple affordances associated with different workout sessions. For example, the "Indoor Walk" affordance 608 is associated with functions used in an indoor walk workout session, while affordances "Outdoor Cycle" and "Outdoor Run" are associated with functions used in an outdoor cycle and an outdoor run workout session, respectively. In another example, affordance "Quick Start" is associated with a frequently-selected exercise session or the most recent exercise session (in this case, a strength training exercise session). The affordances optionally further display information related to the type of workout session such as the date and the distance of the last outdoor run in the outdoor run affordance. Touch screen 604 further includes a top region 616, whose top boundary is the top edge of the touch screen 604 and whose bottom boundary is the first dashed line from the top edge of the touch screen 604 in FIG. 6A. Similarly, touch screen 604 further includes a bottom region 618, whose top boundary is the first dashed line from the bottom edge of the touch screen 604 and whose bottom boundary is the bottom edge of touch screen 604 in FIG. 6A. As shown in FIG. 6A, top region 616 is larger than bottom region 618. Further, part of the quick start affordance is in the top region 616, and part of the indoor walk affordance 608 is in the bottom region 618. Time bar 610 depicts the time duration of a touch input detected at the touch screen 604 (e.g., reflecting the elapsed time since the time when a contact in the touch input is first detected on touch screen 604), and time threshold 612 depicts a predefined minimum time threshold a touch input must meet in order to satisfy a requirement to display an indication of the above-mentioned system user interface that is optionally accessible from user interface 602, as will be described in more detail later. Furthermore, contact 606 is detected at an area of the touch screen where indoor walk affordance 608 is being displayed; that is, contact 606 overlaps with indoor walk affordance 608. Because contact 606 has just been detected at the touch screen 604 in FIG. 6A, time bar 610 shows no elapsed time since touchdown of contact 606 on touch screen 604.

In FIG. 6B, as the contact time elapses (as shown in the solid portion of the contact bar 610), but before the elapsed contact time reaches a predefined minimum time threshold 612, an upward movement of contact 606 is detected on touch screen 604. Generally, a vertical (e.g., upward or downward) movement is considered a swipe or flick input (e.g., a swipe where the movement speed is relatively slow and the movement distance is relatively long, or a flick where the movement speed is relatively fast and the movement distance is relatively short). A swipe (or flick) detected in an application user interface will optionally result in a scrolling behavior through that user interface in accordance with the swipe (or flick). For example, FIG. 6B depicts the upward movement of contact 606 out of the bottom region 618 while the touch screen 604 displays the workout type browsing user interface 602. In response, the workout type browsing user interface 602 displays additional affordances (e.g., Elliptical and Rower affordances) near the bottom of the touch screen 604, shifts some already displayed affordances upward, and stops displaying affordances previously near the top of the touch screen 604 (e.g., the Quick Start affordance). Optionally, a scrolling behavior in the application user interface is also achieved by receiving a non-touch input, such as a rotation input at a digital crown of a smart watch device.

In FIG. 6C, the elapsed time in time bar 610 is reset to null, signaling that the upward swipe input has completed (e.g., a liftoff of contact 606 was detected after detecting the swipe input). In response to detecting the swipe input, the workout type browsing user interface 602 optionally displays additional affordances (e.g., the partially visible Stair Master affordance) near the bottom of the touch screen 604, shifts some already displayed affordances upward, and stops displaying affordances previously near the top of the touch screen 604 (e.g., the Outdoor Run affordance). Thus, as described with reference to FIGS. 6A-6C, a swipe input (e.g., vertical swipe input) detected in an application user interface optionally results in scrolling through that application user interface in accordance with the swipe input.

Similarly, a tap input detected in an application user interface optionally results in the application user interface responding to the tap input. For example, FIGS. 6D-6E illustrate various embodiments where a tap input is detected on the touch screen of an electronic device while the touch screen displays an application user interface.

In FIG. 6D, touch screen 604 is displaying fitness tracking application user interface 602 as discussed above while contact 606, which overlaps with the boundary of the Indoor Walk affordance 608, is received in the bottom region 618. As seen on time bar 610, contact 606 has not been detected long enough to reach the time threshold 612, which again is the predefined minimum time threshold a touch input must meet in order to satisfy a requirement (e.g., in order to be considered a touch and hold input) to display an indication of the above-mentioned system user interface that is optionally accessible from user interface 602, as will be described in more detail later. Furthermore, contact 606 is detected at an area of the touch screen where indoor walk affordance 608 is being displayed; that is, contact 606 overlaps with indoor walk affordance 608. Contact time begins to elapse as shown in time bar 610.

In FIG. 6E, the elapsed time in time bar 610 is reset to null, signaling a liftoff of contact 606 was detected before contact 606's duration reached the time threshold 612. As a result, contact 606 is optionally considered to be part of a tap input. In response to detecting the tap input, an Indoor Walk exercise user interface 602 (corresponding to the selected indoor walk affordance 608) is optionally displayed, as shown in FIG. 6E. The Indoor Walk exercise user interface 602 in FIG. 6E includes additional affordances (e.g., a Start affordance to start the indoor walk exercise session and two affordances with a "+" sign and a "−" sign, respectively, for adjusting the desired distance of the indoor walk exercise session) and status indicators (e.g., the current time indicator on the top right corner of touch screen 604).

As previously mentioned, in some embodiments, actions other than swiping through an application user interface or having the application user interface respond to a touch input to display another application user interface are achievable from the application user interface. FIGS. 6F-6K illustrate various embodiments where a touch and hold input followed by a swipe input is detected on the touch screen of an electronic device while the touch screen displays an application user interface, and rather than interacting with the application user interface, the touch and hold input provides for access to a system user interface of the electronic device (e.g., a user interface that is not a user interface of the application, but rather a user interface of the operating system of the electronic device).

In FIG. 6F, touch screen 604 is displaying fitness tracking application user interface 602 discussed in detail above. As shown in the figure, part of the quick start affordance is in the top region 616, and part of the indoor walk affordance 608 is in the bottom region 618. Because no contact is detected at the touch screen, time bar 610 shows no elapsed time duration.

FIG. 6G depicts the moment that a contact 606 is detected in the bottom region 618 of touch screen 604 while the touch screen 604 displays the workout type browsing user interface 602. Furthermore, the contact 606 is detected in an area of the touch screen where indoor walk affordance 608 is being displayed; that is, contact 606 overlaps with indoor walk affordance 608. Contact time begins to elapse.

In FIG. 6H, contact 606 continues to be detected (e.g., without liftoff) in bottom region 618 and overlaps with indoor walk affordance 608. Time bar 610 shows that some time has elapsed (shown in solid), but the elapsed time has not exceeded the predefined time threshold 612.

In FIG. 6I, the elapsed time (shown in solid in time bar 610) has reached the predefined time threshold 612 while contact continued Contact 606 to be detected (e. g., there was no liftoff) in bottom region 618 contact 606. As a result, contact 606 is optionally considered to be part of a touch and hold input. In response to determining that contact 606 is part of a touch and hold input, touch screen 604 displays system user interface indication 611 and optionally a partial view of system user interface 614 (e.g., partial views of affordances in system user interface 614) in proximity to contact 606 (e.g., peeking up from the bottom portion of touch screen 604, corresponding to the bottom region 618 of touch screen 604 in which contact 606 was detected). Additionally, system user interface indication 611 and the partial view of system user interface 614 partially obscure workout type browsing user interface 602, whose size has been reduced proportionally (e.g., while maintaining its original aspect ratio) and has been pushed back on touch screen 604 to appear as if it is behind system user interface 614. Furthermore, electronic device 600 optionally provides a tactile output (e.g., a vibration) and/or an audio response such as a beep when the touch and hold input is detected. The combination of displaying system user interface indication 611, obscuring workout type browsing user interface 602, pushing workout type browsing user interface 602 back on touch screen 604 and providing tactile/audio response optionally indicates to the user that a system user interface (e.g., system user interface 614) is accessible upon detection of further input.

In FIG. 6J, an upward movement of contact 606 is detected without liftoff of contact 606 being detected. This upward movement is considered a further touch input (e.g., a swipe input or a flick input) on touch screen 604. Time bar 610 with a larger solid stripe shows that before detecting the swipe input, the contact 606 continues to be detected on touch screen 604 (e.g., there is no liftoff between the touch and hold input and the swipe input). In response to detecting that a swipe of contact 606 has commenced, touch screen 604 displays a larger partial view of system user interface 614 (e.g., partial views of other affordances in system user interface 614) relative to that in FIG. 6D as if the swipe of contact 606 upward is pulling system user interface 614 into touch screen 604, and further obscures workout type browsing user interface 602. Touch screen 604 optionally ceases to display system user interface indicator 611 at this point.

In FIG. 6K, the upward swipe or flick input has completed. System user interface 614, whose partial view was optionally shown in FIG. 6J, is fully displayed on touch screen 604 in FIG. 6K (e.g., has been fully pulled into view on touch screen 604 by the swipe input). System user interface 614 in FIG. 6K includes affordances that allow a user to view and change the statuses of system functions of the electronic device 600, such as viewing the Wi-Fi status and turning the Wi-Fi radio on and off via a Wi-Fi status affordance. Thus, as described above, a user it able to access a system user interface from an application user interface in response to a touch and hold input detected in the bottom region of the touch screen, followed by an upward swipe input that pulls the system user interface into view on the touch screen.

The system user interface is optionally similarly accessible from a wake screen user interface (e.g., a watch face) of the electronic device 600. FIGS. 6L-6N illustrate various embodiments where a touch and hold input followed by a swipe input is detected on the touch screen of an electronic device while the touch screen displays a wake screen user interface.

In the example illustrated in FIG. 6L, touch screen 604 displays a device wake screen (e.g., a watch face in the case that the electronic device is a smart watch) user interface 603 for displaying various information and providing access to various watch functions and/or installed applications. In FIG. 6L, the wake screen user interface 603 includes a simulated analog watch face and multiple affordances associated with different functions and/or applications. For example, the affordance 617 is selectable to activate a stopwatch or chronograph function of the electronic device. In another example, the affordance at the top left corner of the wake screen user interface 603 is selectable to control connected smart appliances. In another example, the affordance at the top right corner of wake screen user interface 603 is selectable to control playback of media files (e.g., music). Similar to previously discussed exemplary embodiments, touch screen 604 includes a top region 616 and a bottom region 618, where top region 616 is larger than bottom region 618. The smart home function affordance and the media-playing application affordance both are in the top region 616, while the stopwatch affordance 617 is in the bottom region 618. In FIG. 6L, contact 606 has just been detected in the bottom region 618 of touch screen 604 while the touch screen 604 displays the wake screen user interface 603; thus, time bar 610 shows no elapsed time duration, but contact time has begun to elapse.

In FIG. 6M, the elapsed time (shown in solid in time bar 610) has reached the predefined time threshold 612 while contact 606 has remained in the bottom region 618 of touch screen 604. contact 606 Just as described with reference to FIG. 6I, in response to determining that contact 606 is part of a touch and hold input, touch screen 604 displays system user interface indication 611 and optionally a partial view of system user interface 614 that obscures wake screen user interface 603. Furthermore, electronic device 600 optionally provides a tactile output (e.g., a vibration) and/or an audio response such as a beep. Other details of the response of device 600 to the touch and hold input detected in bottom region 618 of touch screen 604 are optionally the same as described with reference to FIGS. 6F-6K.

For example, in FIG. 6N, a further upward swipe or flick of contact 606 is detected and completed, similar to the embodiment discussed in FIG. 6K. System user interface 614 (similar to that in FIG. 6K), whose partial view was optionally shown in FIG. 6M, is displayed on touch screen 604 in FIG. 6N.

FIGS. 6O-6R illustrate various embodiments where a touch and hold input followed by a liftoff of contact 606 is detected on the touch screen of an electronic device while the touch screen displays a wake screen user interface.

In FIG. 6O, device 600 is displaying wake screen user interface 603, similar to that in FIG. 6L. Contact 606 has just been detected in the bottom region 618 of touch screen 604 while touch screen 604 displays the wake screen user interface 603; thus, time bar 610 shows no elapsed time duration, but contact time has begun to elapse.

In FIG. 6P, as in FIG. 6M, the elapsed time (shown in solid in time bar 610) of contact 606 has reached the predefined time threshold 612, and device 600 responds as described in FIG. 6I or 6M, for example.

In FIG. 6Q, a liftoff of contact 606, instead of a swipe of contact 606, is detected on touch screen 604 while system user interface indication 611 is being displayed in response to detecting the touch and hold input in FIG. 6P. In response to detecting the liftoff, touch screen 604 ceases to display system user interface indication 611 and the partial view of system user interface indication 614 and resumes displaying wake screen user interface 603, as shown in FIG. 6R. For example, system user interface indication 611 disappears, the partial view of system user interface indication 614 begins to recede down and out of view towards the bottom edge of touch screen 604, while the obscured and reduced-size wake screen user interface 603 begins to return to the foreground and to its original size in FIG. 6O, as shown in FIG. 6R.

In FIG. 6R, the electronic device 600 returns to the same state as in FIG. 6O, that is, before detecting a touch input contact on touch screen 604. For example, system user interface indication 611 has receded out of view through the bottom edge of touch screen 604, while the previously obscured and reduced-size wake screen user interface 603 has returned to the foreground and its original size. Further, in FIG. 6R, affordance 617 has not been activated by the sequence of events of contact 606 described in FIGS. 6O-6Q (e.g., liftoff of contact 606 after reaching time threshold 612 without detecting a swipe of contact 606 does not interact with the user interface, and merely causes the system user interface indications to cease being displayed and the user interface to be redisplayed in its full, unobscured state).

The same result as described with reference to FIGS. 6O-6R optionally occurs when device 600 is displaying an application user interface as opposed to a wake screen user interface. For example, in FIGS. 6S-6V, a touch and hold of contact 606 is detected in bottom region 618 of touch screen 604 while the fitness application user interface is being displayed, liftoff of contact 606 in bottom region 618 is detected, and as a result the fitness application user interface is redisplayed in full on touch screen 604 without indoor walk affordance 608 having been activated by contact 606.

FIGS. 6W-6X illustrate various embodiments where a tap input instead of a touch and hold input is detected in the bottom region of the touch screen of an electronic device while the touch screen displays a wake screen user interface.

In FIG. 6W, touch screen 604 is displaying wake screen user interface 603, as previously described, when contact 606, which overlaps with stopwatch affordance 617, is detected in the bottom region 618 of touch screen. As seen on time bar 610, contact 606 has not been detected long enough to reach the time threshold 612.

Before time threshold 612 is reached, liftoff of contact 606 is detected, and as a result contact 606 is optionally determined to be part of a tap input. In response to detecting the tap input on stopwatch affordance 617, device 600 displays a stop watch user interface 605 as shown in FIG. 6X. The stopwatch user interface 605 in FIG. 6X includes additional affordances (e.g., a Lap affordance to record a lap time and a stop affordance to stop recording elapsed time in the stopwatch application) and status indicators (e.g., the current time indicator on the top right corner of touch screen 604). A tap input detected on an affordance in an application user interface within bottom region 618 or top region 616 optionally similarly results in activation of the affordance, and causes device 600 to respond accordingly.

Figure 6Y:
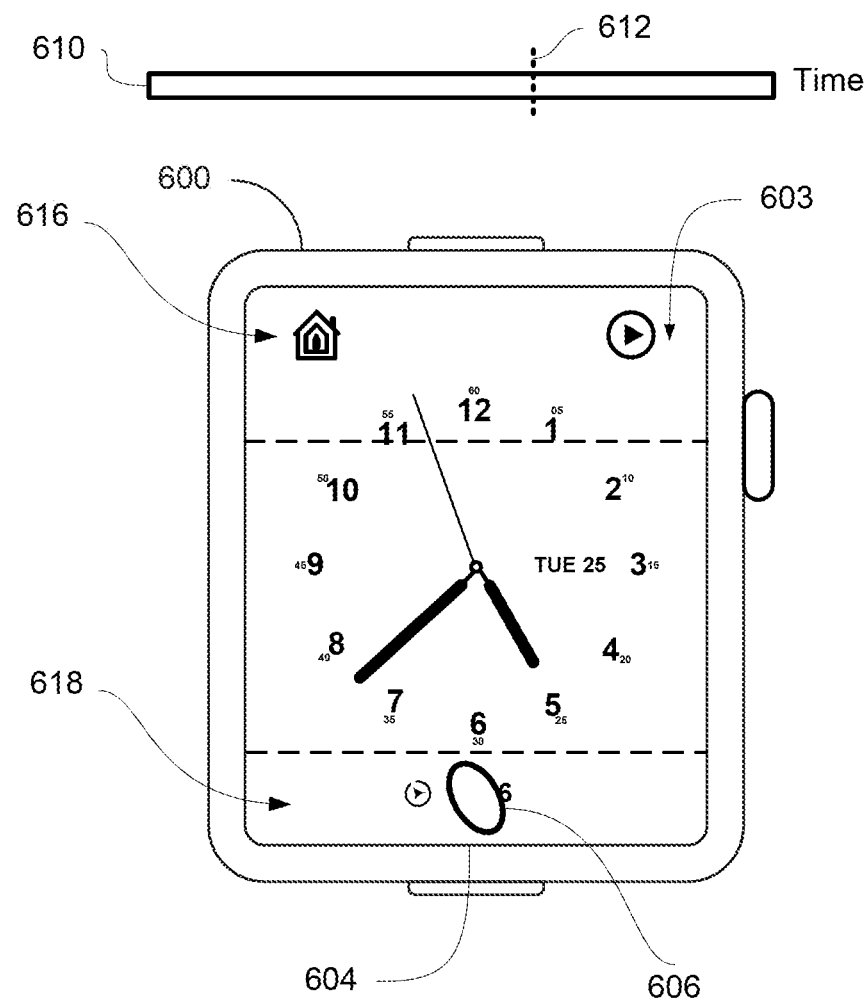

In some embodiments, the system user interface is accessible from a wake screen user interface in response to a swipe input without a required touch and hold input, in contrast to the behavior of device 600 when displaying an application user interface. FIGS. 6Y-6AA illustrate various embodiments where a swipe input instead of a touch and hold input is detected on the touch screen of an electronic device while the touch screen displays a wake screen user interface.

In FIG. 6Y, touch screen 604 is displaying a wake screen user interface 603 (e.g., a watch face in the case that the electronic device is a smart watch), as previously described. Contact 606 has just been detected in bottom region 618 of touch screen 604.

Figure 6Z:
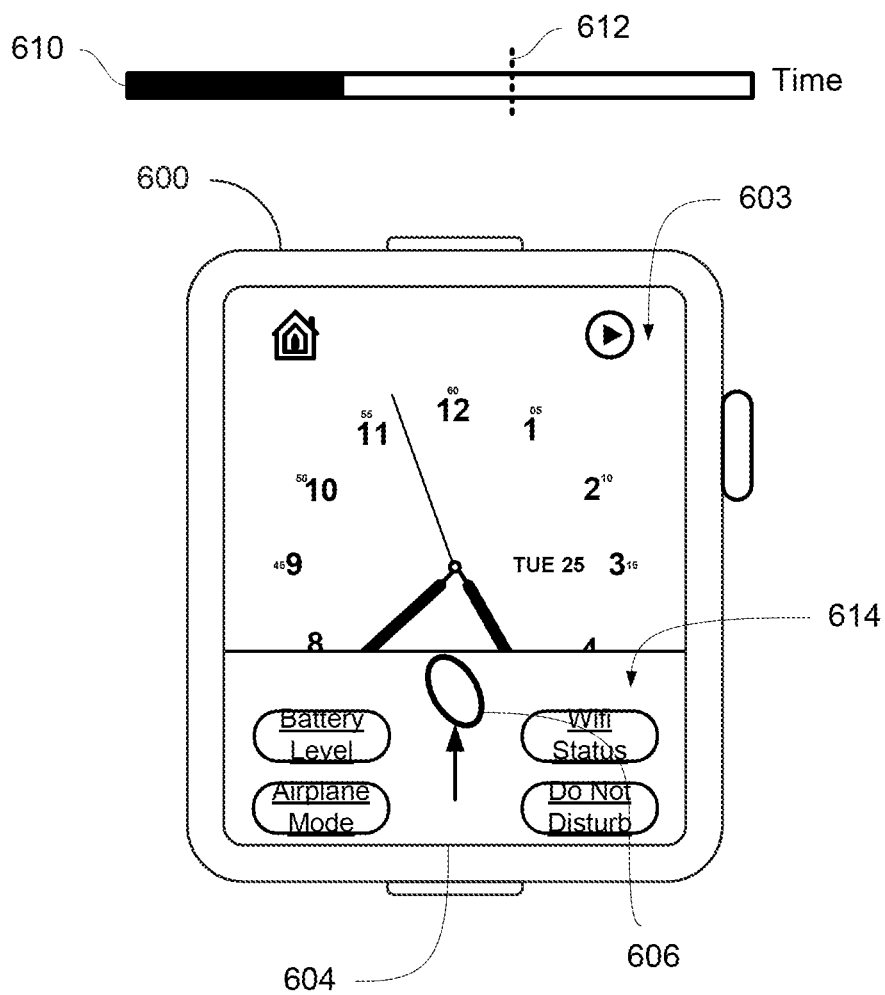
Figure 6A:
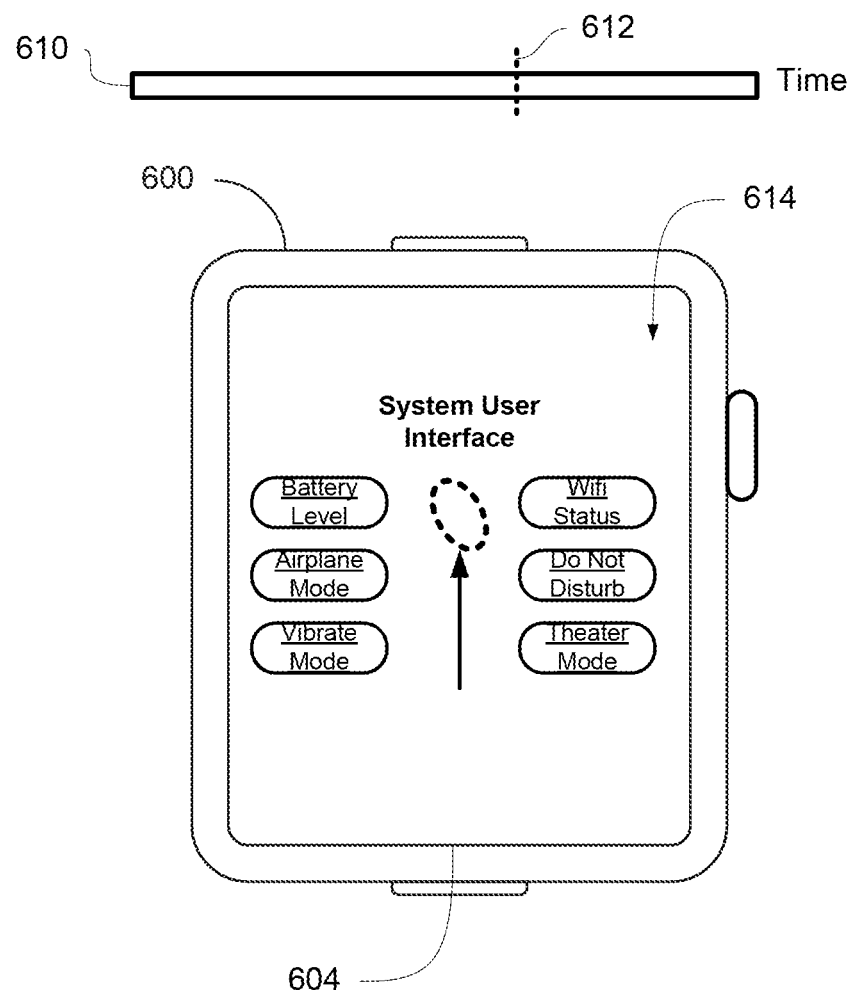
Figure 6B:
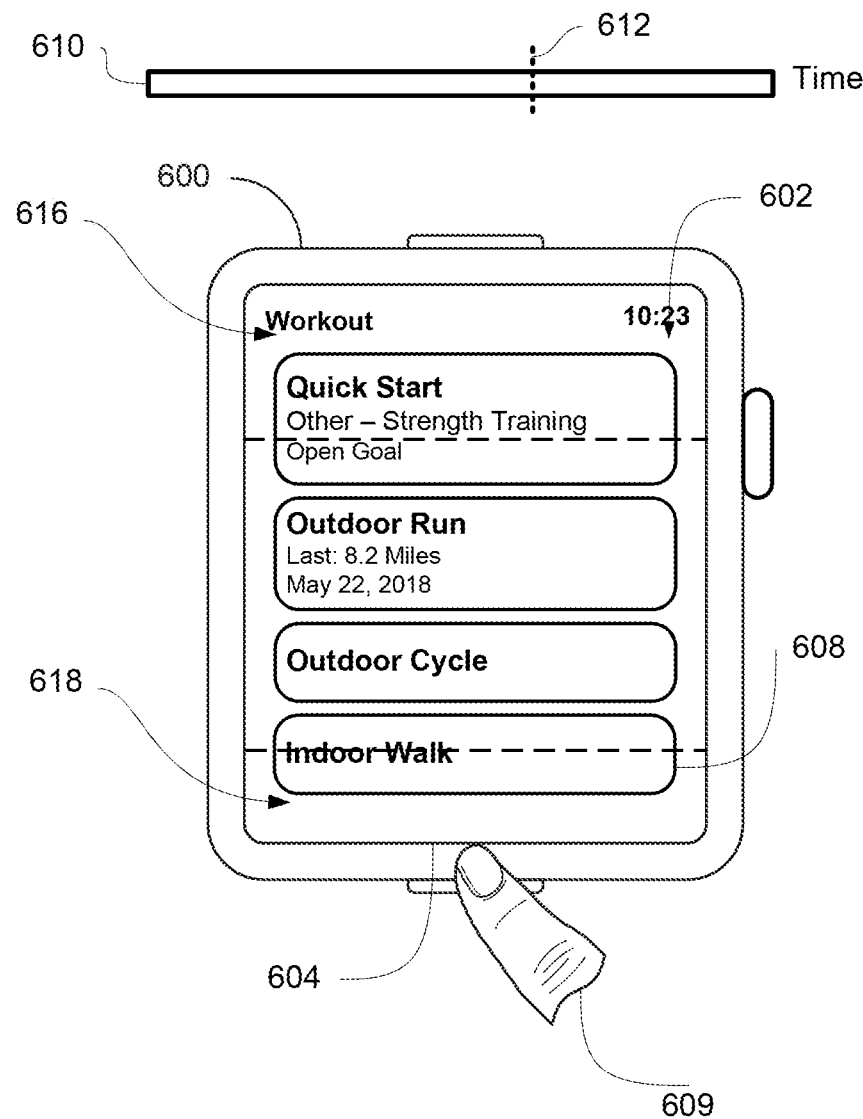
Figure 6C:
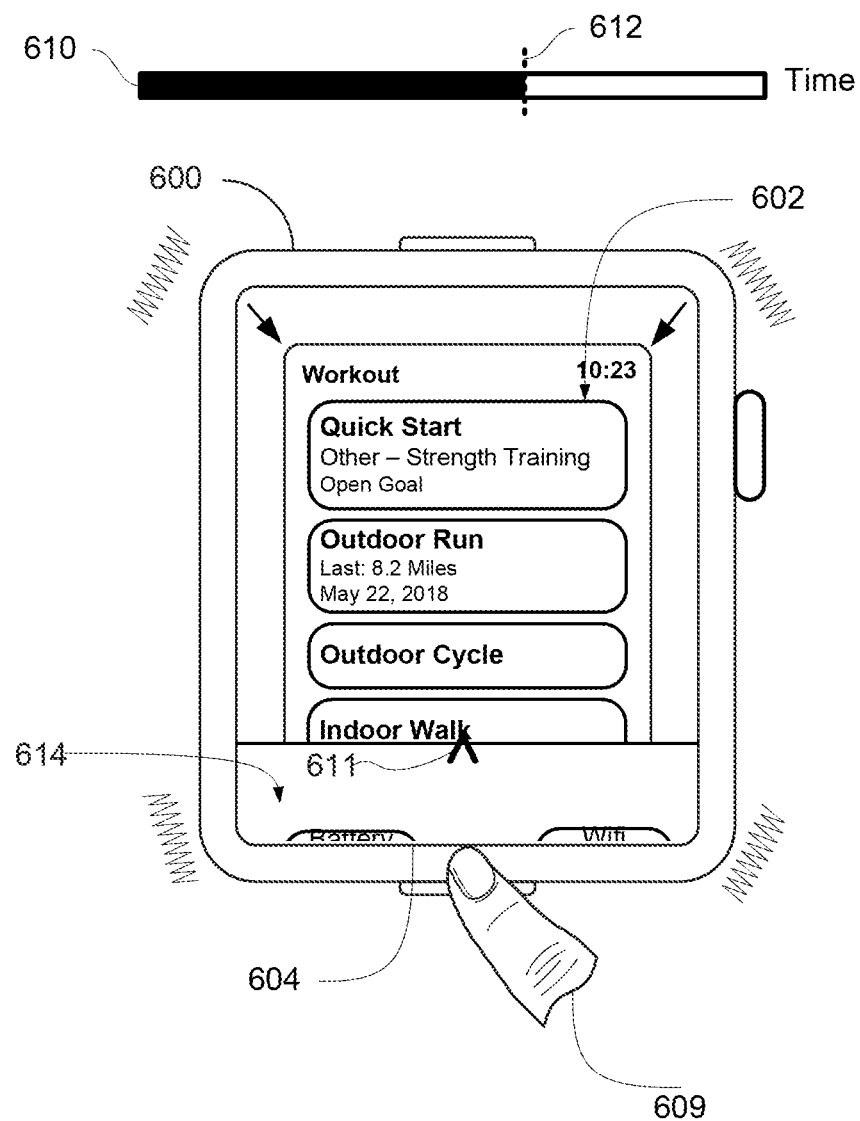
Figure 6D:
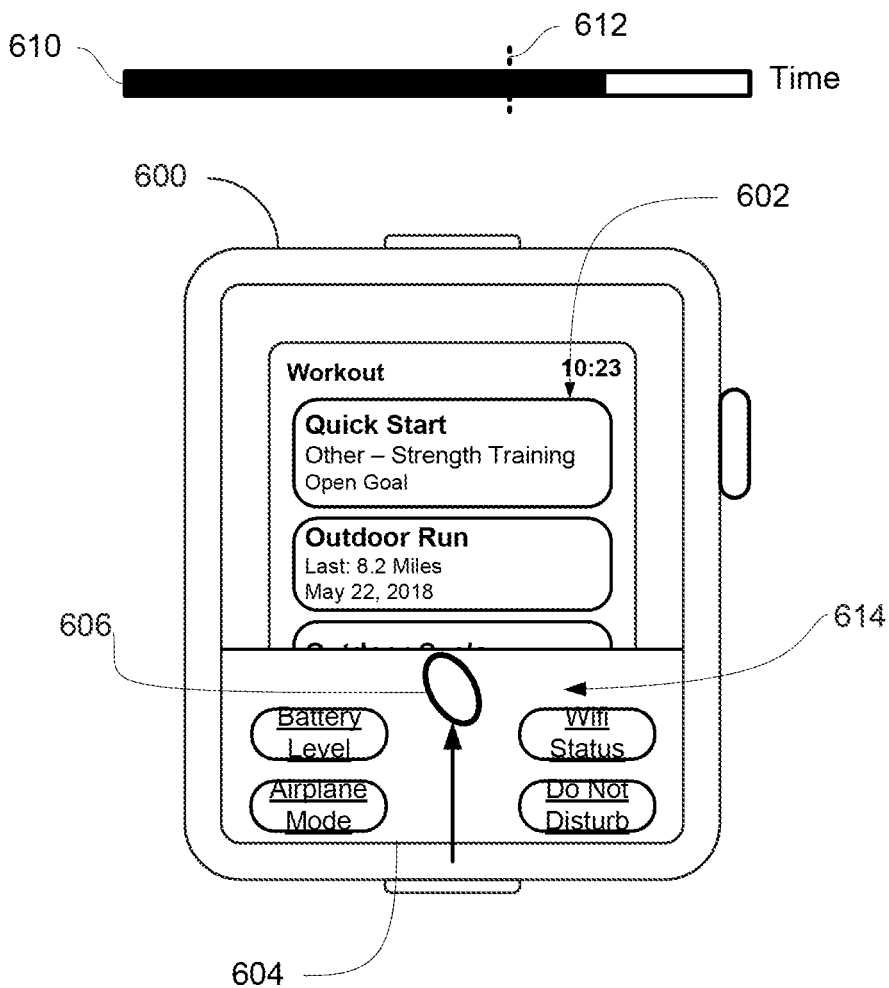
Figure 6E:
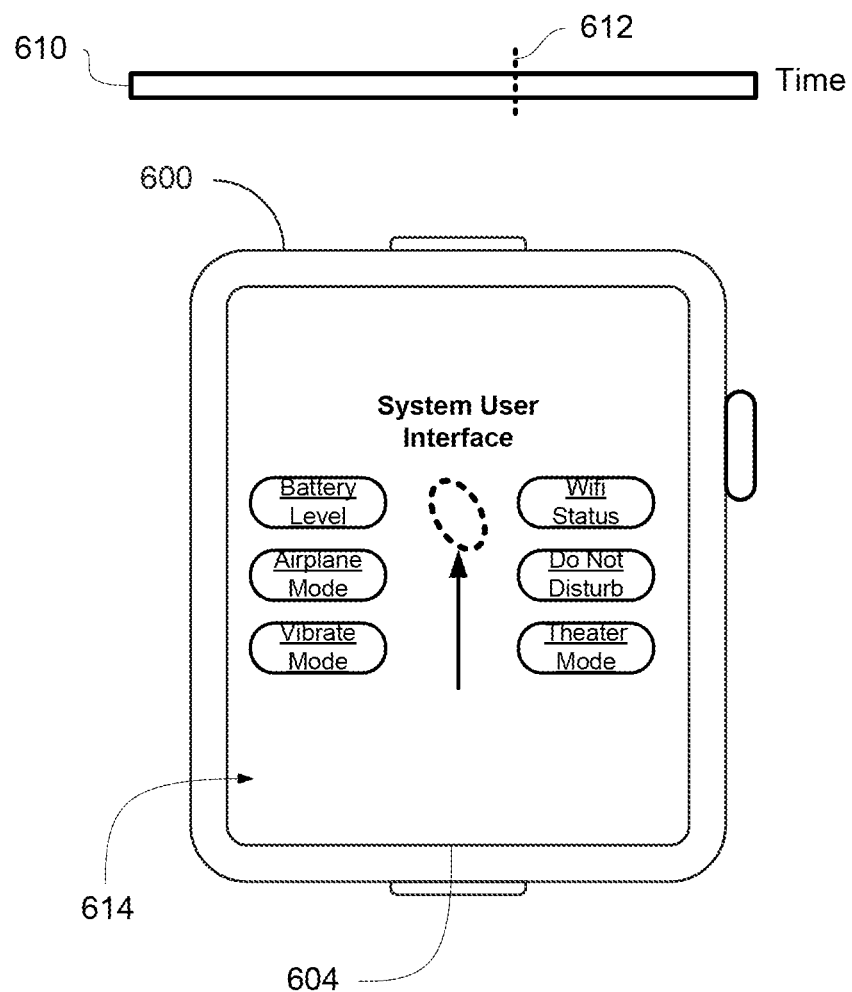
Figure 6F:
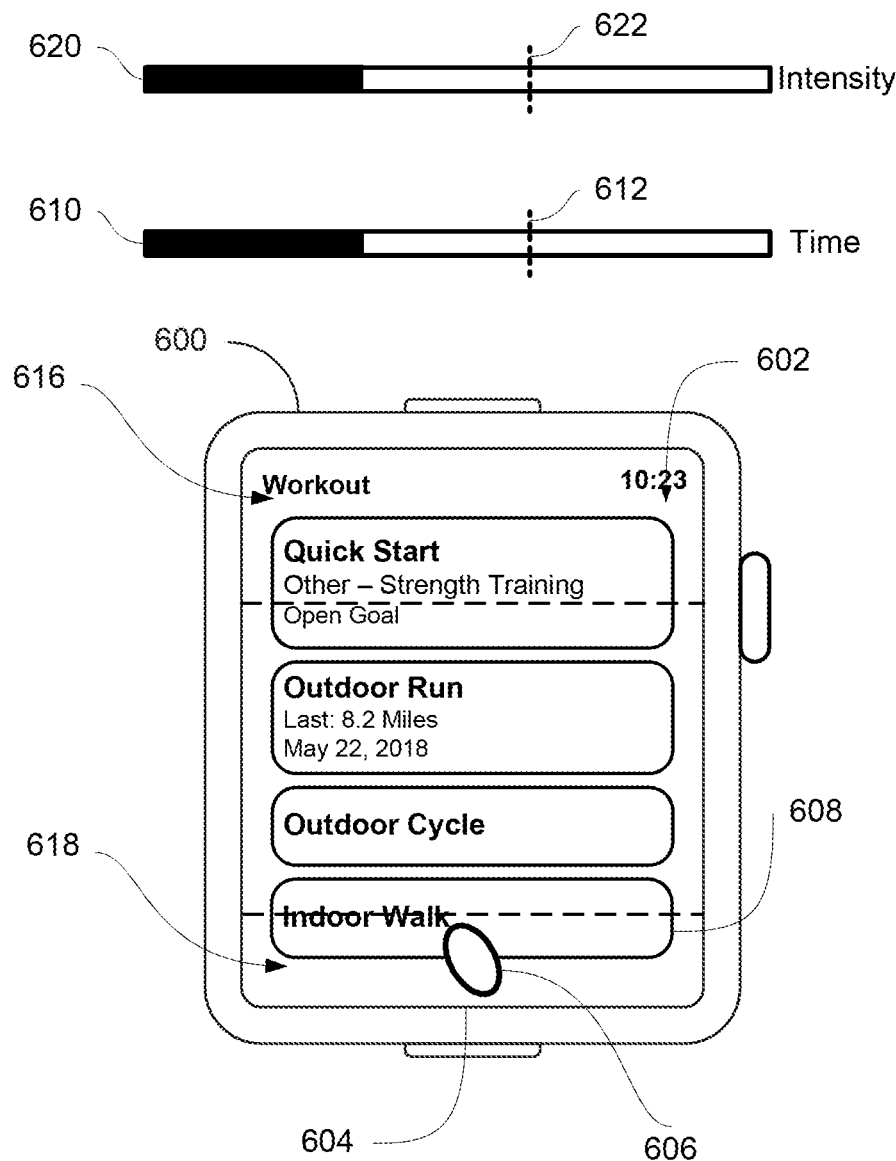
Figure 6G:
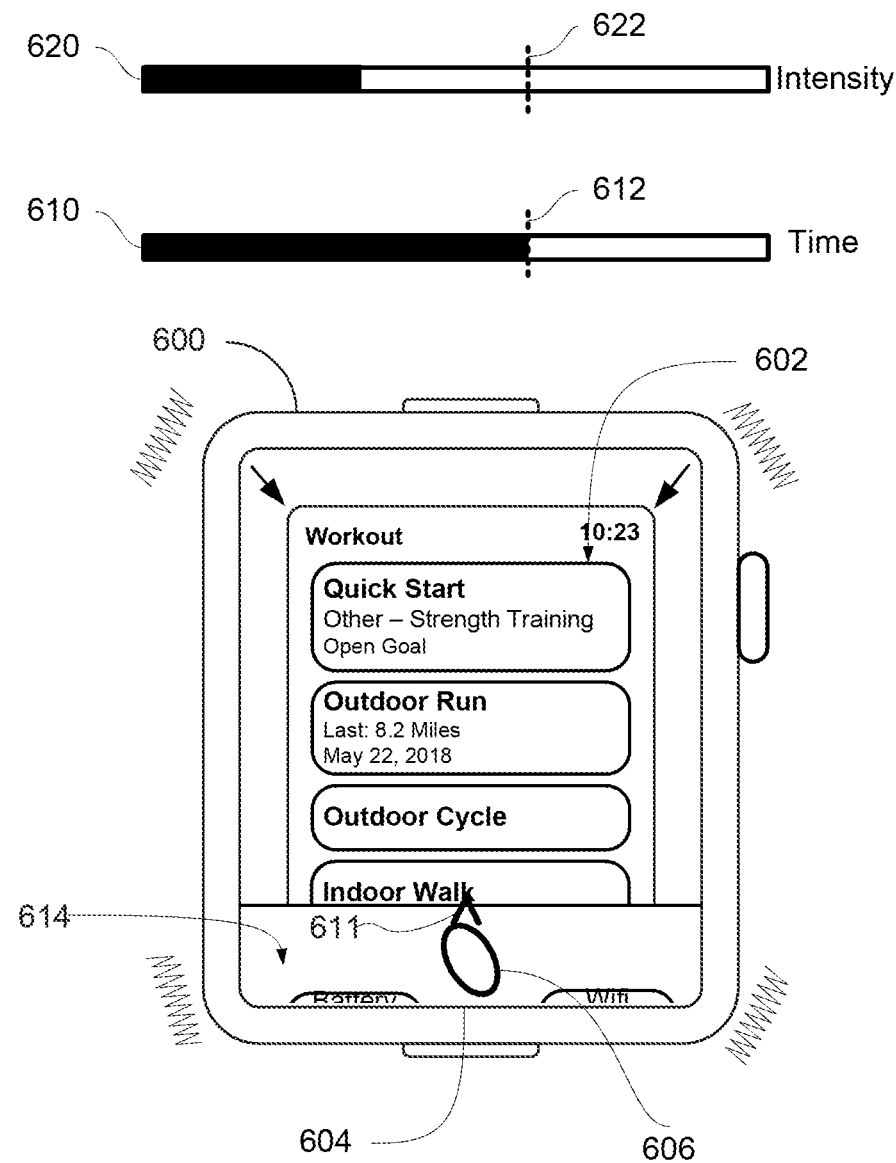
Figure 6H:
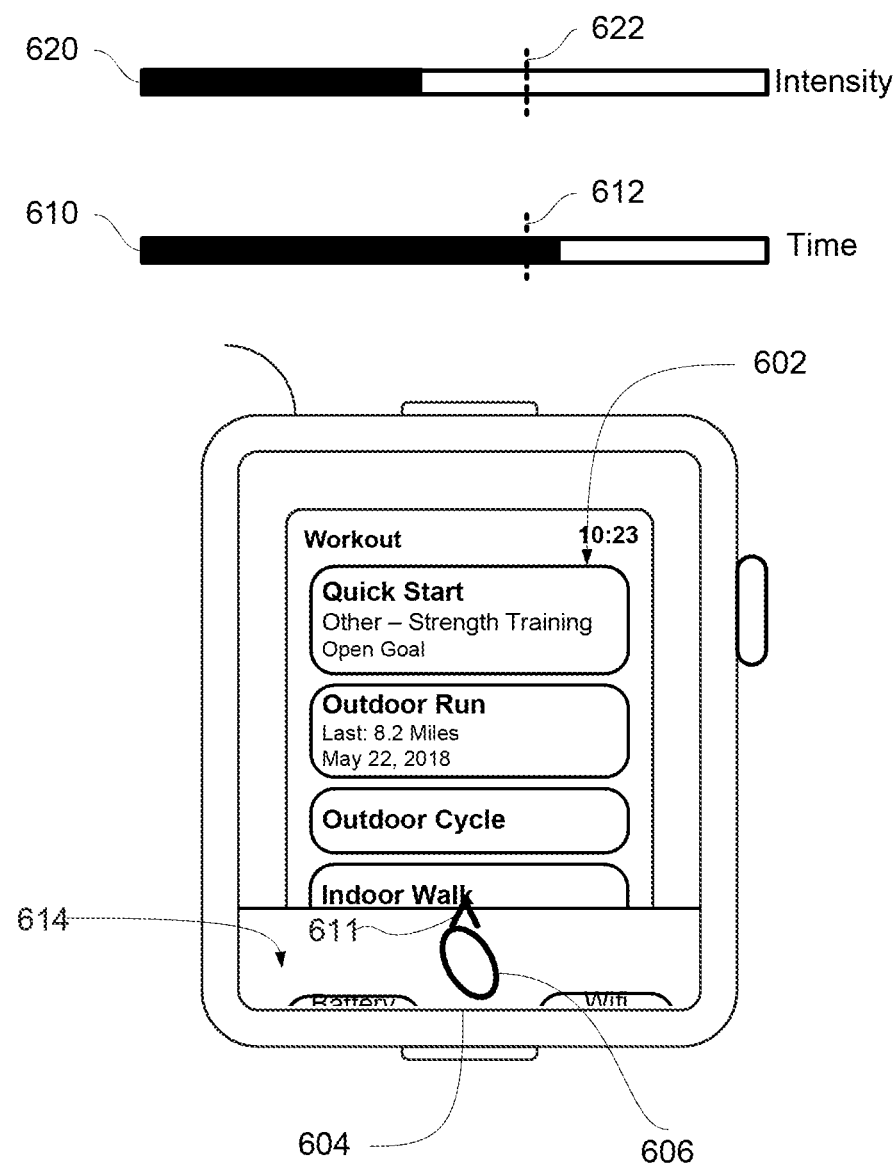
Figure 6I:
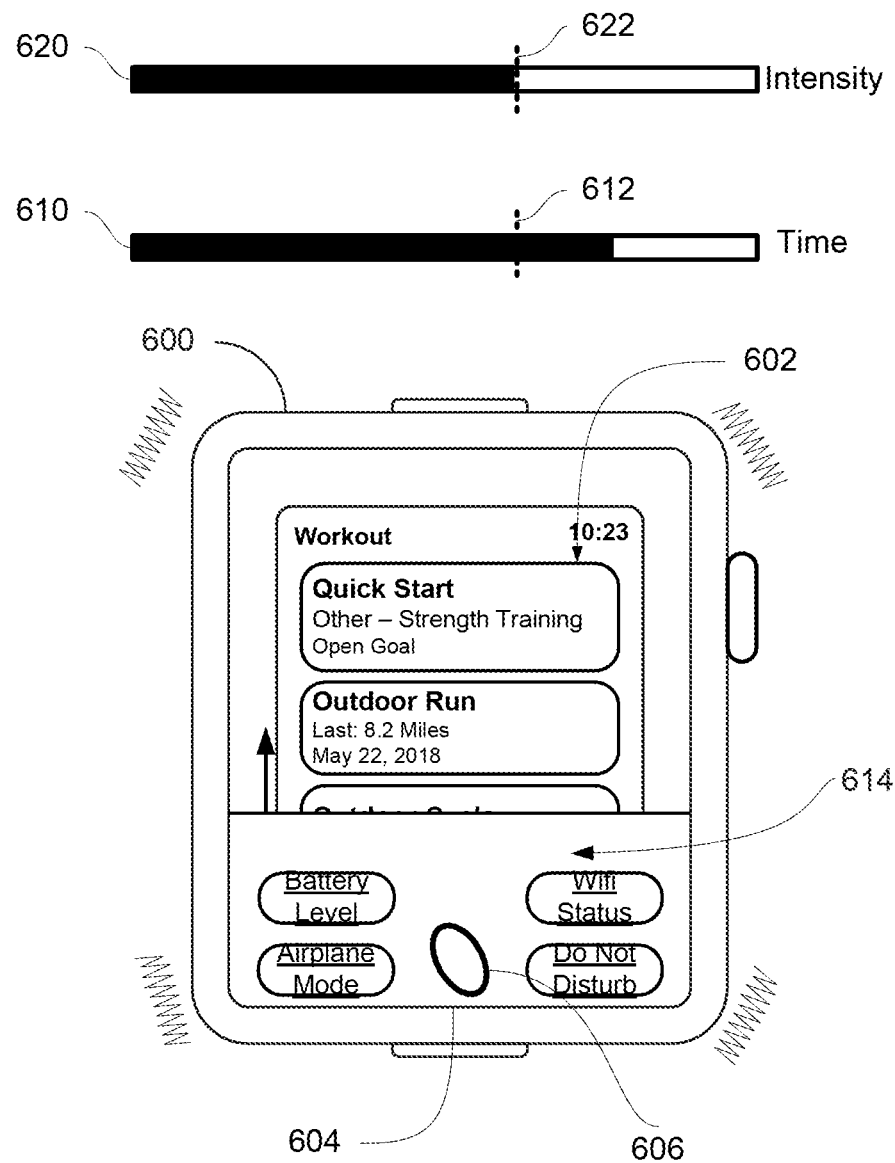
Figure 6J:
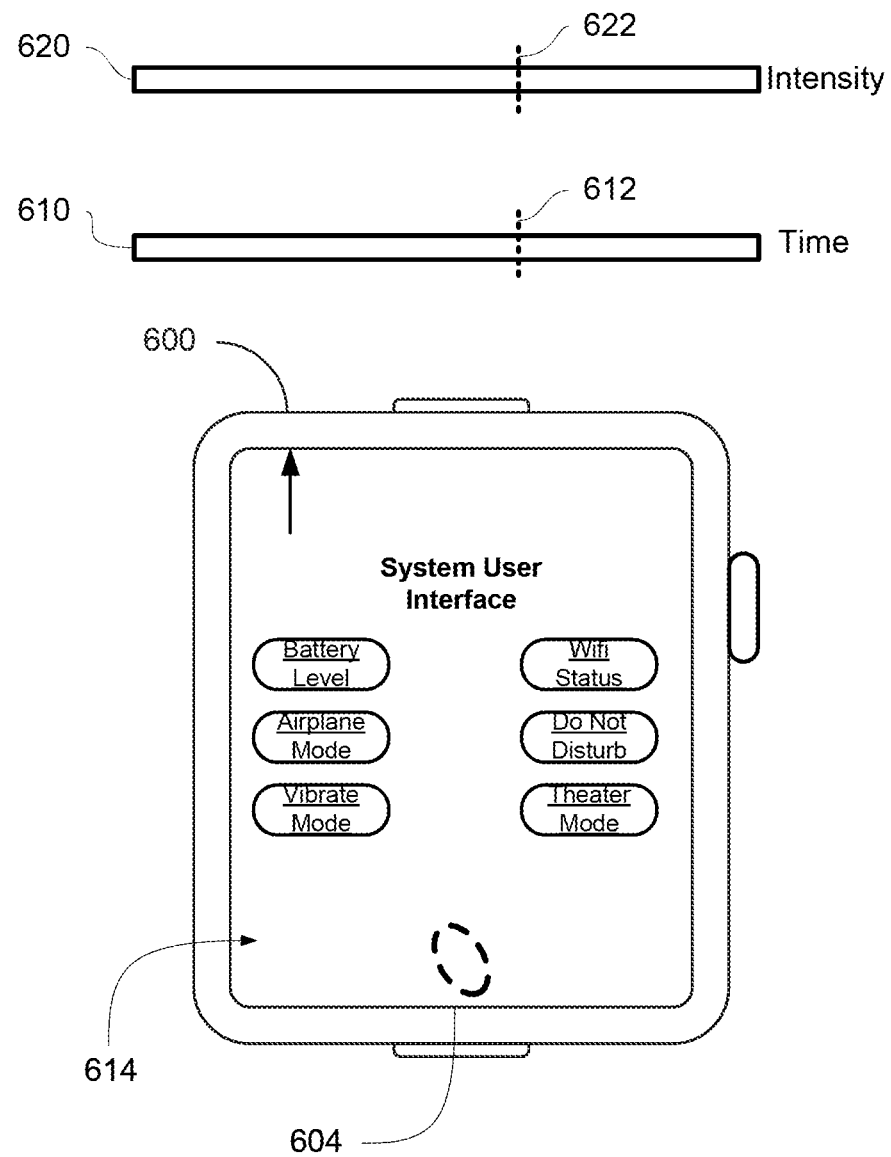
Figure 6K:
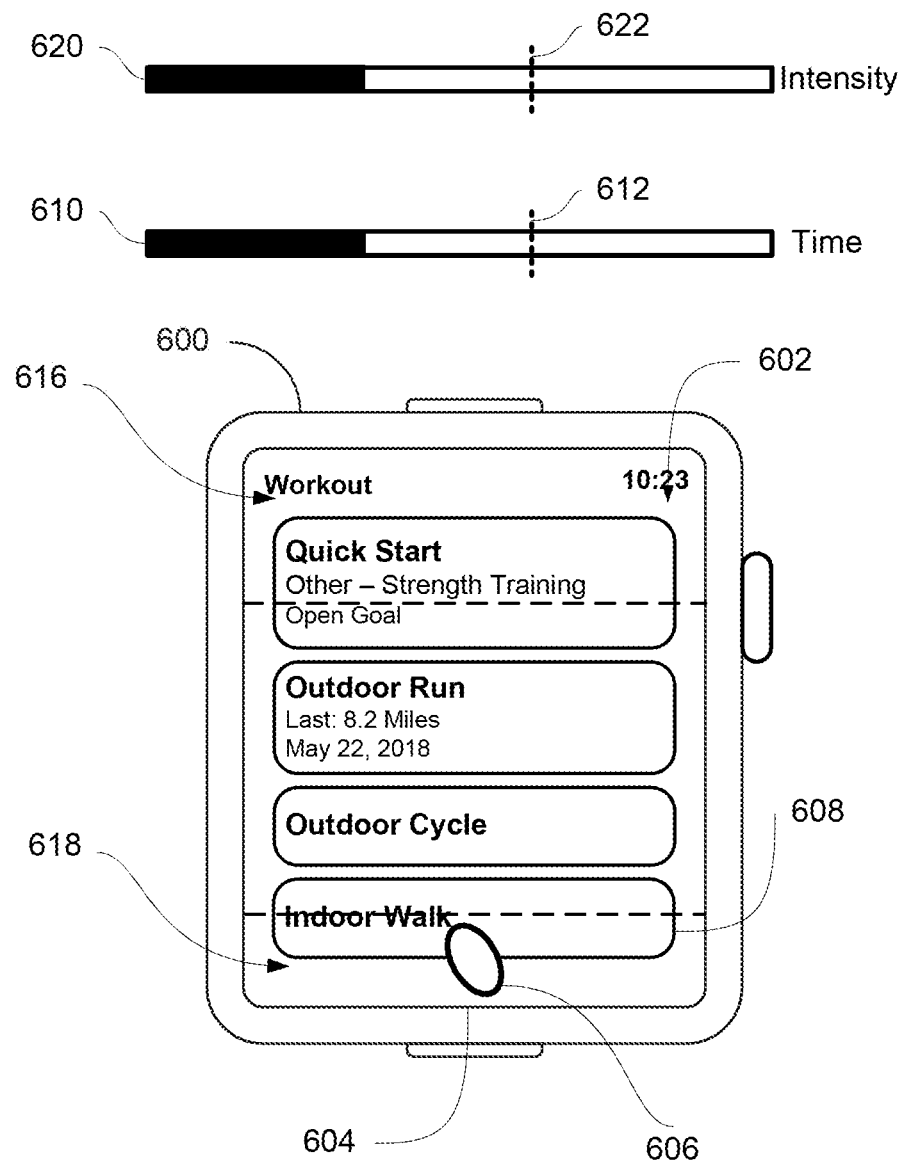
Figure 6L:
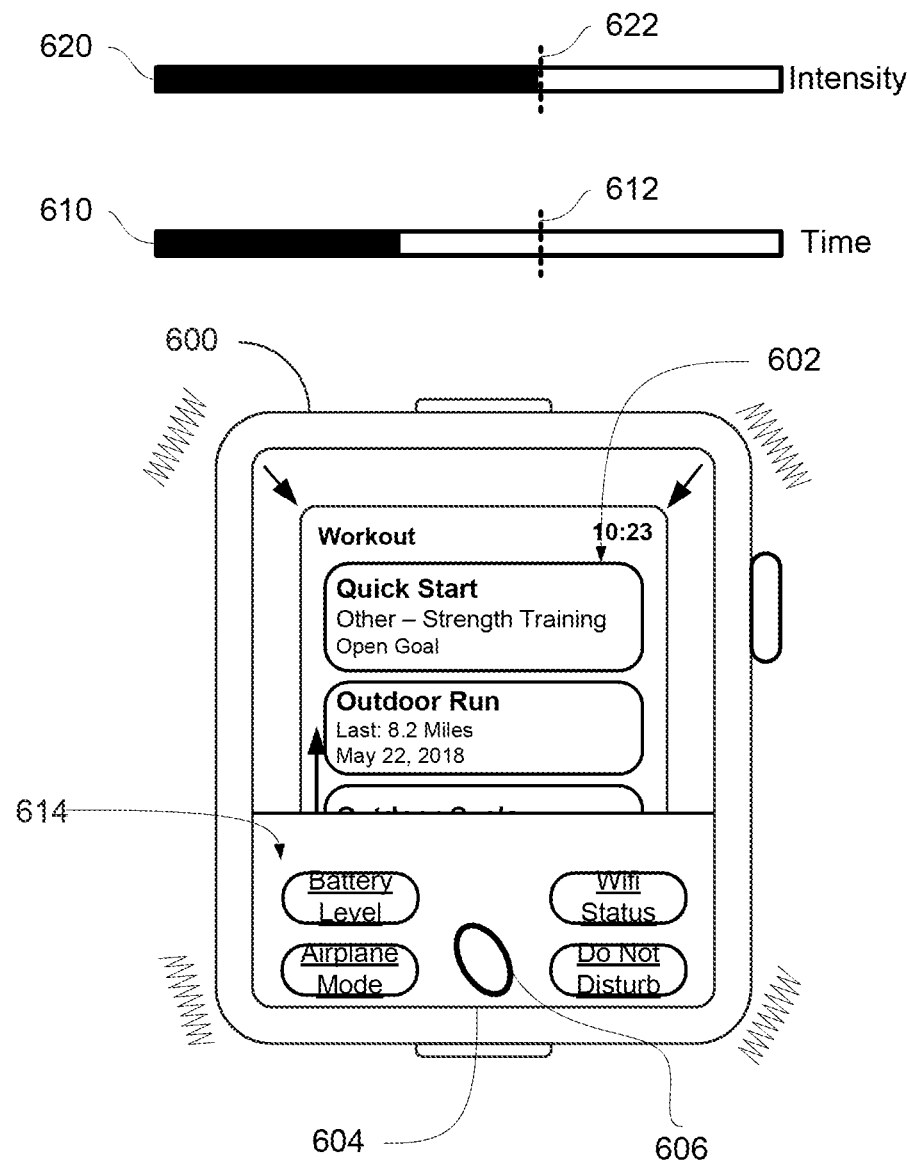
Figure 6M:
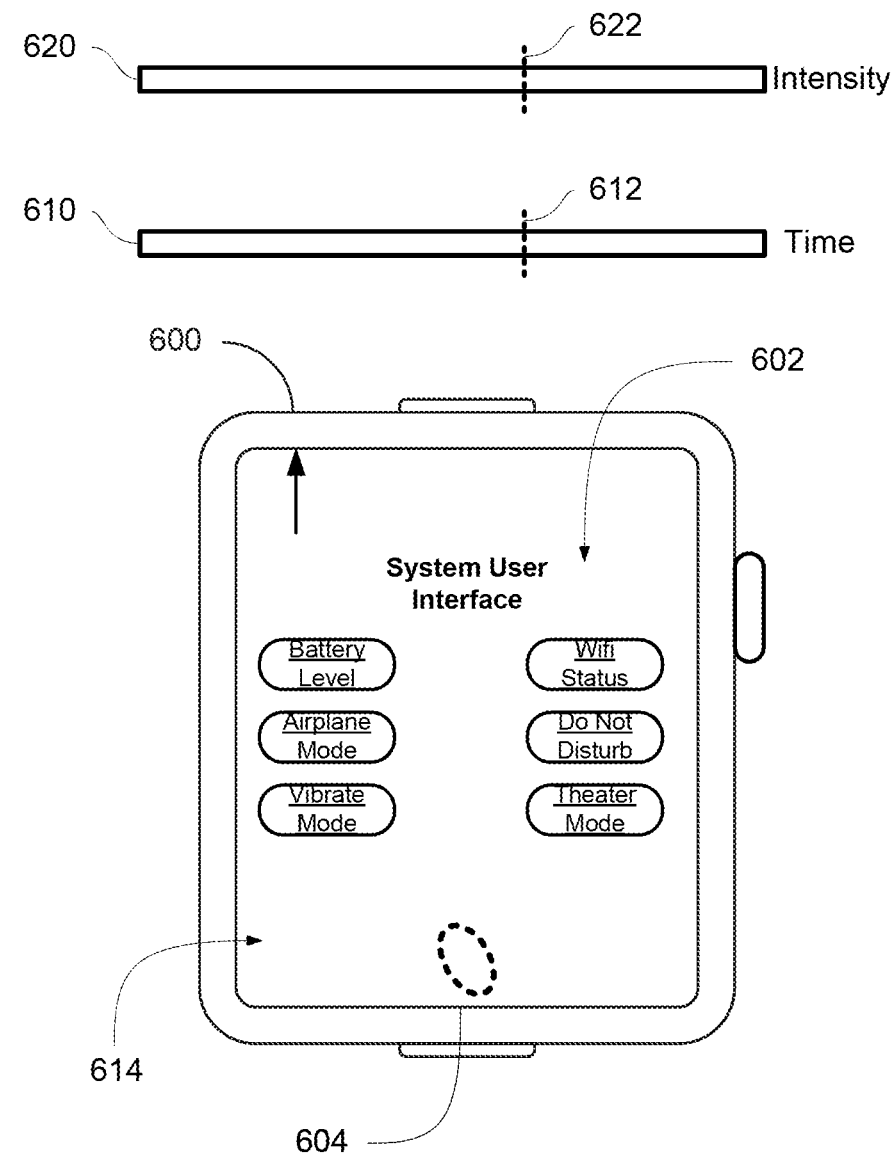
Figure 6N:
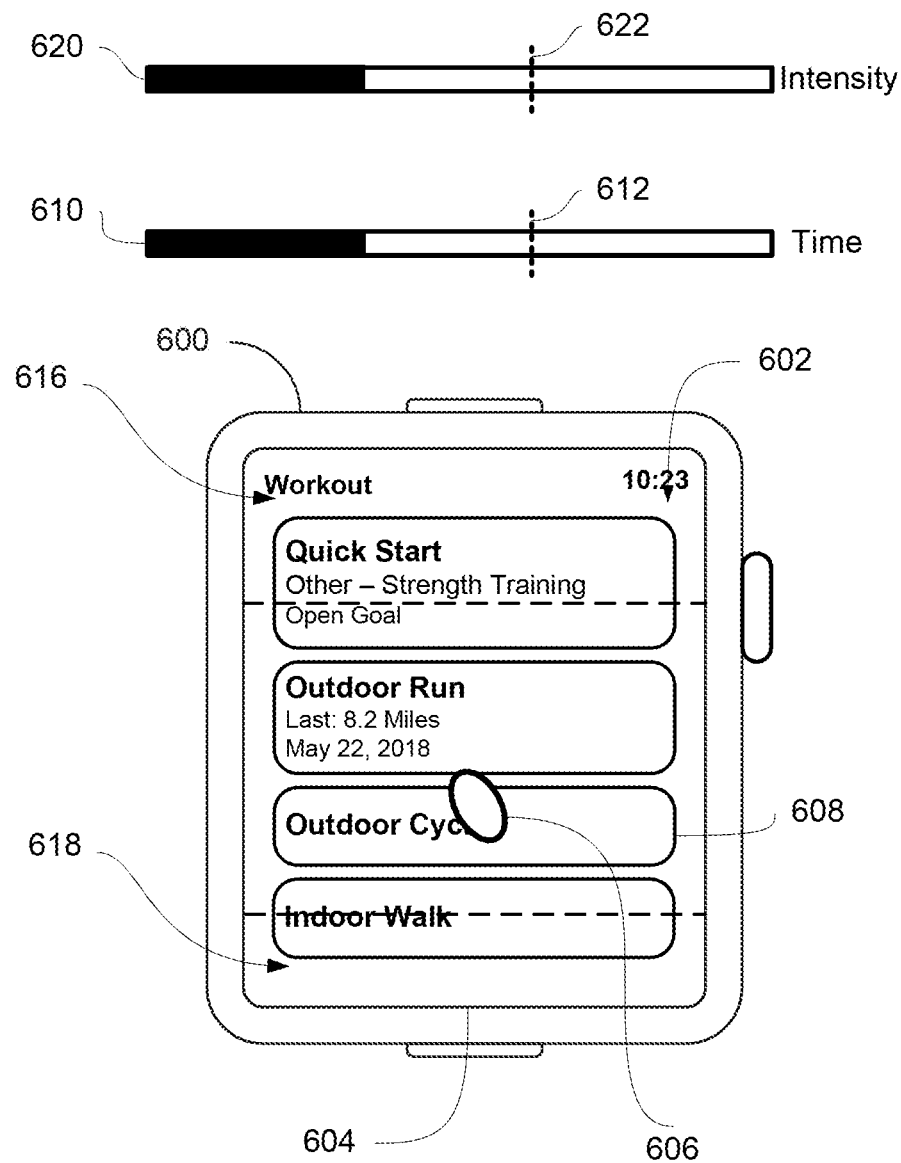
Figure 6O:
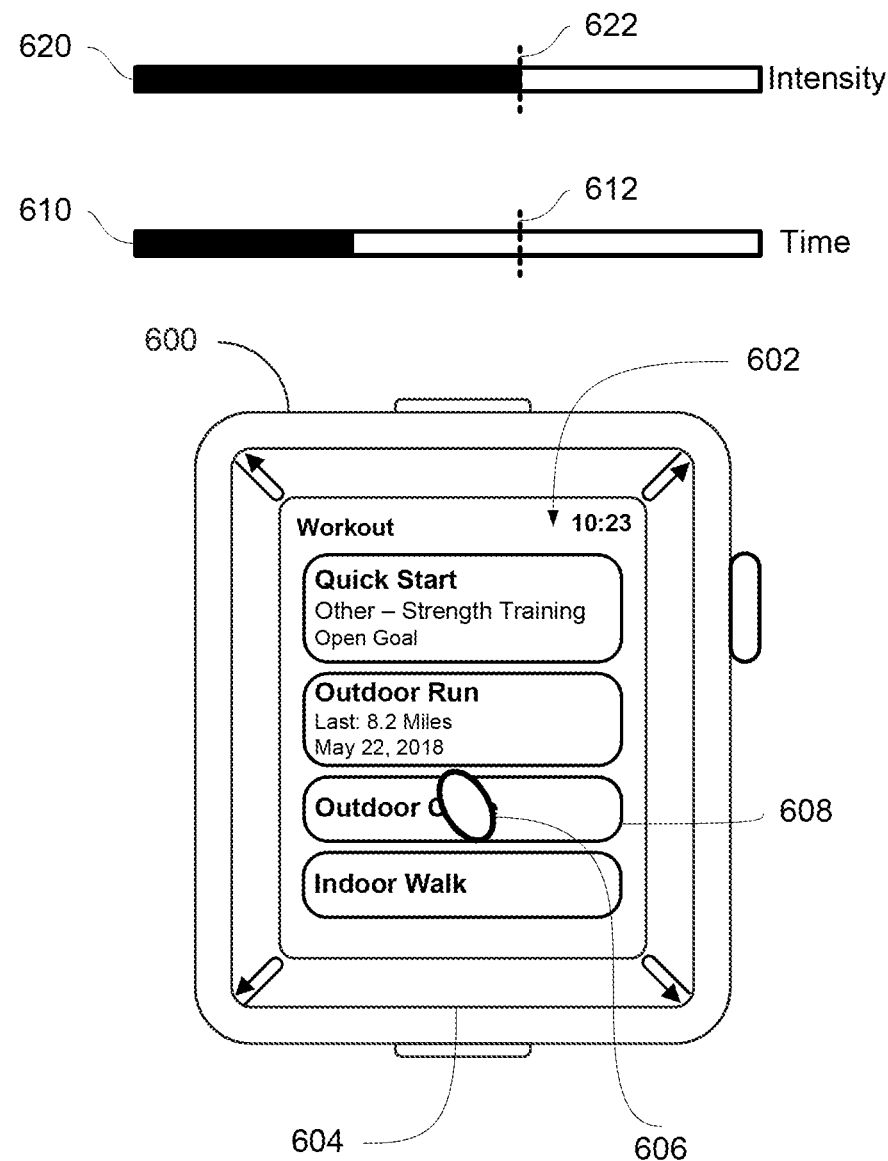
Figure 6P:
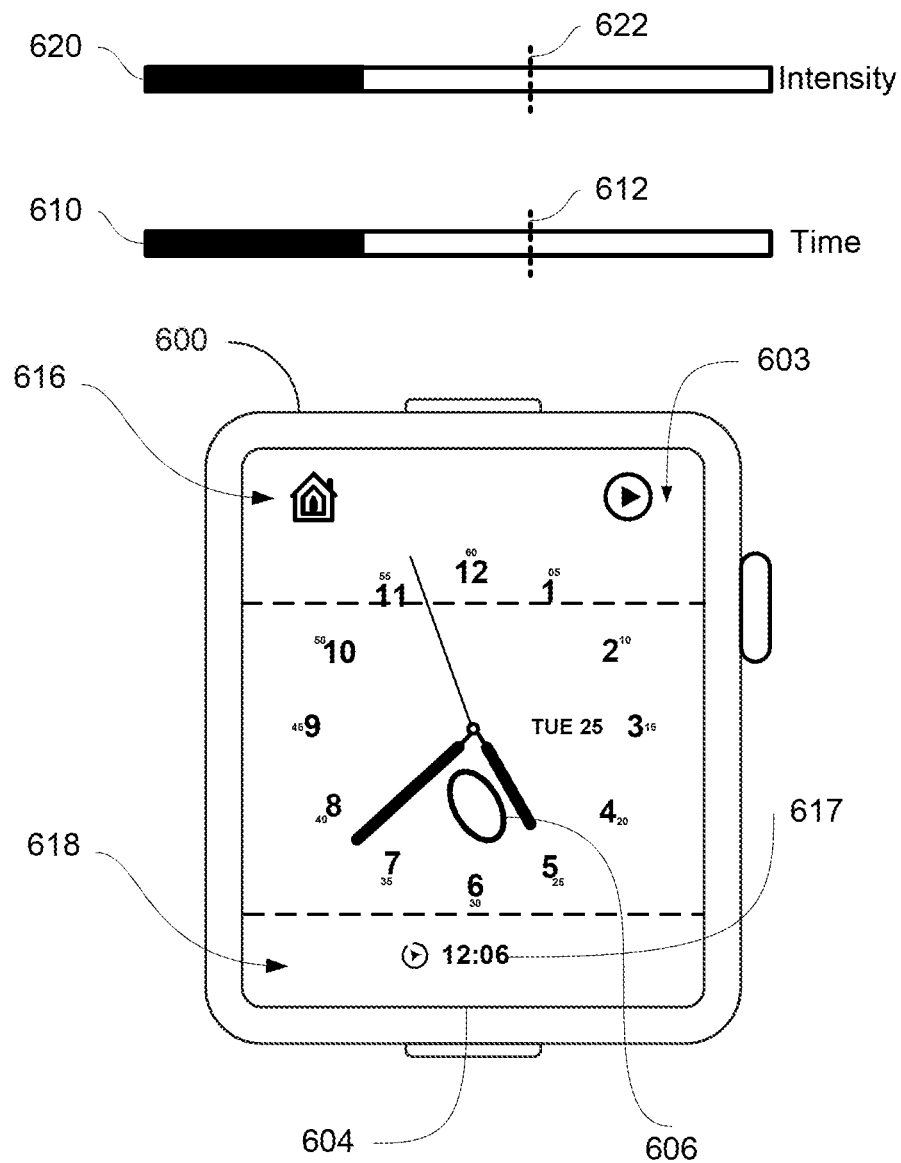
Figure 6Q:
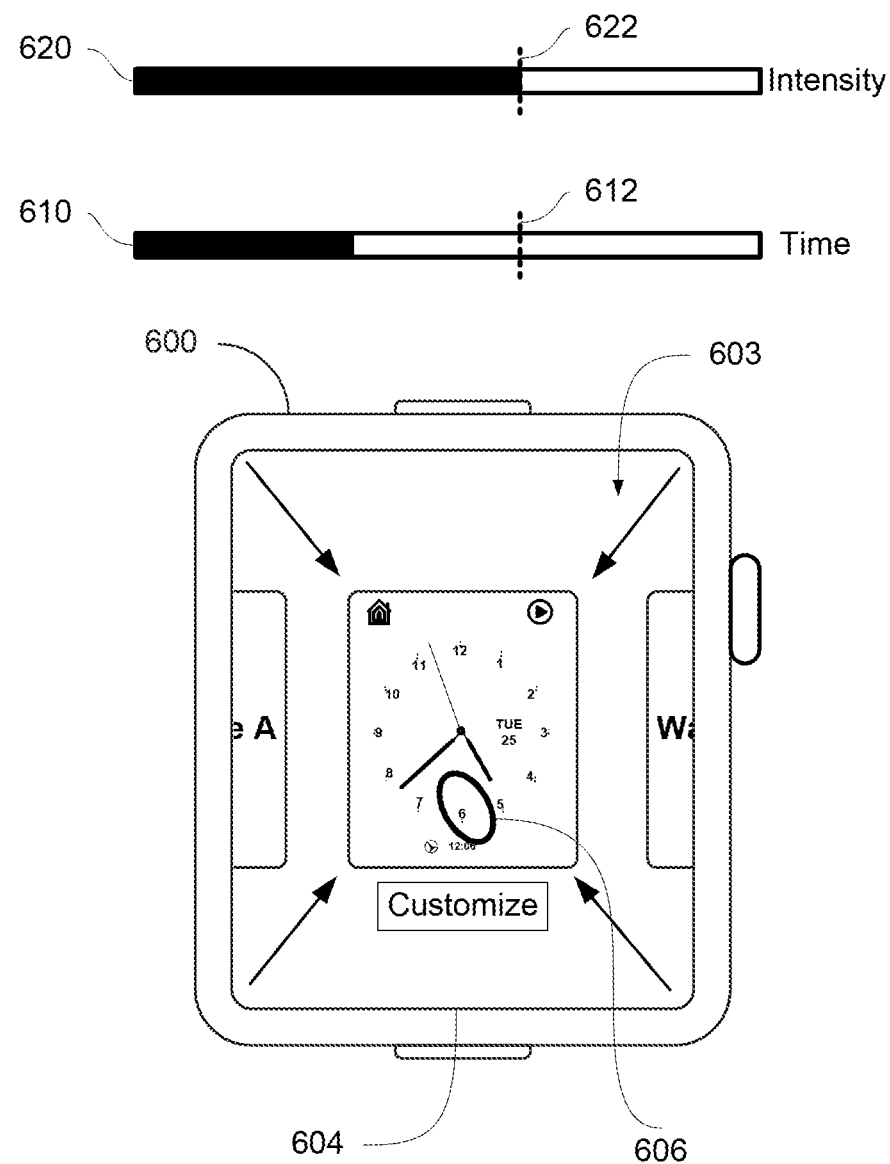
Figure 6R:
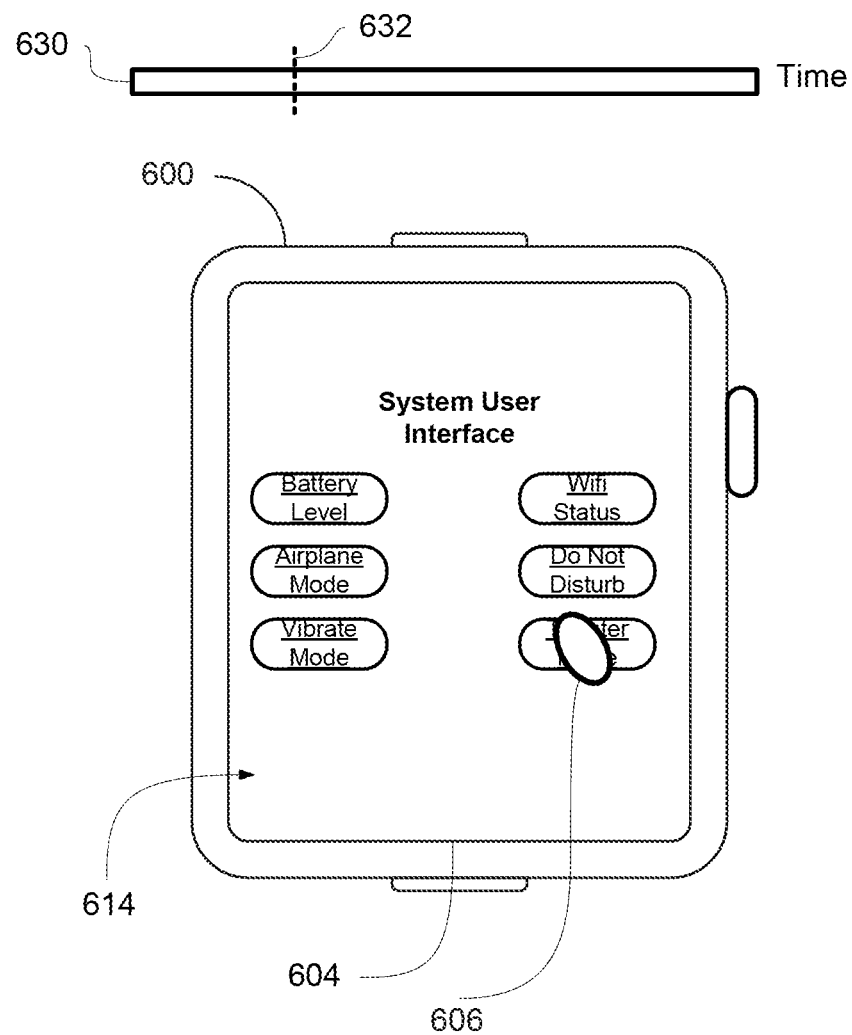
Figure 6S:
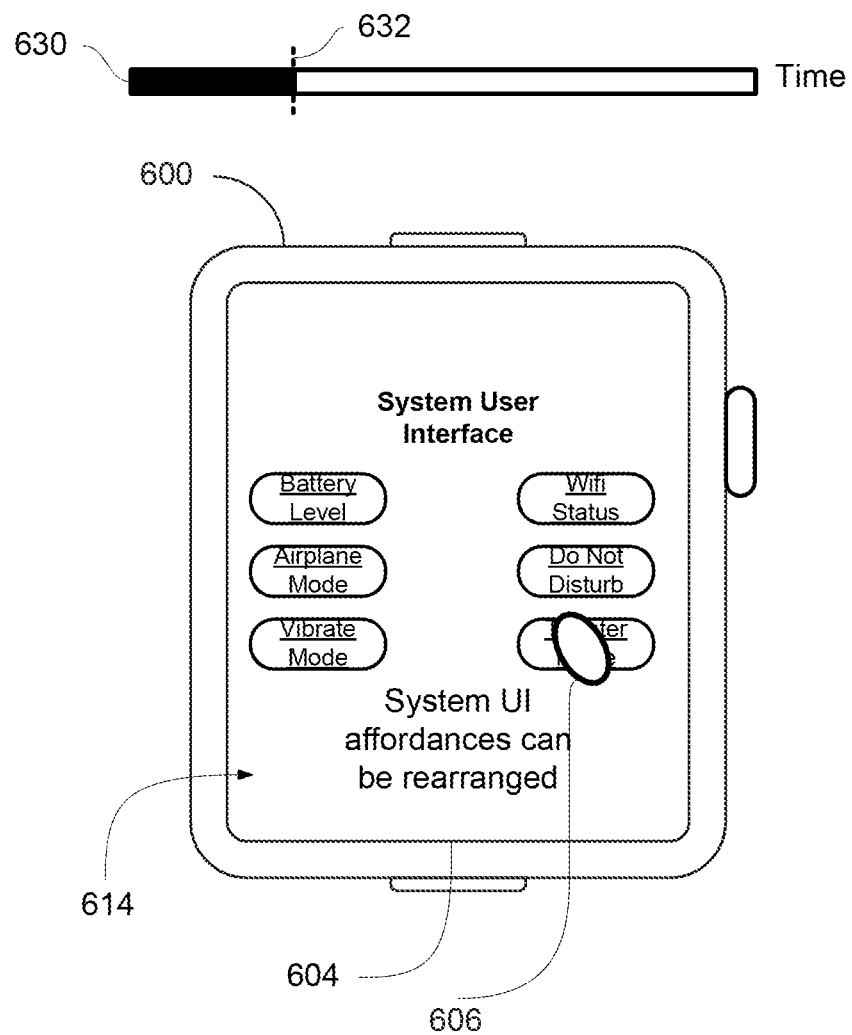
Figure 6T:
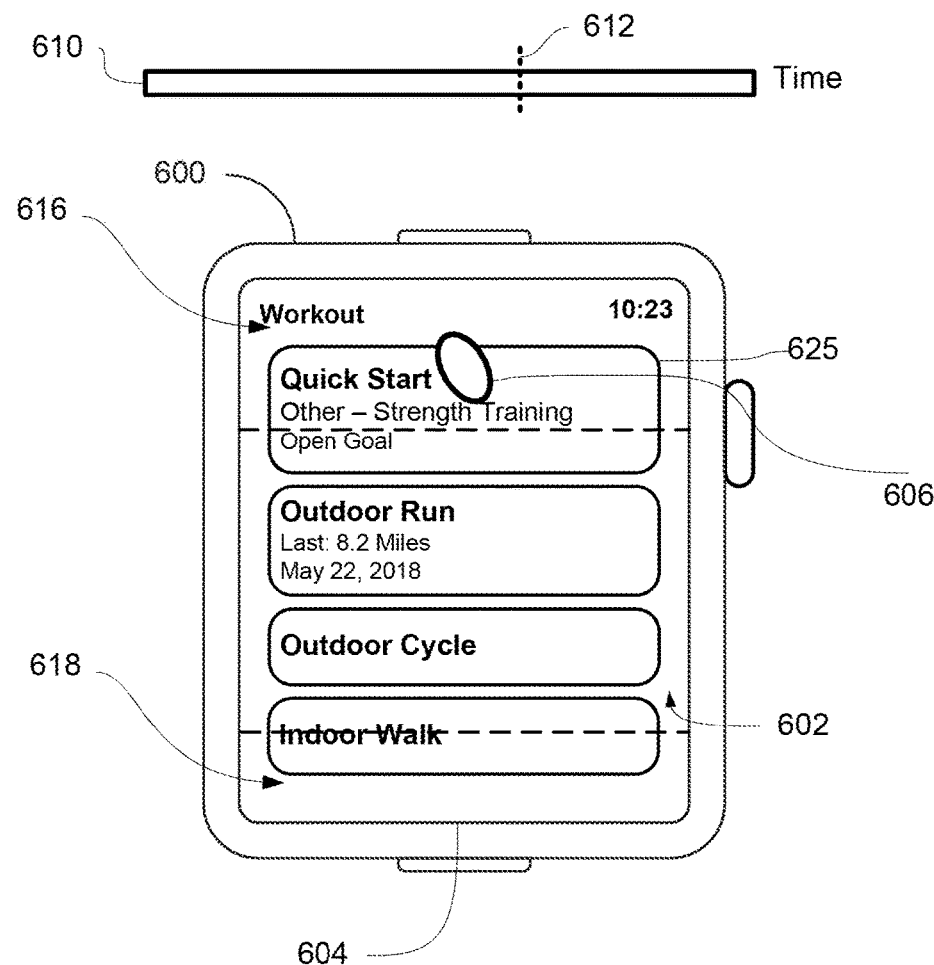
Figure 6U:
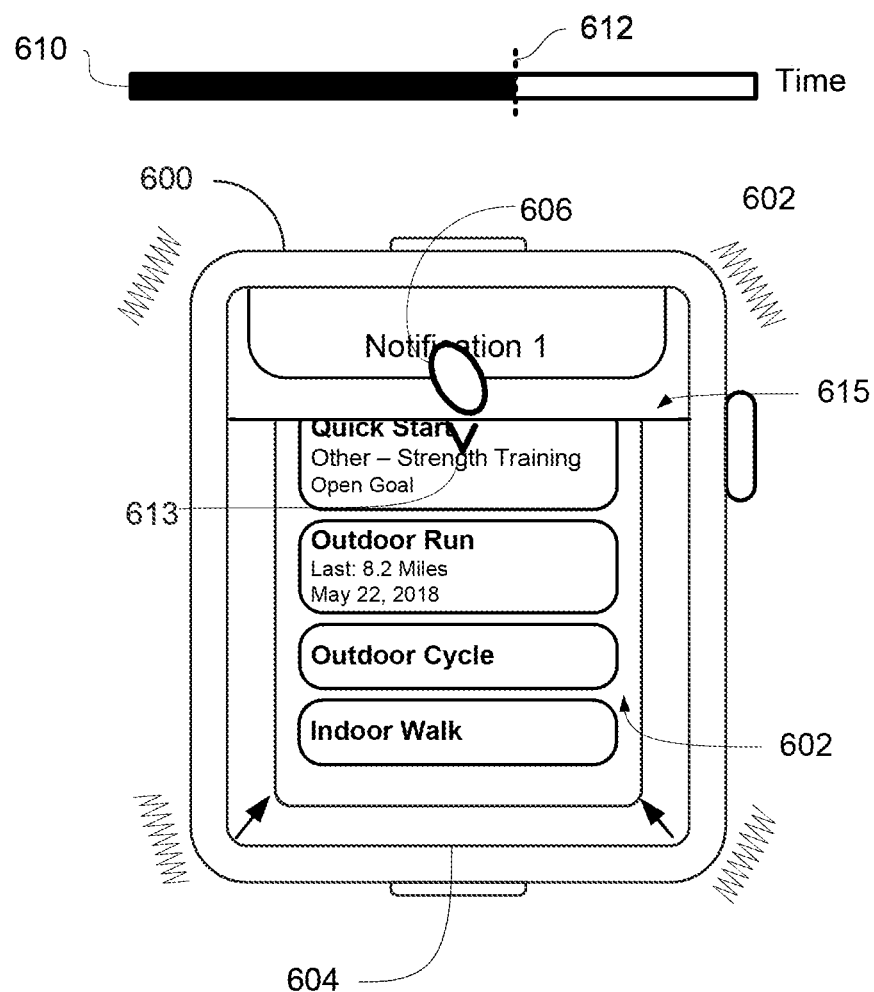
Figure 6V:
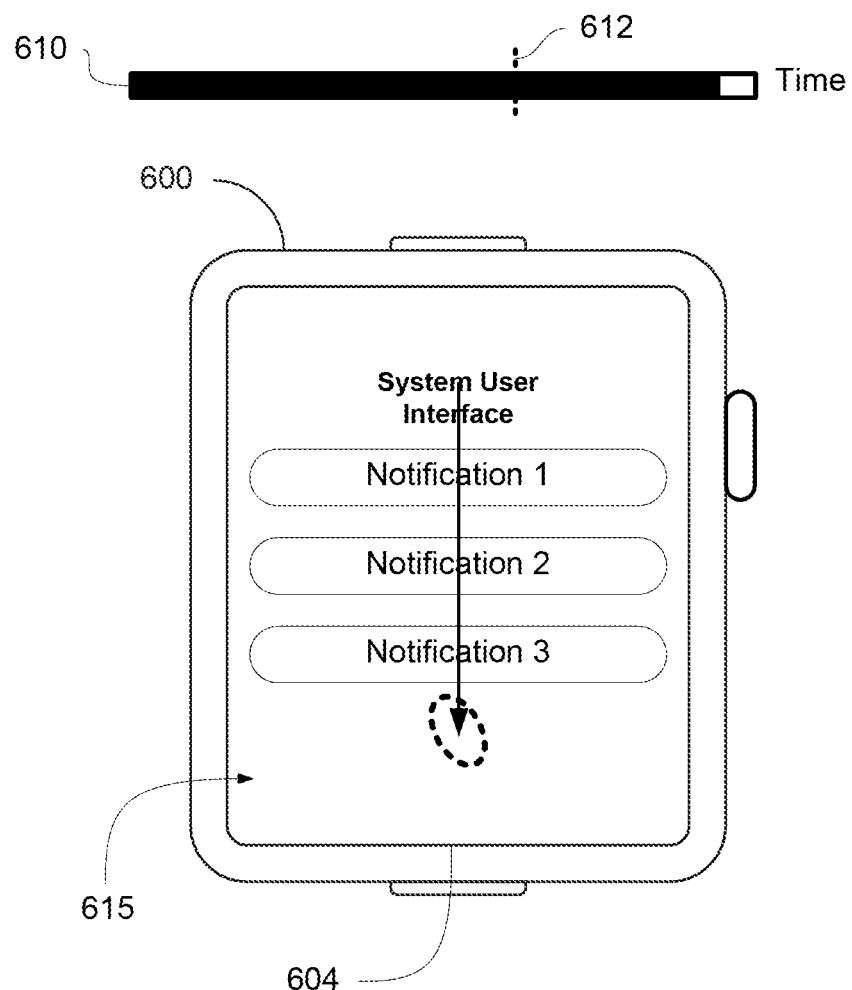
Figure 6W:
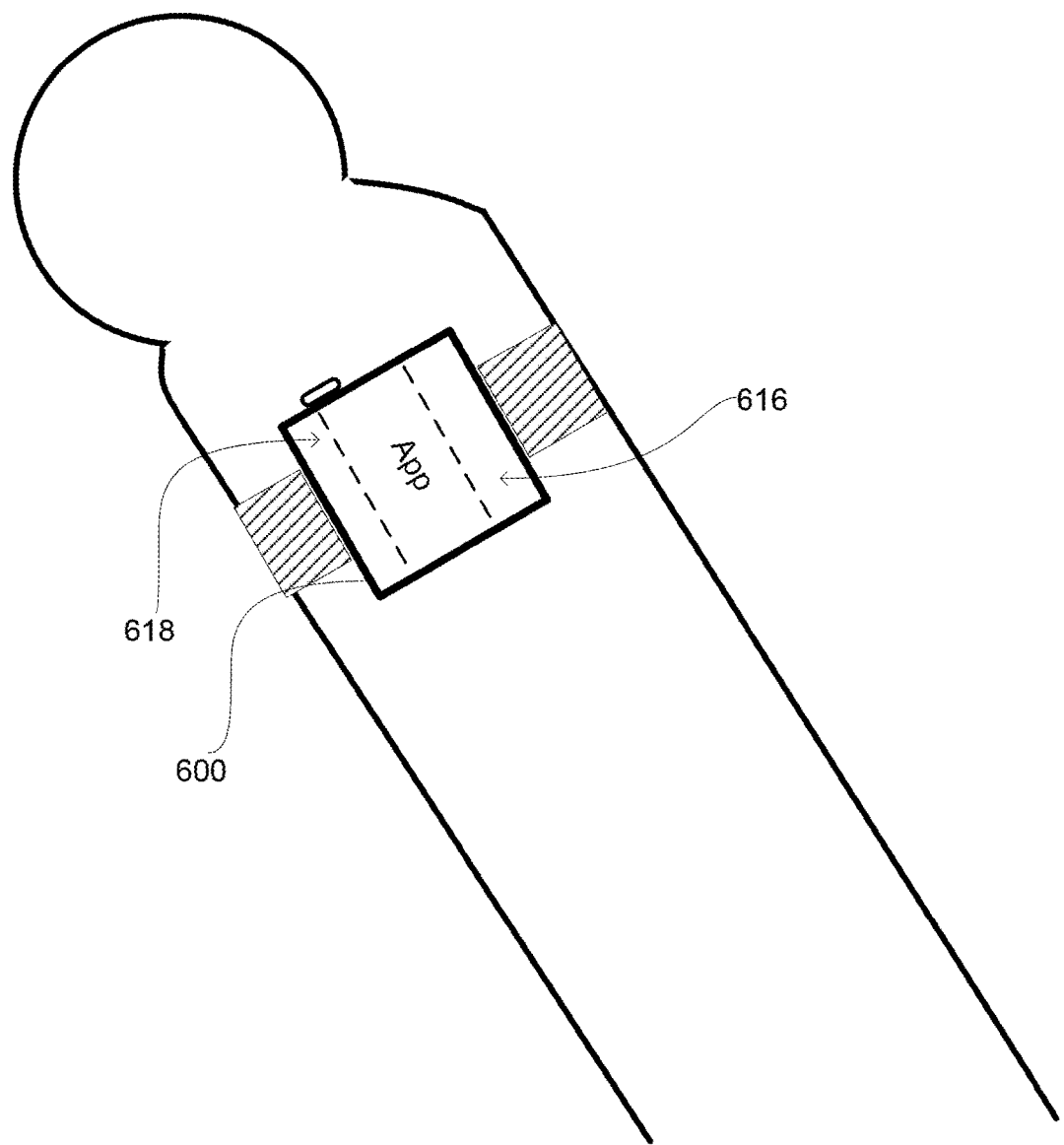
Figure 6X:
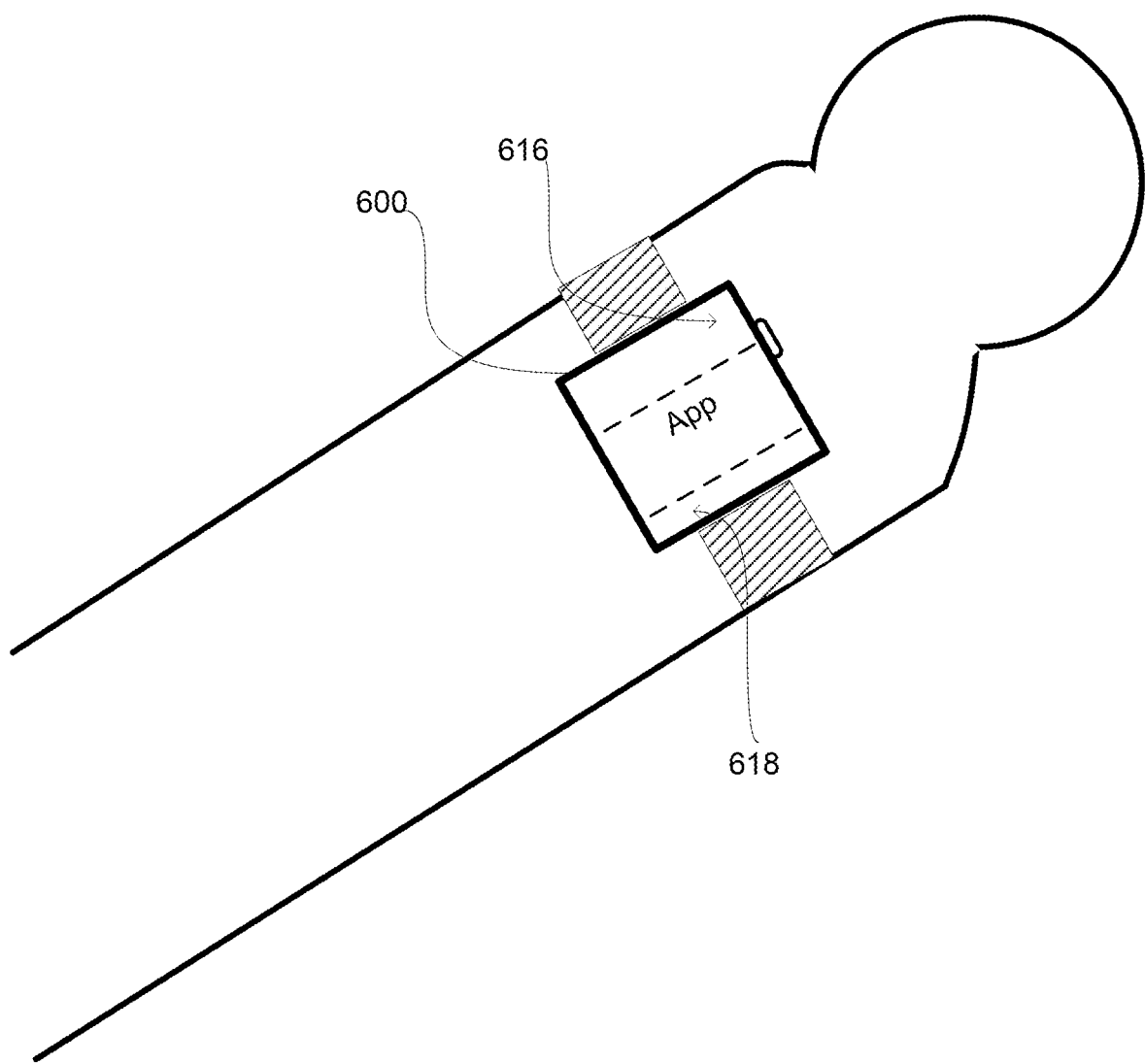
Figure 7A:
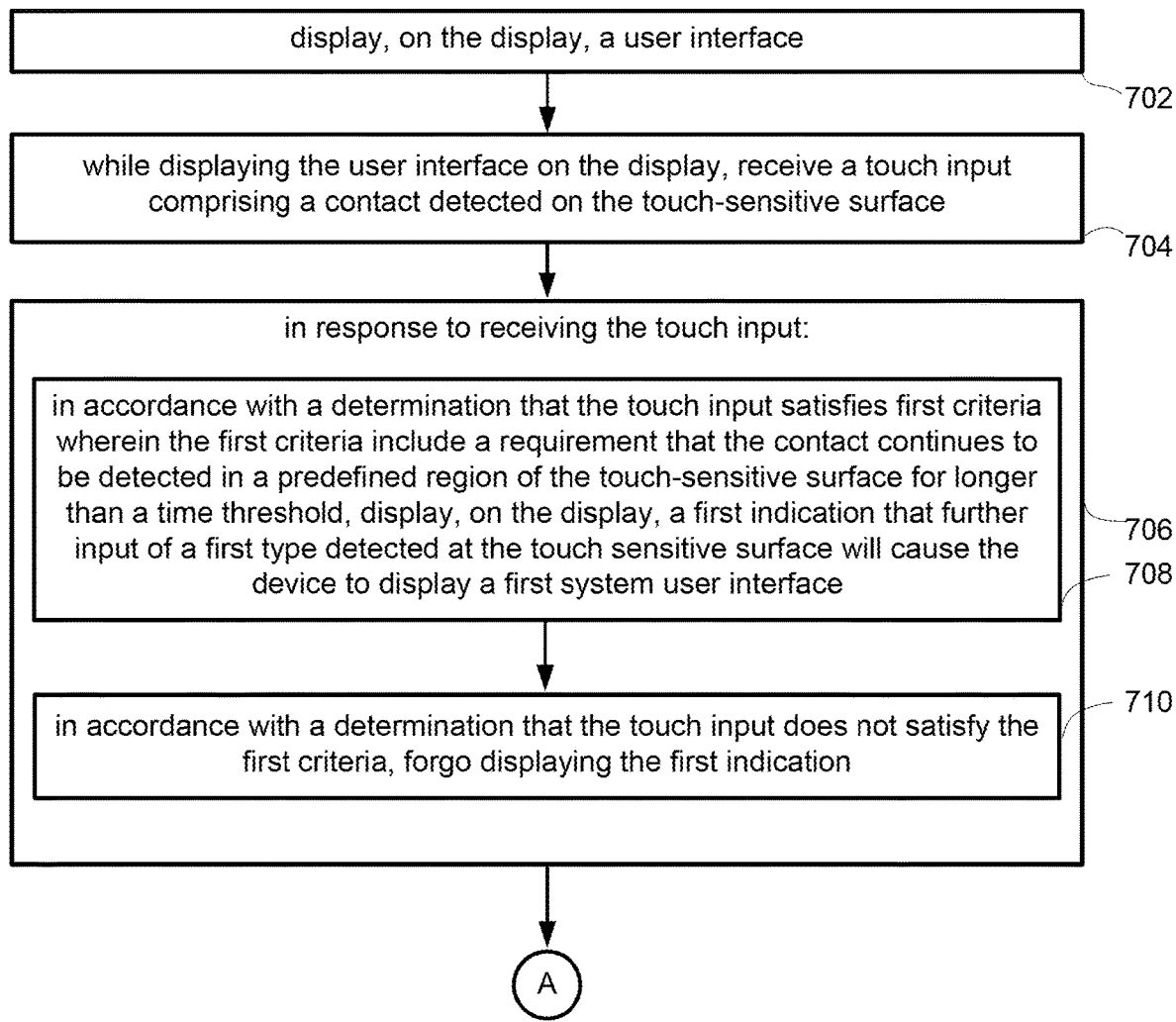
FIGS. 7A-7H are flow diagrams illustrating a method of providing access to a system user interface in response to touch inputs received in an application user interface or a wake screen user interface, in accordance with some embodiments of the disclosure.
Figure 7B:
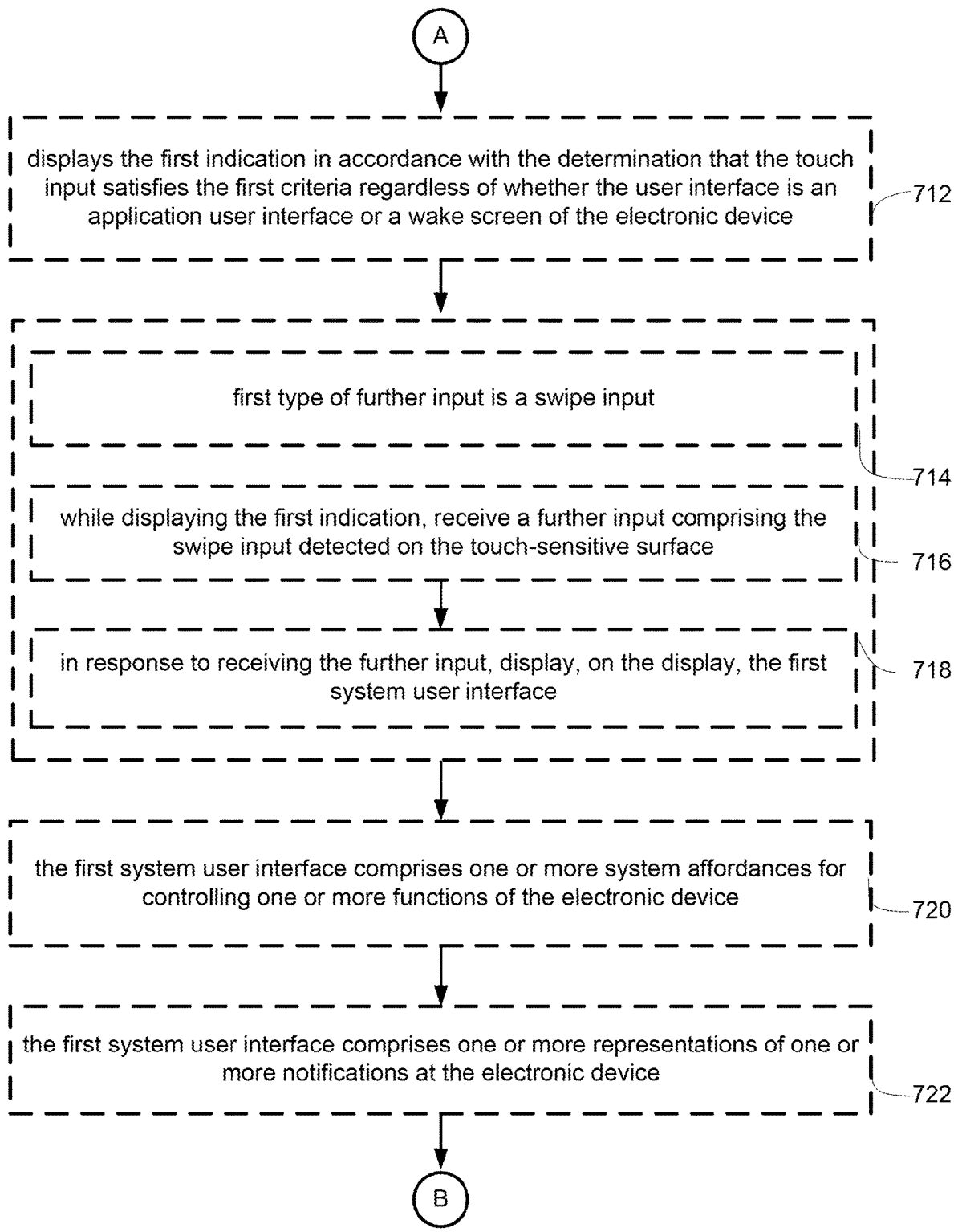
Figure 7C:
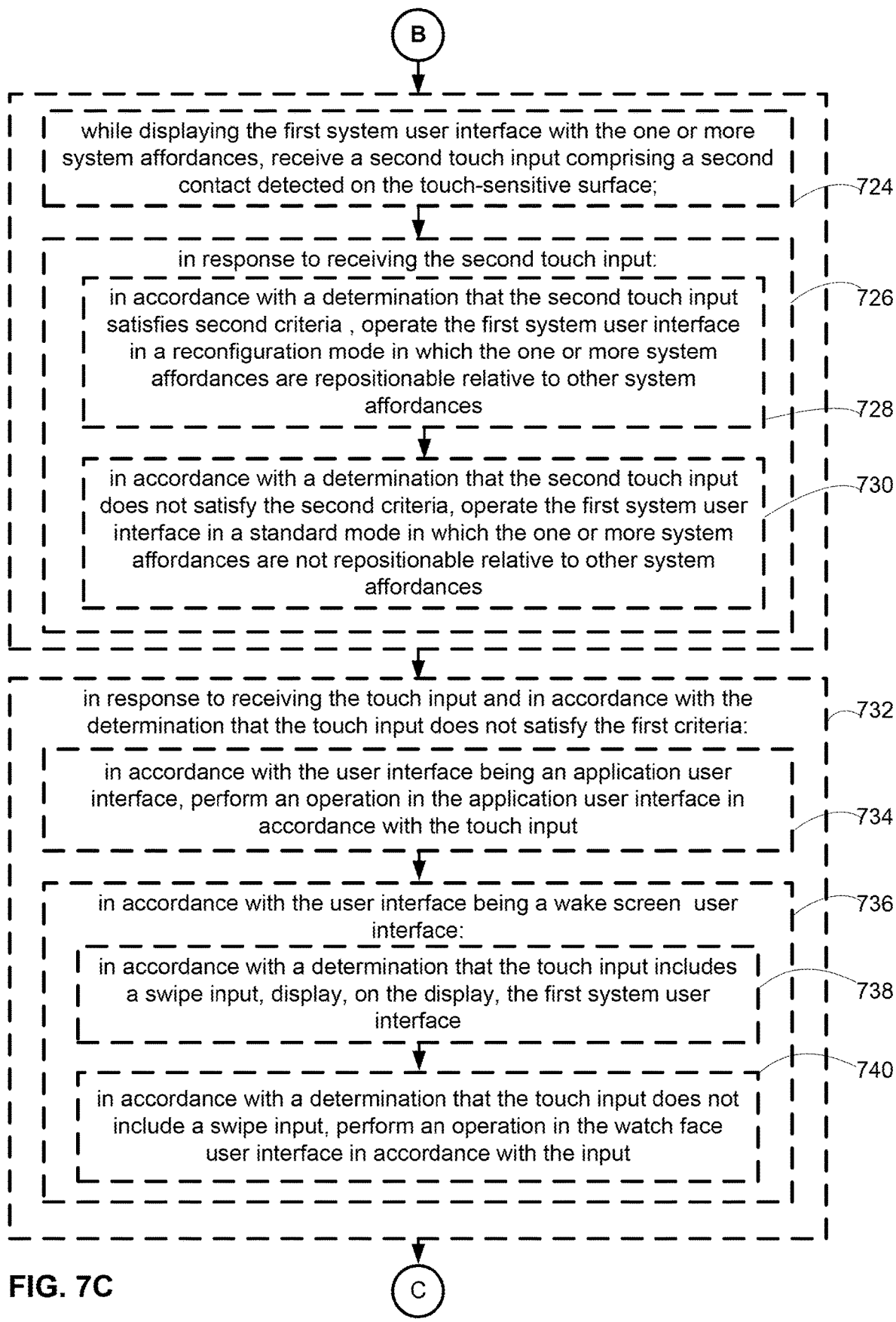
Figure 7D:
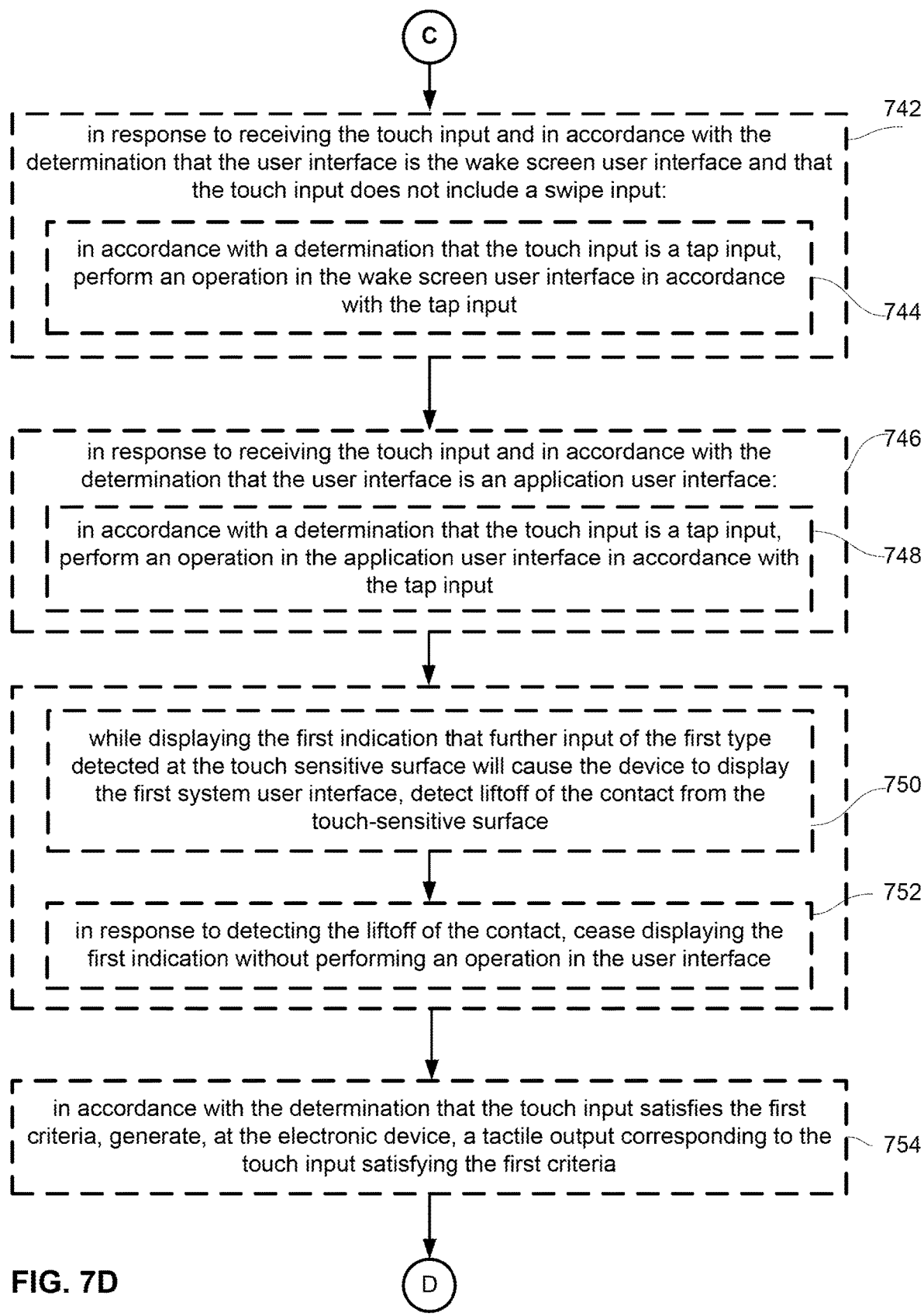
Figure 7E:
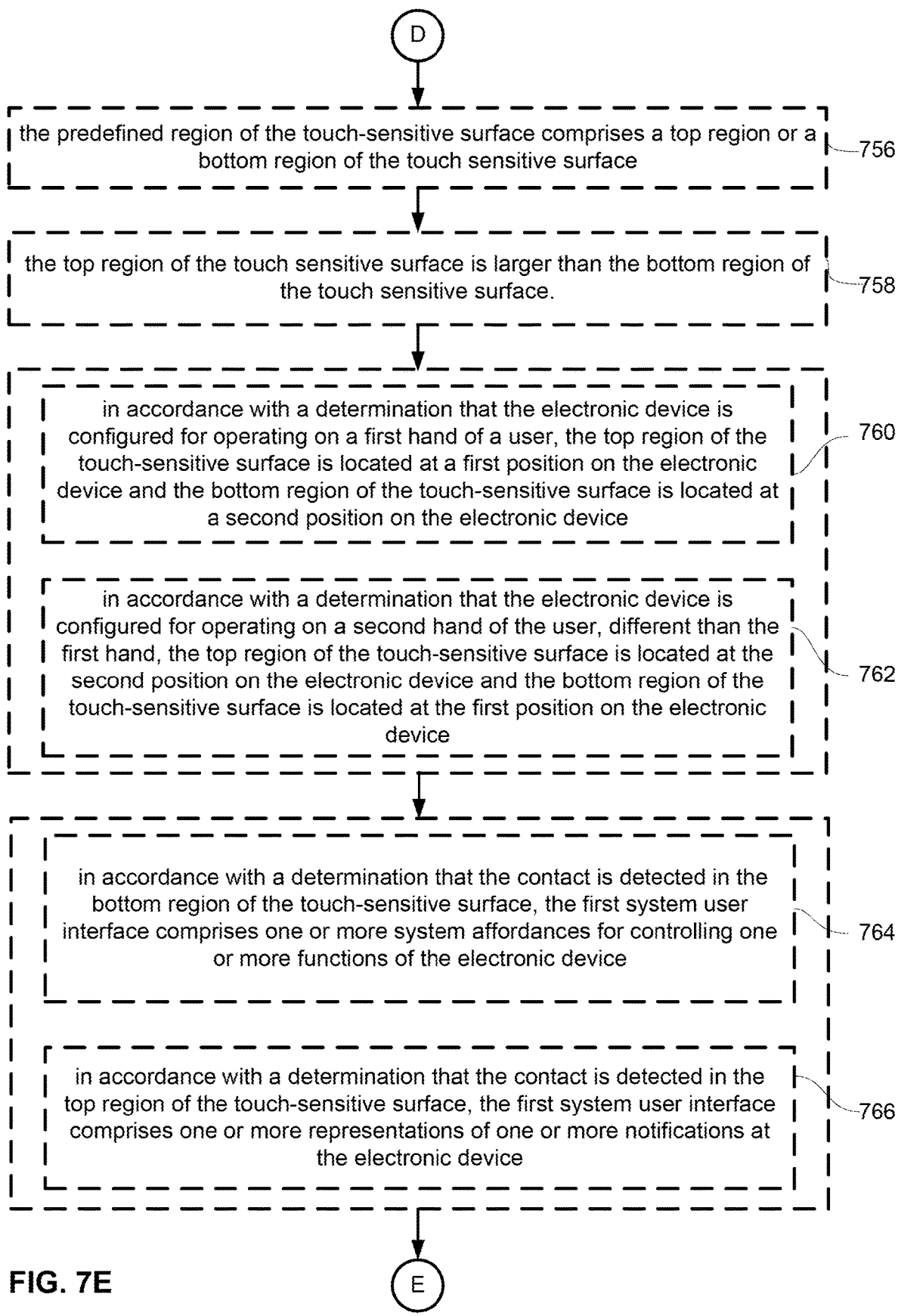
Figure 7F:
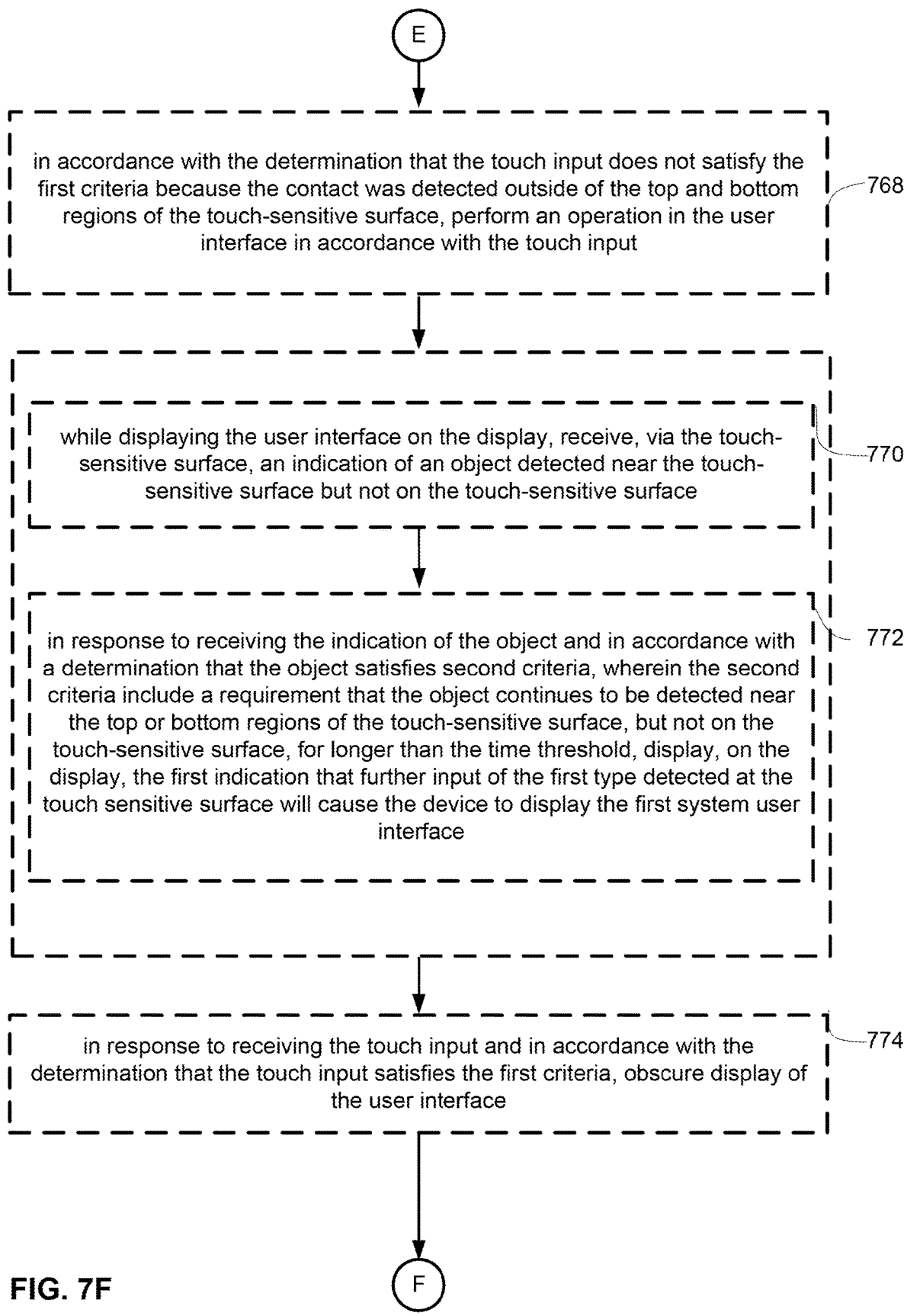
Figure 7G:
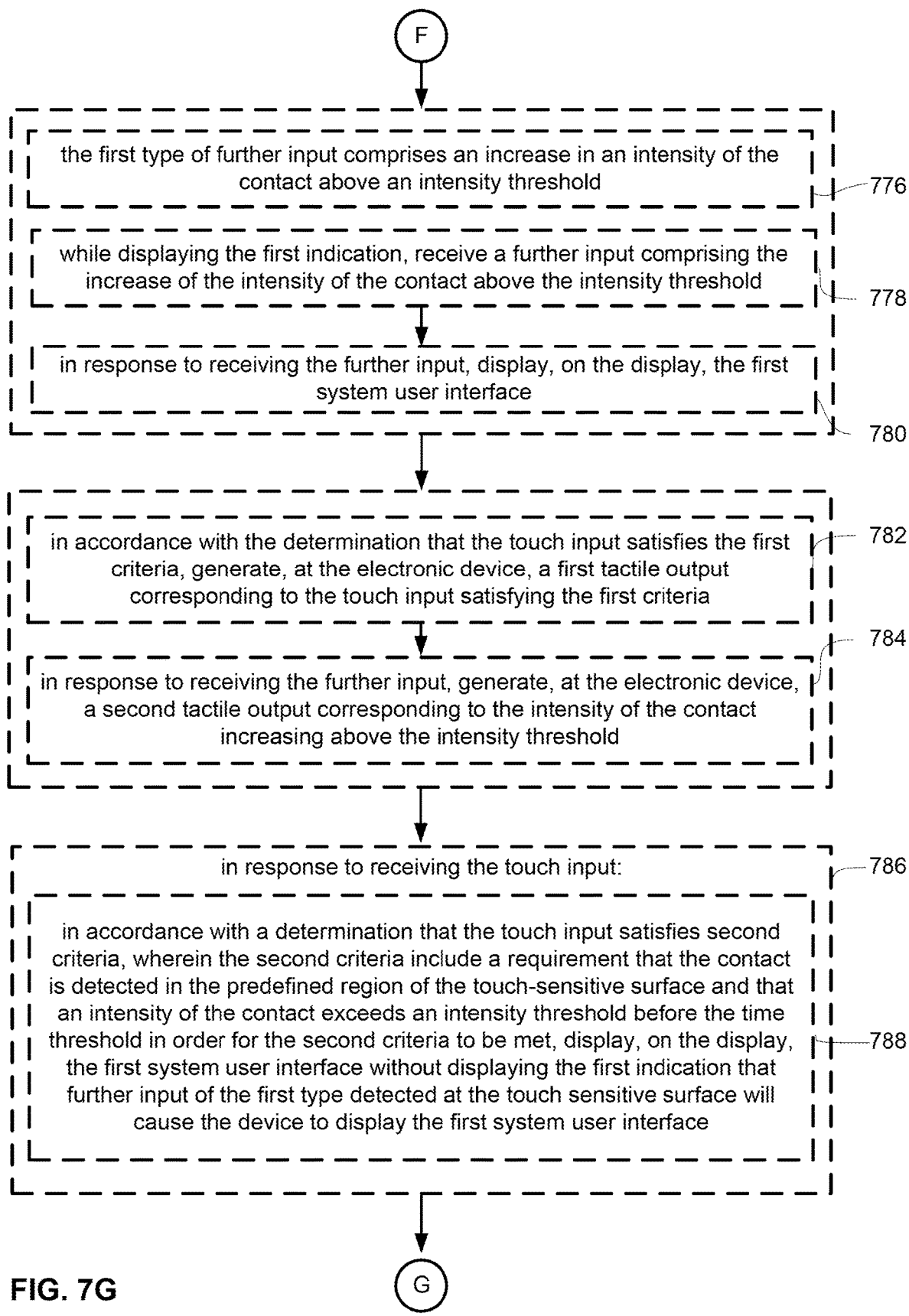
Figure 7H:
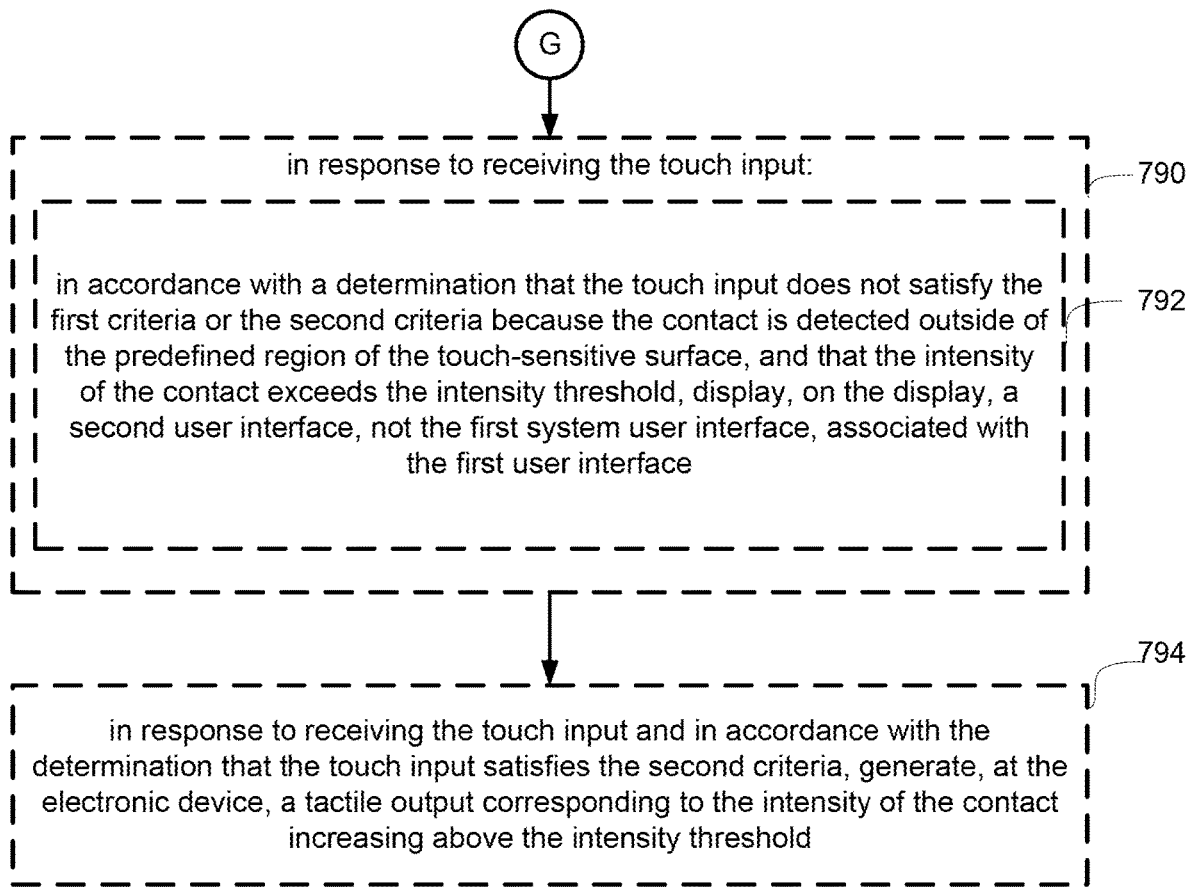

In FIGS. 6Z to 6AA, before the elapsed contact time reaches time threshold 612, an upward swipe of contact 606 is detected on touch screen 604. As mentioned previously, a swipe (or flick) detected in a wake screen user interface will optionally result in the display of a system user interface, sometimes without displaying first an indication of that system user interface. For example, in response to detecting the upward swipe of contact 606, touch screen 604 optionally displays a partial view of system user interface 614, and as the swipe continues to pull system user interface 614 into view, eventually the entirety of system user interface 614 is displayed on touch screen, as in FIG. 6AA. Thus, as described with reference to FIGS. 6Y to 6AA, system user interface 614 is optionally accessible from a wake screen user interface in response to a swipe input without an intervening touch and hold input.

In some embodiments, the system user interface is accessible via a touch and hold input that occurs off of, but near, the touch screen. FIGS. 6BB-6EE illustrate various embodiments where a touch screen detects an object near the edge of the touch screen, but not on the touch screen, followed by a subsequent swipe input detected on the touch screen while the touch screen displays an application user interface.

In FIG. 6BB, as in FIG. 6S, touch screen 604 is displaying fitness tracking application user interface 602 discussed in detail above. Specifically, touch screen 604 detects an object 609 (e.g., a user's finger) near the bottom edge of bottom region 618 (of touch screen 604) but not on the touch screen 604. In some embodiments, object 609 is analogously detected near the top edge of top region 616 (of touch screen 604), and device 600 will optionally respond analogously to as described with reference to FIGS. 6TT-6VV. In FIG. 6BB, object 609 has just been detected near the bottom edge of bottom region 616, as indicated by time bar 610.

In FIG. 6CC, the elapsed time (shown in solid in time bar 610) has reached the time threshold 612 while object 609 continues to be detected near the bottom edge of bottom region 618 (e.g., there was no liftoff of object 609). In response to determining that object has been detected near the bottom edge of bottom region 618, touch screen 604 displays system user interface indication 611 and optionally a partial view of system user interface 614 (e.g., partial views of other affordances in system user interface 614) in proximity to detected object 609. Additionally, system user interface indication 611 and the partial view of system user interface 614 partially obscure workout type browsing user interface 602, whose size has reduced proportionally (e.g., while maintaining its original aspect ratio) and has been pushed back on touch screen 604 to appear as if it is behind system user interface 614. Furthermore, electronic device 600 optionally provides a tactile output (e.g., a vibration) and/or an audio response such as a beep. Other details of the response of device 600 to the touch and hold input detected near, but not in bottom region 618 of touch screen 604, are optionally the same as described with reference to FIGS. 6G-6I.

In FIG. 6DD, an upward movement of contact 606 is detected without liftoff of object 609 being detected, indicating that an upward swipe input is detected on touch screen 604 (e.g., object 609 has moved from the bottom edge of device 600 onto touch screen 604 as it swipes upward across touch screen 604). This upward movement is optionally considered a further touch input (e.g., a swipe input or a flick input) on touch screen 604, like in FIGS. 6J-6K. In response to detecting that a further swipe input has commenced, touch screen 604 optionally displays a larger partial view of the system user interface 614, as shown in FIG. 6DD, and as the swipe continues to pull system user interface 614 into view, eventually the entirety of system user interface 614 is displayed on touch screen as if the swipe of contact 606 upward is pulling system user interface 614 into touch screen 604, as shown in FIG. 6EE. Touch screen 604 optionally ceases to display system user interface indicator 611 at this point.

In some embodiments, after the electronic device receives a touch and hold input in an application user interface or a wake screen user interface, inputs other than swiping optionally allow for access to the system user interface as well. For example, FIGS. 6FF-6JJ illustrate various embodiments where the same result as described with reference to FIGS. 6F-6K optionally occurs when device 600 is displaying an application user interface and when a touch and hold input followed by a hard press input are detected on the touch screen of an electronic device.

For example, in FIG. 6FF, touch screen 604 is displaying fitness tracking application user interface 602 as discussed above. Contact 606, which overlaps with the boundary of the Indoor Walk affordance 608, is detected in the bottom region 618 of touch screen 604. Notably, intensity bar 620 depicts the intensity (e.g., the downward pressure against the touch sensitive surface of touch screen 604) of contact 606, and intensity threshold 622 depicts a predefined intensity threshold a contact must reach in order to eventually cause display of the system user interface 614, as will be described below. As seen on time bar 610 in FIG. 6FF, contact time has begun to elapse, but contact 606 has not been detected long enough to reach the time threshold 612. Furthermore, as seen on intensity bar 620, contact 606 has not reached the intensity threshold 622.

In FIG. 6GG, the elapsed time (shown in solid in time bar 610) of contact 606 has reached the predefined time threshold 612 while the intensity of contact 606 has not yet reached intensity threshold 622. As a result, contact 606 is optionally considered to be part of a touch and hold input. In response to determining that contact 606 is considered to be part of a touch and hold input, device 600 responds as described in FIG. 6I, for example (e.g., displays a portion of system user interface 614, generates a tactile output, etc., as shown in FIG. 6GG).

In FIG. 6HH, after contact 606 has met the time threshold 612 (as depicted in the solid portion of time bar 610), the intensity of contact 606 increases, as depicted in the solid portion of intensity bar 620. Touch screen 604 continues to display system user interface indication 611 and the partial view of system user interface 614 as in FIG. 6GG without further tactile output or audio response.

In FIG. 6II, as contact 606 continues, the intensity of touch input 606 has reached the intensity threshold 622, as depicted in the solid portion of intensity bar 620. As a result, contact 606 is considered to be part of a further touch input (e.g., a hard press input) on touch screen 604. In response to detecting the further hard press input, device 600 generates a tactile output corresponding to the intensity of contact 606 reaching intensity threshold 622, and displays on touch screen 604 a larger partial view of system user interface indication 614 (e.g., partial views of other affordances in system user interface 614) relative to that in FIG. 6HH as if the system user interface 614 is being pushed or pulled into touch screen 604 by the increased intensity of contact 606, and further obscures workout type browsing user interface 602, eventually displaying fully system user interface 614, as shown in FIG. 6JJ. Touch screen 604 optionally ceases to display system user interface indicator 611 at this point. Thus, system user interface 614 is displayed on touch screen 604 without detecting a swipe of contact 606 on touch screen 604.

In some embodiments, the system user interface is accessible via a hard press input without first requiring a push and hold input in an application user interface or a wake screen user interface. For example, FIGS. 6KK and 6MM illustrate various embodiments where a hard press input is detected in the top or bottom regions of the touch screen of an electronic device while the touch screen displays an application user interface.

In FIG. 6KK, touch screen 604 is displaying fitness tracking application user interface 602, as discussed above, when contact 606, which overlaps with the boundary of the Indoor Walk affordance 608, is detected in the bottom region 618 of touch screen 604. Intensity bar 620 depicts that the intensity of contact 606 has not reached a predefined intensity threshold 622. Similarly, time bar 610 depicts that contact time has begun to elapse but has not been detected long enough to reach the time threshold 612.

In FIG. 6LL, the intensity of contact 606 has reached the intensity threshold 622 before the contact time has reached the time threshold 612. As a result, contact 606 is considered to be part of a hard press input. In response to determining that a hard press input is detected in the bottom region 618 of touch screen 604, the electronic device optionally generates a tactile output corresponding to the intensity of the contact reaching the intensity threshold 622, and displays system user interface 614 similar to as in FIGS. 6II and 6JJ, sometimes without first displaying an indication of that system user interface (e.g., indication 611). For example, in response to determining that contact 606 is part of a hard press input, touch screen 604 optionally displays a partial view of system user interface 614 that appears as if being pushed or pulled into touch screen 604, eventually displaying fully system user interface 614, as shown in FIG. 6MM. Thus, system user interface 614 is displayed on touch screen 604 without first detecting a touch and hold input, and without detecting a swipe of contact 606 on touch screen 604.

In some embodiments, the system user interfaces of the disclosure are not accessible via a hard press input in an application user interface or a wake screen user interface if the hard press input is detected outside of certain regions of the touch screen. For example, FIGS. 6NN and 6OO illustrate various embodiments where a hard press input is detected near the center of the touch screen (e.g., outside of the top and bottom regions of the touch screen) of an electronic device while the touch screen displays an application user interface.

In FIG. 6NN, touch screen 604 is displaying fitness tracking application user interface 602 as discussed above while contact 606, which overlaps with the boundary of the Outdoor Cycle affordance 608, is detected outside of both the top region 616 and the bottom region 618 of touch screen 604. Intensity bar 620 depicts that the intensity of contact 606 has not reached a predefined intensity threshold 622. Similarly, time bar 610 depicts that contact time has begun to elapse but has not been detected long enough to reach the time threshold 612.

In FIG. 6OO, before time threshold 612 is reached, the intensity of contact 606 has reached the intensity threshold 622. As a result, contact 606 is considered to be part of a hard press input. In response to determining that a hard press input is detected outside of both the top region 616 and the bottom region 618 of touch screen 604, touch screen 604 does not display a system user interface. Instead, for example, in response to detecting the hard press input contact 606 in fitness tracking application user interface 602, touch screen 604 optionally displays fitness tracking application user interface 602 where the size of interface 602 slightly reduces proportionally and immediately returns to its original size, thus creating a "shrink and bounce back" visual effect, because no action is accessible via a hard press input detected in this user interface of the fitness tracking application. More generally, a hard press input detected outside of the top and bottom regions of touch screen 604 while touch screen 604 is displaying an application user interface optionally results in an input provided to the application in accordance with the hard press input (e.g., as opposed to providing access to the system user interfaces of the disclosure).

In another example, FIGS. 6PP and 6QQ illustrate various embodiments where a hard press input is detected near the center of the touch screen (e.g., outside of the top and bottom regions of the touch screen) of an electronic device while the touch screen displays a wake screen user interface.

In FIG. 6PP, touch screen 604 is displaying a device wake screen user interface 602 when contact 606 is detected outside of both the top region 616 and the bottom region 618 of touch screen 604. Intensity bar 620 depicts that the intensity of contact 606 has not reached a predefined intensity threshold 622. Similarly, time bar 610 depicts that contact time has begun to elapse but has not been detected long enough to reach the time threshold 612.

In FIG. 6QQ, before time threshold 612 is reached, the intensity of contact 606 has reached the intensity threshold 622. As a result, contact 606 is considered to be part of a hard press input. In response to determining that a hard press input is detected outside of both the top region 616 and the bottom region 618 of touch screen 604, touch screen 604 does not display a system user interface. Instead, touch screen 604 optionally displays in the center of the display a representation of wake screen user interface 603 at a proportionally reduced size (e.g., while maintaining its original aspect ratio) and on each side a partial view of a representation of another wake screen user interface (e.g., other watch faces accessible on device 600) at a proportionally reduced size. The user is optionally able to provide horizontal (leftward or rightward) swipe inputs to scroll through the reduced-size representations of various wake screen user interfaces (e.g., watch faces). The touch screen 604 optionally displays a "Customize" affordance that is selectable to access functions that customize the wake screen user interface. More generally, a hard press input detected outside of the top and bottom regions of touch screen 604 while touch screen 604 is displaying a wake screen user interface optionally results in an input provided to the wake screen user interface in accordance with the hard press input (e.g., providing access to a watch face editing user interface as opposed to providing access to the system user interfaces of the disclosure).

In some embodiments, after displaying the system user interface, the electronic device optionally allows for reconfiguration of the affordances in the system user interface in response to further touch input, as illustrated in FIGS. 6RR and 6SS.

In FIG. 6RR, touch screen 604 is displaying system user interface 614 as described previously in, for example, FIG. 6K. While displaying system user interface 614, contact 606, which overlaps with an affordance in system user interface 614 (e.g., the Theater Mode affordance), is detected on touch screen 604. Time bar 630 depicts the time duration of contact 606, and time threshold 632 depicts a predefined minimum time threshold that a contact overlapping with a system affordance in system user interface 614 must meet in order to operate system user interface 614 in a reconfiguration mode (e.g., a mode in which a tap and drag input on an affordance in the system user interface 614 will move the affordance to a new position in the system user interface 614 in accordance with the drag). In some embodiments, time threshold 632 is the same as time threshold 612 described previously, and in some embodiments, time threshold 632 is different than time threshold 612 described previously.

In FIG. 6SS, contact 606 has been detected on touch screen 604 for time threshold 632. In response, system user interface 614 in FIG. 6SS now operates in a reconfiguration mode in which the selectable affordances are repositionable using various types of touch inputs (e.g., tap and drag inputs on the affordances). In some embodiments, the reconfiguration mode is indicated by one or more visual indications. For example, in one embodiment, the selectable system affordances jiggle as though they are floating on water (e.g., each respective selectable system affordance oscillates about a respective average position of the selectable system affordance on the display).

In some embodiments, touch inputs (e.g., touch and hold inputs; off-screen touch and hold; etc., as previously described) received in the top region of a touch screen while displaying an application user interface or a wake screen user interface optionally provide access to another system user interface, different from the one accessible through touch inputs (e.g., touch and hold inputs; off-screen touch and hold; etc., as previously described) received in the bottom region of the touch screen. However, access to the other system user interface from the top region of the touch screen is optionally analogous and includes the same features as those described with reference to FIGS. 6A-6MM. In some embodiments, the system user interface accessible from the bottom region of the touch screen is a user interface for controlling one or more functions of the electronic device (e.g., a control center), and the system user interface accessible from the top region of the touch screen is a user interface for viewing one or more notifications generated at the electronic device (e.g., a notification center). For example, FIGS. 6TT and 6VV illustrate exemplary embodiments where an electronic device provides access to a notification center user interface in response to detecting a touch and hold input in the top region of a touch screen and then a downward swipe input.

In FIG. 6TT, touch screen 604 is displaying fitness tracking application user interface 602 discussed in detail above, while contact 606 is beginning to be detected in the top region 616 of touch screen 604, and contact 606 overlaps with Quick Start affordance 625.

In FIG. 6UU, the elapsed time (shown in solid in time bar 610) has reached the predefined time threshold 612. As a result, contact 606 is considered to be part of a touch and hold input. In response to determining that contact 606 is a touch and hold input, touch screen 604 displays in proximity to contact 606, system user interface indication 613 and optionally a partial view of system user interface 615, which displays notifications associated with the system and/or with applications installed on the electronic device. Electronic device 600 optionally obscures/pushes back workout type browsing user interface 602 and provides a tactile output and/or an audio response similar to previously discussed embodiments.

In FIG. 6VV, a downward swipe or flick of contact 606 is detected and completed after the touch and hold input, analogous to the upward swipes or flicks described with reference to previous embodiments. In response to detecting the further downward swipe input across touch screen 604, device 600 fully displays system user interface 615, as shown in FIG. 6VV. Touch screen 604 optionally ceases to display system user interface indicator 613 at this point. Thus, as described above, a control center user interface or a notification center of the electronic device are accessible from an application user interface or a wake screen user interface from the bottom or top regions, respectively, of the touch screen as described with reference to FIGS. 6F-6VV.

The various embodiments described above are optionally operable in both a left-handed configuration and a right-handed configuration. For example, device 600 is optionally a smart watch that is wearable on a user's left wrist or a user's right wrist. Further, the top region of the touch screen is optionally larger than the bottom region of the touch screen, as previously described. However, the physical portion of the touch screen that corresponding to the top region (and the bottom region) will optionally be different depending on whether device 600 is worn on the user's left wrist or the user's right wrist. Thus, in order to ensure that the region of the touch screen that is larger is the region of the touch screen that is on top regardless of whether the user raises their left wrist to look at device 600 (if device 600 is being worn on the left wrist) or the user raises their right wrist to look at device (if device 600 is being worn on the right wrist), device 600 optionally selects the top and bottom regions of the touch screen to be different physical portions of the touch screen depending on whether device 600 is in a left-handed configuration (e.g., configured to be worn on a user's right wrist) or a right-handed configuration (e.g., configured to be worn on a user's left wrist). For example, FIGS. 6WW and 6XX illustrate exemplary embodiments where device 600, a wrist-worn smart watch, is operated in a left-handed (worn on the right wrist) and a right handed (worn on the left wrist) configuration, respectively.

In FIG. 6WW, device 600 is a smart watch with an asymmetrically-located crown operating in a left-handed configuration (e.g., on the user's right wrist). Top region 616 is in the top portion of the touch screen when the user raises their right wrist to view the screen, and bottom region 618 is in the bottom portion of the screen when the user raises their right wrist to view the screen (e.g., top region 616 is located farther from the crown, and bottom region 618 is located closer to the crown).

In FIG. 6XX, device 600 is the smart watch with the asymmetrically-located crown described in FIG. 6WW, but operating in a right-handed configuration (e.g., on the user's left wrist). Top region 616 is in the top portion of the touch screen when the user raises their left wrist to view the screen, and bottom region 618 is in the bottom portion of the screen when the user raises their left wrist to view the screen (e.g., top region 616 is located closer to the crown, and bottom region 618 is located farther from the crown). In this way, device 600 is able to change its top/bottom configurations depending on which wrist of the user device 600 is on to maintain consistency of the relative sizes of the top and bottom regions of the touch screen.

FIGS. 7A-7H are flow diagrams illustrating a method 700 of providing access to a system user interface in response to touch inputs received in an application user interface or a wake screen user interface in accordance with some embodiments of the disclosure. The method 700 is optionally performed at an electronic device such as device 100, device 300 or device 500 as described above with reference to FIGS. 1A-1B, 2-3, 4A-4B and 5A-5H. Some operations in method 700 are, optionally, combined and/or the order of some operations is, optionally, changed.

In some embodiments, such as in FIG. 6G, an electronic device (e.g., a personal wearable device such as a smart watch, a mobile device such as a mobile phone, or a TV set-top box, such as device 600) in communication with a display (e.g., a watch display, a smartphone display, or a television set, such as touch screen 604) and a touch-sensitive surface (e.g., a touch screen of a smartphone, a touch screen of a smart watch, or a touch-sensitive surface of a remote control of a set-top box, such as touch screen 604) displays (702), on the display, a user interface (e.g., a system user interface of the electronic device such as a wake screen of a smart watch (e.g., a watch face or other user interface that is the first user interface displayed by the electronic device when it wakes from a sleep state such as in FIG. 6L), or an application user interface of one or more applications installed on the electronic device (e.g., the user interface of a fitness tracking application running on the electronic device such as in FIG. 6A). In some embodiments, the wake screen is a watch face and includes one or more watch complications such as time and date, and/or one or more affordances corresponding to applications installed on the watch or features of the watch such as in FIG. 6L (e.g., an affordance selectable to launch an installed instant messaging application, an affordance selectable to launch a fitness tracking application, etc.). In some embodiments, the user interface is an application user interface, such as a user interface of a fitness tracking application displaying one or more indicators (e.g., the user's heart rate and elapsed time of exercise) or affordances (e.g., affordances to start, pause or stop an exercise)).

In some embodiments, such as in FIG. 6G, while displaying the user interface on the display, the electronic device (600) receives (704) a touch input comprising a contact detected on the touch-sensitive surface (e.g., detecting a contact (e.g., 606) on a touch screen display (e.g., 604) of the smart watch. In some embodiments, the contact is from a finger of the user).

In some embodiments, in response to receiving the touch input, electronic device (e.g., device 600) further determines whether the contact satisfies one or more first criteria (706), such as in FIGS. 6A-6B and 6G-6I. In some embodiments, the one or more criteria are system user interface display criteria used to determine whether the touch input should cause the display of one or more indications or hints of a system user interface.

In some embodiments, in accordance with a determination that the touch input satisfies first criteria wherein the first criteria include a requirement that the contact continues to be detected in a predefined region of the touch-sensitive surface for longer than a time threshold, the electronic device displays, on the display, a first indication that further input of a first type detected at the touch sensitive surface will cause the device to display a first system user interface (708), such as in FIG. 6I.

In some embodiments, such as in FIG. 6G, the predefined region of the touch sensitive surface is a top region (e.g., 616), of the touch sensitive surface (e.g., 604). In some embodiments, the predefined region is a bottom region (e.g., 618) of the touch sensitive surface. In some embodiment, the top region is larger than the bottom region, such as in FIG. 6G.

In some embodiments, such as in FIG. 6H, one of the system user interface display criteria is a predefined threshold of minimum contact duration (e.g., 612), such as 100 ms, 300 ms, 500 ms, or 1s. In some embodiments, such as in FIG. 6I, one criterion is the contact's maximum threshold of movement on the touch screen; that is, if movement of the contact during the duration does not exceed a maximum movement threshold (e.g., the contact continues to be detected in a predefined region of the touch sensitive surface during the time threshold), the contact is optionally considered substantially stationary. In some embodiments, such as in FIG. 6KK, one criterion is the maximum intensity of the contact during the contact duration (e.g., 622) such that if the intensity of the contact during the time threshold does not exceed an intensity threshold, the contact satisfies the intensity criterion. In some embodiments, touch inputs that satisfy the one or more of criteria are referred to as "touch and hold" inputs.

In some embodiments, the indication is a visual hint or other indication that a certain type of further input, such as a swipe or an increase in the intensity of the contact provided by the user to the electronic device through the touch sensitive surface, will cause full display of the system user interface. In some embodiments, such as in FIG. 6I, the indication is visual, such as a graphical icon or an affordance on the display (e.g., 611). In some embodiments, such as in FIG. 6I, the electronic device optionally displays a portion of the system user interface, such as a top or bottom portion of the system user interface (e.g., 614). In some embodiments, such as in FIG. 6I, the indication further includes tactile feedback, such as a vibration of the electronic device. In some embodiments, the indication further includes audio feedback, such as a beep.

In some embodiments, such as in FIG. 6VV, the system user interface that the electronic device will optionally display is a "notification center" that displays notifications associated with the system or with applications installed on the electronic device (e.g., 615), and is a user interface of the operating system of the electronic device as opposed to being a user interface of a particular application on the electronic device. In some embodiments, such as in FIG. 6N, the system user interface is a "system control center" that indicates one or more system statuses of the electronic device and allows changes to certain functionalities of the electronic device (e.g., 614). In some embodiments, such as in FIG. 6N, the system user interface includes affordances that indicate the wireless connectivity (e.g., Wi-Fi, Bluetooth, or cellular connectivity) status and the remaining battery charge level of the electronic device and that enable and disable the wireless connectivity and the low power operating mode of the electronic device.

In some embodiments, in accordance with a determination that the touch input does not satisfy the first criteria, the electronic device forgoes displaying the first indication (710), such as in FIGS. 6B-6C. In some embodiments, such as in FIGS. 6B and 6C, where the first criteria are not met, the touch input is not considered to be a "touch-and-hold" gesture. Some such exemplary touch inputs include taps, swipes, clicks, or contacts with intensity greater than an intensity threshold touches. In such circumstances, no system user interface indication is displayed. In some embodiments, such as in FIG. 6B, if such a touch input is detected while the electronic device is displaying an application user interface (e.g., 602), the touch input results in an action or input associated with the application (e.g., as shown in FIGS. 6B-6C, in a fitness tracking application, a swipe gesture scrolls through various workout type affordances) rather than displaying the indication of the system user interface. In some embodiments, such as in FIG. 6PP, if such a touch input (e.g., 606) is detected while the electronic device is displaying a watch face user interface (e.g., 602), the touch input results in changing the watch face or otherwise interacting with the watch face rather than displaying the indication of the system user interface, such as in FIGS. 6PP and 6QQ. The above-described manner of displaying the system user interface indication in response to a particular input allows the electronic device to provide the user more expedient access to the system user interface and easier control of the device (e.g., reducing the number of required steps to accomplish the task by obviating the need to first exit the user interface of an installed application or a watch face and navigating to a system user interface in order to access the system user interface), which simplifies the interaction between the user and the device and enhances the operability of the device and makes the user-device interface more efficient (e.g., by performing actions with fewer inputs and without exiting the displayed app user interface), which additionally, reduces power usage and improves battery life of the device by enabling the user to use the device more quickly and efficiently.

In some embodiments, such as in FIGS. 6I and 6M, the electronic device optionally displays (712) the first indication (e.g. 611) in accordance with the determination that the touch input satisfies the first criteria (e.g., 606) regardless of whether the user interface is an application user interface (e.g., 602 in FIG. 6I) or a wake screen of the electronic device (e.g., 602 in FIG. 6M). In other words, the visual hint or other indication is optionally displayed in accordance with receiving a touch and hold input regardless of whether the touch and hold input is received in an application user interface or in a wake screen (e.g., watch face) user interface. The above-described manner of providing access to a system user interface after receiving a touch and hold input allows the electronic device to simplify required user inputs to access system user interfaces of the electronic device, such as the control center or the notification center of a smart watch, which enhances the operability of the device, makes the user-device interface more intuitive and efficient by reducing friction in the user experience (e.g., providing the user with an intuitive sensory guidance to accessing the system user interface with fewer requisite steps and without first exiting an application user interface), which, additionally, reduces power usage and improves battery life of the device by enabling the user to use the device more quickly and efficiently.

In some embodiments, such as in FIG. 6J or FIG. 6VV, the first type of further input is a swipe input (714). In some embodiments, such as in FIG. 6J or FIG. 6VV, the further input is received at the touch sensitive surface (e.g., 604) without first detecting liftoff of the contact from the touch sensitive surface corresponding to the touch input that satisfied the first criteria (e.g., as shown by time bar 610). In some embodiments, such as in FIG. 6J or FIG. 6VV, the first type of further input is an upward or a downward swipe input, respectively; in other words, the further input includes movement of the contact on the touch sensitive surface that exceeds a minimum movement speed and/or distance threshold across the touch-sensitive surface from an edge of the touch-sensitive surface in an upward or a downward direction.

In some embodiments, such as in FIG. 6J or 6VV, while displaying the first indication (e.g., in FIG. 6I, the first indication 611 remains displayed while contact 606 is maintained at the touch screen 604), the electronic device optionally receives (716) a further input comprising the swipe input detected on the touch-sensitive surface (e.g., 606). In some embodiments where the touch-and-hold gesture input is detected at the top region of the touch sensitive surface, the further input of the first type is a downward swipe (e.g. in FIG. 6VV, contact 606 starting from the top region of the touch sensitive surface across the touch sensitive surface). In some embodiments where the touch and hold gesture input is detected at the bottom region of the touch sensitive surface (e.g., 604 in FIG. 6J), the further input of the first type is an upward swipe (e.g., 606 in FIGS. 6J and 6K starting from the bottom region of the touch sensitive surface across the touch sensitive surface).

In some embodiments, such as in FIGS. 6J-6K and 6UU-6VV, in response to receiving the further input, the electronic device displays (718), on the display, the first system user interface. In some embodiments, in response to receiving the further input of the first type (e.g., a swipe input shown in FIGS. 6J and 6K), the electronic device displays the first system user interface (e.g., 614 in FIG. 6K) on the display (e.g., 604 in FIG. 6K). In some embodiments, the first system user interface (e.g., 614 in FIG. 6K) is the full display of the system user interface corresponding to the visual hint or other indication (e.g., 614 in FIG. 6J). The above-described manner of displaying the system user interface allows the electronic device to provide the user more expedient access to the system user interface and easier control of the device (e.g., without the need to first exit the user interface of an installed application and navigating to a system user interface to perform the action), which simplifies the interaction between the user and the device and makes the user-device interface more efficient (e.g., by performing actions with fewer inputs and without exiting the displayed app user interface), which additionally, reduces power usage and improves battery life of the device by enabling the user to use the device more quickly and efficiently.

In some embodiments, such as in FIG. 6K, the first system user interface optionally comprises one or more system affordances for controlling one or more functions of the electronic device (720). In some embodiments, the system user interface includes one or more affordances that indicate one or more system statuses of the electronic device and allow changes to certain functionalities of the electronic device. For example, in some embodiments the system user interface (e.g., 614 in FIG. 6K) includes affordances (e.g., "battery level", "Wi-Fi status", etc.) that indicate the wireless connectivity (e.g., Wi-Fi, Bluetooth, or cellular connectivity) status and the remaining battery charge level of the electronic device and that enable and disable the wireless connectivity and the low power operating mode of the electronic device. In this way, affordances for controlling functions on the electronic device are reachable from the user interface that was being displayed on the electronic device before the touch-and-hold gesture was detected. The above-described manner of providing the user with access to system control functions of the electronic device after receiving a touch and hold input allows the electronic device to offer the user more direct access to system control functions of the electronic device, which enhances the operability of the device, makes the user-device interface more intuitive and efficient by reducing friction in the user experience (e.g., providing the user with an intuitive sensory guidance to accessing the system user interface with fewer requisite steps and without first exiting an application user interface), which, additionally, reduces power usage and improves battery life of the device by enabling the user to use the device more quickly and efficiently.

In some embodiments, such as in FIG. 6VV, the first system user interface optionally comprises one or more representations of one or more notifications at the electronic device (722). In some embodiments, the system user interface (e.g., 615) includes one or more representations of system or application notifications (e.g., "Notification 1", etc.) such as a notification of receiving a social media message from an installed social media application or a notification about an upcoming meeting in a system from a system calendar function. In this way, information about notifications on the electronic device is reachable from the user interface that was being displayed on the electronic device before the touch-and-hold gesture was detected. The above-described manner of providing user with access to a visual list of notifications received at the electronic device after receiving a touch and hold input allows the electronic device to offer the user more direct access to the notifications, which enhances the operability of the device, makes the user-device interface more intuitive and efficient by reducing friction in the user experience (e.g., reducing the required input steps to access the list of notifications and obviating the need to first exiting an application user interface), which, additionally, reduces power usage and improves battery life of the device by enabling the user to use the device more quickly and efficiently.

In some embodiments, such as in FIG. 6RR, while displaying the first system user interface with the one or more system affordances (e.g., 614), the electronic device optionally receives (724) a second touch input comprising a second contact (e.g., 606) detected on the touch-sensitive surface. In some embodiments, the second contact is part of a tap input used to change the functionality of the electronic device, such as enabling and disabling wireless connectivity and low-power operating mode. In some embodiments, the second contact is part of a swipe input used to scroll through the system user interface to display other affordances. In some embodiments, the second contact is part of a touch-and-hold input.

In some embodiments, such as in FIGS. 6RR and 6SS, in response to receiving the second touch input (e.g., 606), and in accordance with a determination that the second touch input satisfies second criteria (726) the electronic device optionally operates (728) the first system user interface (e.g., 614) in a reconfiguration mode in which the one or more system affordances are repositionable relative to other system affordances.

In some embodiments, such as in FIGS. 6RR and 6SS, the second contact is a touch and hold input. In some embodiments, the minimum contact duration and/or the maximum contact intensity to qualify as the touch and hold input here are the same as the minimum contact duration and the maximum contact intensity of the touch and hold input that results in the display of the indication of the system user interface. In some embodiments, the minimum contact duration and/or the maximum contact intensity are different than the minimum contact duration and the maximum contact intensity of the touch and hold input that results in the display of the indication of the system user interface.

In some embodiments, such as in FIGS. 6RR and 6SS, after determining that the second touch input received is a touch and hold input, the system user interface enters a reconfiguration mode, in which the selectable system affordances can be repositioned and rearranged in the system user interface. In some embodiments, the reconfiguration mode is indicated by one or more visual indications. For example, in one embodiment, the selectable user interface objects jiggle as though they are floating on water (e.g., each respective selectable system affordance oscillates about a respective average position of the selectable system affordance on the display. Rearranging the system affordances is optionally accomplished by, after entering and while in the reconfiguration mode, detecting touchdown on and dragging of a system affordance to a new position in the first system user interface);

In some embodiments, in response to receiving the second touch input, and in accordance with a determination that the second touch input does not satisfy the second criteria, the electronic device optionally operates (730) the first system user interface in a standard mode in which the one or more system affordances are not repositionable relative to other system affordances (e.g., the user is not able to touch and drag the affordances to new positions in the first system user interface). The above-described manner of reconfiguring the system user interface allows the user a simple manner to configure their preferred arrangement and access to the system user interface and easier control of the device, which allows greater customization of interaction between the user and the device, provides a more personalized user experience, reduces cognitive load and distraction, and enhances safety and convenience while interacting with the electronic device (e.g., while running or performing other tasks), which simplifies the interaction between the user and the device and makes the user-device interface more efficient (e.g., by performing actions with fewer inputs), which additionally, reduces power usage and improves battery life of the device by enabling the user to use the device more quickly and efficiently.

In some embodiments, such as in FIG. 6A-6E, in response to receiving the touch input and in accordance with the determination that the touch input does not satisfy the first criteria, and in accordance with the user interface being an application user interface, the electronic device performs (734) an operation in the application user interface in accordance with the touch input (732). In some embodiments, the touch input does not satisfy the first criteria because the contact occurs outside of the predefined regions on the touch sensitive surface, the duration of the touch input does not exceed the minimum threshold (e.g., a tap input), the intensity of the touch input exceeds the maximum threshold (e.g., a hard press input), or the touch input includes movements that exceed the maximum movement threshold (e.g. a swipe input).

In some embodiments, such as in FIGS. 6A-6C where the user interface is a user interface of a fitness application (602), receiving a swipe input while displaying the fitness application user interface results in scrolling through the list of available workout type affordances. In another embodiment, such as in FIGS. 6D and 6E, receiving a tap input while displaying the fitness application user interface results in invoking an affordance corresponding to the location on the touch sensitive surface where the tap input was received (e.g., start an outdoor run workout or start an outdoor cycle workout).

In some embodiments, such as in FIGS. 6L-6N, in response to receiving the touch input and in accordance with the determination that the touch input does not satisfy the first criteria, and in accordance with the user interface being a wake screen user interface (e.g., 602) (736), and in accordance with a determination that the touch input includes a swipe input, the electronic device displays (738), on the display, the first system user interface. In some embodiments, such as in FIGS. 6L-6N, if the user interface is a wake screen (e.g., watch face) user interface (e.g., 602) instead of an application user interface, the system further determines whether the non-touch and hold input is a swipe input. If the input is determined to be a swipe input, such as an upward or a downward swipe input (e.g., upward swipe in in 6M and 6N), the system in response optionally displays the first system user interface (e.g., 614). As such, on the wake screen user interface, the first system user interface is reachable via the touch-and-hold input described above, or via merely an upward or downward swipe input detected on the wake screen (e.g., without performing a touch-and-hold). In such circumstances, the first system user interface is optionally displayed without first displaying the indication of the first system user interface. Further, in some embodiments, a horizontal swipe input does not display the first system user interface, but rather performs a different action with respect to the wake screen user interface (e.g., switches from displaying one watch face to displaying another watch face).

In some embodiments, such as in FIGS. 6W and 6X, in response to receiving the touch input (736), and in accordance with a determination that the touch input does not include a swipe input, the electronic device performs (740) an operation in the watch face user interface in accordance with the input. In other words, if the input is not a swipe input (e.g., the input is a tap input or a hard press), the device optionally performs an operation in accordance with the input. For example, a tap input received on an affordance in the watch face user interface optionally triggers the affordance on the watch face. The above-described manner of providing the user access to the system user interface allows the user another simple and efficient way to access the system user interface and easier control of the device, enhances safety and convenience while interacting with the electronic device (e.g., while running or performing other tasks), simplifies the interaction between the user and the device and makes the user-device interface more efficient (e.g., by performing actions with fewer inputs), and additionally reduces power usage and improves battery life of the device by enabling the user to use the device more quickly and efficiently.

In some embodiments, such as in FIGS. 6W and 6X, in response to receiving the touch input and in accordance with the determination that the user interface is the wake screen (e.g., watch face) user interface and that the touch input does not include a swipe input (742), and further in accordance with a determination that the touch input is a tap input, the electronic device performs (744) an operation in the wake screen user interface in accordance with the tap input. In other words, in some embodiments such as in FIGS. 6W and 6X, where a wake screen (e.g., watch face) user interface (602) is displayed while a first touch input (606) that is received is neither a touch and hold input nor a swipe input, the system further determines whether the input is a tap input. If the input is determined to be a tap input, the electronic device optionally performs an operation consistent with detecting a tap input (e.g., a tap input (606) received on an affordance (e.g., stopwatch affordance) in the watch face user interface (602) optionally triggers the affordance on the watch face (e.g., show a stopwatch application user interface, as shown in FIG. 6X)). The above-described manner of receiving and processing user touch inputs enables the electronic devices to respond to a variety of different touch gesture inputs in both an application user interface and a wake screen user interface while still allowing efficient access to a system user interface (including all the associated benefits such as reduced cognitive friction, less distraction, and longer battery life) while maintaining the user's interactive experience with the wake screen user interface when the user provides a tap input to the wake screen user interface (thereby reducing cognitive dissonance associated with unfamiliar or unexpected wake screen user interface responses), which simplifies the interaction between the user and the device and makes the user-device interface more efficient (e.g., by performing actions with fewer inputs), and additionally reduces power usage and improves battery life of the device by enabling the user to use the device more quickly and efficiently.

In some embodiments, such as in FIGS. 6D and 6E, in response to receiving the touch input and in accordance with the determination that the user interface is an application user interface (746), and in accordance with a determination that the touch input is a tap input, the electronic device performs (748) an operation in the application user interface in accordance with the tap input. In some embodiments where an application (e.g., a fitness application) interface is displayed, such as in FIGS. 6D and 6E, while a first touch input (606) that is received is neither a touch and hold input nor a swipe input, the electronic device (600) further determines whether the input is a tap input. If the input is determined to be a tap input, an operation consistent with detecting a tap input, such as performing an operation (e.g., starting, pausing, or stopping a workout session) associated with a tapped application affordance (e.g., the outdoor walk affordance associated with starting an outdoor walk workout session) is optionally performed. The above-described manner of receiving and processing user touch inputs enables the electronic devices to respond to a variety of different touch gesture inputs in both an application user interface and a wake screen user interface while still allowing efficient access to a system user interface (including all the associated benefits such as reduced cognitive friction, less distraction, and longer battery life) while maintaining the user's interactive experience with the displayed application user interface when the user provides a tap input to the application (thereby reducing cognitive dissonance associated with unfamiliar or unexpected application user interface responses), which simplifies the interaction between the user and the device and makes the user-device interface more efficient (e.g., by performing actions with fewer inputs), and additionally reduces power usage and improves battery life of the device by enabling the user to use the device more quickly and efficiently.

In some embodiments, such as in FIGS. 6Q and 6U, while displaying the first indication (611) that further input of the first type detected at the touch sensitive surface will cause the device to display the first system user interface, the electronic device optionally detects (750) liftoff of the contact from the touch-sensitive surface (instead of a further input). In some embodiments, such as in FIGS. 6Q-6R and 6T-6U, in response to detecting the liftoff of the contact, the electronic device ceases displaying (752) the first indication without performing an operation in the user interface, and reverts the displayed user interface to the appearance before the touch and hold input was detected (e.g., any obscured portions of the user interface reappear, and if the size of the user interface was reduced proportionally while displaying the indication, the user interface reverts to its original size). The above-described manner of accessing and displaying the system user interface allows the electronic device to provide the user a more expedient way to cancel the display of system user interface indication and return to the application or wake screen (e.g., without needing additional inputs to remove the system user interface indication), which simplifies the interaction between the user and the device and makes the user-device interface more cognitively efficient (e.g., by performing actions with fewer inputs), which additionally, reduces power usage and improves battery life of the device by enabling the user to use the device more quickly and efficiently.

In some embodiments, such as in FIG. 6H, in accordance with the determination that the touch input satisfies the first criteria, the electronic device generates (754), at the electronic device, a tactile output corresponding to the touch input satisfying the first criteria. In some embodiments, such as in FIG. 6H, the tactile feedback is a vibration of the electronic device, which the device generates when the touch-and-hold gesture is detected and the indication of the first system user interface is displayed. The above-described manner of providing tactile feedback to the user allows the electronic device to more effectively communicate to the user that further input will cause display of the first system user interface, which simplifies the interaction between the user and the device and makes the user-device interface more efficient (e.g., by performing actions with fewer inputs), which additionally, reduces power usage and improves battery life of the device by enabling the user to use the device more quickly and efficiently.

In some embodiments, such as in FIG. 6G, the predefined region of the touch-sensitive surface comprises a top region or a bottom region of the touch sensitive surface (756). In some embodiments, such as in FIG. 6G, the predefined region includes a top region (e.g., 616) and/or a bottom region (e.g., 618) of the touch sensitive surface (e.g., 604), where the top and the bottom regions are defined relative to the orientation in which the user interacts with the display (e.g., the orientation of texts being displayed in an application user interface or the orientation of a simulated analog watch dial complication being displayed on the watch face). In some embodiments, a touch-and-hold input detected in a region of the touch-sensitive surface other than the top or bottom regions (e.g., in a middle region of 604) will not cause display of the indication of the first system user interface. The above-described manner of accessing and displaying the system user interface enables the electronic devices to distinguish and provide different responses to touch gesture inputs detected at different locations on the touch sensitive screen in both an application user interface and a wake screen user interface, while still allowing efficient access to a system user interface (including all the associated benefits such as reduced cognitive friction, less distraction, and longer battery life), which maintains the user's interactive experience with the displayed application or wake screen user interface (thereby reducing cognitive dissonance associated with unfamiliar or unexpected application user interface responses).

In some embodiments, such as in FIG. 6G, the top region of the touch sensitive surface is larger than the bottom region of the touch sensitive surface (758). In some embodiments, the top region of the touch sensitive surface is larger than the bottom region of the touch sensitive surface. In some embodiments, this is the case because touching the top region of the touch-sensitive surface is optionally harder for a user than is touching the bottom region of the touch-sensitive surface (e.g., when the touch-sensitive surface is a watch touch screen on a user's left wrist, it is optionally easier for the user to target a smaller area with their right finger on the bottom region of the watch touch screen, which is closer to the user's right finger, than for the user to target an area with their right finger on the top region of the watch touch screen, which is further from the user's right finger. The above-described manner of making the top region larger than the bottom region allows the electronic device to provide easy access to both the notification center and the control center user interfaces, which makes the user-device interface more efficient, which further reduces power usage and improves battery life of the device by enabling the user to use the device more quickly and efficiently.

In some embodiments, such as in FIG. 6WW, in accordance with a determination that the electronic device is configured for operating on a first hand of a user, the top region of the touch-sensitive surface (e.g., 616) is located at a first position on the electronic device and the bottom region of the touch-sensitive surface (e.g., 618) is located at a second position on the electronic device (760). In some embodiments, such as in FIG. 6XX, in accordance with a determination that the electronic device is configured for operating on a second hand of the user, different than the first hand, the top region of the touch-sensitive surface (e.g., 616) is located at the second position on the electronic device and the bottom region of the touch-sensitive surface (e.g., 618) is located at the first position on the electronic device (762). Thus, in an embodiment where the electronic device is a wrist-worn smart watch, the top region refers to the region closest to the pinky side of the wrist (e.g., the top region of the screen while a user raises her wrist to view the screen), and the bottom region refers to the thumb side of the wrist (e.g., the bottom region of the screen while a user raises her wrist to view the screen). Therefore, in some embodiments the top region and the bottom region change depending on the handedness of the electronic device (e.g., a wrist-worn smart watch). Where the watch is configured for left-handed wear (e.g., worn on the right wrist), the top region refers to the physical position or region close to the bottom region in a right-handed wearing configuration, and vice versa. The above-described manner of accessing and displaying the system user interface enables the electronic device to provide the same responses to a touch and hold input gestures regardless whether the electronic device is operating in a left-handed configuration or a right-handed configuration, which makes the user-device interface more efficient, which further reduces power usage and improves battery life of the device by enabling the user to use the device more quickly and efficiently.

In some embodiments, such as in FIGS. 6J and 6K, in accordance with a determination that the contact is detected in the bottom region of the touch-sensitive surface, the first system user interface comprises one or more system affordances for controlling one or more functions of the electronic device (764). In some embodiments, such as in FIGS. 6UU and 6VV, in accordance with a determination that the contact (e.g., 606) is detected in the top region of the touch-sensitive surface (e.g., 616), the first system user interface (e.g., 615) comprises one or more representations of one or more notifications at the electronic device (766) In some embodiments, such as in FIGS. 6UU and 6VV, if the touch and hold input (e.g., 606) is detected at the bottom region of the touch sensitive display (e.g., 616), the system user interface that will be displayed (e.g., 615) with the further input (e.g., a swipe) is the "notification center" that displays representations for notifications associated with the system or with applications installed on the electronic device. In some embodiments, such as in FIGS. 6J and 6K, if the touch and hold input (e.g., 606) is detected at the bottom region of the touch sensitive display (e.g., 618), the system user interface that will be displayed (e.g., 614) with the further input (e.g., a swipe) is the system control center with one or more affordances that indicate one or more system statuses and control one or more functionalities of the electronic device). The above-described manner of accessing and displaying the system user interface allows the electronic device to provide different system user interfaces in response to touch and hold inputs detected at different locations on the touch sensitive screen, which enables the user more expedient access to more functionalities of the electronic device, complete more tasks with few input steps, which makes the user-device interface more efficient, which further reduces power usage and improves battery life of the device by enabling the user to use the device more quickly and efficiently.

In some embodiments, in accordance with the determination that the touch input does not satisfy the first criteria because the contact was detected outside of the top and bottom regions of the touch-sensitive surface, the electronic device performs (768) an operation in the user interface in accordance with the touch input, such as in FIG. 6PP. In some embodiments, the location of the detected touch input (e.g., a tap or a touch and hold input) is outside the predefined region of the touch sensitive surface (e.g., the top and bottom regions of the touch sensitive display), and the electronic device responds to this outside-the-region touch input according to how the user interface that is displayed when the touch input is received is configured to respond to the touch input. For example, a tap in the center region of the touch-sensitive surface optionally causes selection of an affordance in the user interface, a touch and hold input in the center region of the touch-sensitive surface optionally causes initiation of a process in the user interface, etc. The above-described manner of processing non-top and bottom region touches in accordance with the displayed user interface allows the electronic device to respond to a variety of different touch gesture inputs in both an application user interface and a wake screen user interface while still allowing efficient access to a system user interface (including all the associated benefits such as reduced cognitive friction, less distraction, and longer battery life) while maintaining the user's interactive experience with the displayed application user interface, which simplifies the interaction between the user and the device and makes the user-device interface more efficient (e.g., by performing actions with fewer inputs), and additionally reduces power usage and improves battery life of the device by enabling the user to use the device more quickly and efficiently.

In some embodiments, such as in FIG. 6BB, while displaying the user interface on the display, the electronic device receives (770), via the touch-sensitive surface, an indication of an object detected near the touch-sensitive surface but not on the touch-sensitive surface (e.g., a finger resting on the top or bottom edge of the device 600, near the top or bottom regions (e.g., 616 and 618) of the touch-sensitive surface (e.g., 604), but not on the touch-sensitive surface).

In some embodiments, such as in FIG. 6CC, in response to receiving the indication of the object and in accordance with a determination that the object satisfies second criteria, wherein the second criteria include a requirement that the object continues to be detected near the top or bottom regions of the touch-sensitive surface, but not on the touch-sensitive surface, for longer than the time threshold, the electronic device displays (772), on the display, the first indication that further input of the first type detected at the touch sensitive surface will cause the device to display the first system user interface.

In some embodiments, such as in FIG. 6CC, if the touch and hold input is detected near the top or the bottom edge of the touch sensitive surface (e.g., 604) but not directly on the touch-sensitive surface, the electronic device displays the same visual hint or other indication (e.g., 611 and/or vibration, audio beep, etc.) that a certain type of further input, such as a swipe provided by the user to the electronic device through the touch sensitive surface, will cause full display of the system user interface (e.g., 614). In other words, a touch and hold input near the top edge but not on the touch sensitive display optionally results in the display of the same indication as a touch and hold input in the top region of the touch sensitive display (e.g., 615 in FIG. 6UU), and a touch and hold input near the bottom edge but not on the touch sensitive display optionally results in the display of the same indication as a touch and hold input in the bottom region of the touch sensitive display (e.g., 614 in FIG. 6J). In some embodiments, in accordance with a determination that the object does not satisfy the second criteria, the electronic device forgoes displaying the first indication that further input of the first type detected at the touch-sensitive surface will cause the device to display the first system user interface. The above-described manner of accessing and displaying the system user interface allows the electronic system to provide additional touch input location options to access the systems user interface, increases the sensitivity of the electronic device to a received touch and hold input, which allows the user a simpler manner to access to the system user interface and easier control of the device, which in turn makes the user-device interface more efficient, reduces user cognitive load and distraction, and reduces power usage and improves battery life of the device by enabling the user to use the device more quickly and efficiently.

In some embodiments, such as in FIG. 6J, in response to receiving the touch input and in accordance with the determination that the touch input satisfies the first criteria, the electronic device obscures (774) display of the user interface. In some embodiments, such as in FIG. 6J, in addition to displaying the indication of the system user interface (e.g., 611), the touch and hold input detected in the predefined region (e.g., 618) also results in obscuring of the user interface (e.g., 602) that was displayed before detecting the touch and hold input (e.g., reducing the size of the user interface 602 proportionally while maintaining a constant aspect ratio of the user interface 602, and/or replacing a portion of the displayed user interface 602 with the indication in accordance with the location of the detected touch and hold input to achieve a visual effect where the user interface is being "covered up" by the system user interface indication, and/or fading out or darkening the user interface). The above-described manner of providing visual feedback associated with the indication of the system user interface allows the electronic device to provide the user with an additional visual feedback to ascertain that a gesture input has achieved its intended purpose, which allows the electronic device to more effectively communicate with the user, which simplifies the interaction between the user and the device and makes the user-device interface more efficient (e.g., by performing actions with fewer inputs), which additionally, reduces power usage and improves battery life of the device by enabling the user to use the device more quickly and efficiently.

In some embodiments, such as in FIGS. 6FF and 6GG, the first type of further input comprises an increase in an intensity of the contact above an intensity threshold (776). In some embodiments, such as in FIGS. 6FF and 6GG, the first type of further input is a hard press; that is, the intensity of the input (e.g. the downward pressure of the contact against the touch-sensitive surface) increases to exceed a predefined intensity threshold 622 after the touch-and-hold input has been detected.

In some embodiments, such as in FIGS. 6II and 6JJ, while displaying the first indication (in some embodiments, the first indication remains being displayed while contact is maintained at the touch sensitive surface), the electronic device receives (778) a further input comprising the increase of the intensity of the contact (e.g., 620) above the intensity threshold (e.g., 622) (e.g., the further input is the hard press described above). In some embodiments, such as in FIGS. 6II and 6JJ, in response to receiving the further input, the electronic device displays (780), on the display, the first system user interface. In other words, in some embodiments, such as in FIGS. 6II and 6JJ, in response to receiving a hard press input, the system displays the system user interface on the display; in some embodiments, the system user interface is the full display of the system user interface corresponding to the visual hint or other indication (e.g., a different system user interface depending on whether the touch-and-hold and subsequent hard press were detected in the top region or the bottom region of the touch-sensitive surface, as described above). In some embodiments, if the electronic device detects liftoff of the contact before the intensity of the contact reaches the intensity threshold (e.g., without the intensity of the contact reaching the intensity threshold), the electronic device forgoes displaying the first system user interface and ceases displaying the first indication without performing an operation in the user interface. The above-described manner of displaying the system user interface allows the electronic device to provide the user more expedient access to the system user interface and easier control of the device by allowing an additional input gesture method for accessing the system user interface, which simplifies the interaction between the user and the device and enhances the operability of the device and makes the user-device interface more efficient (e.g., by performing actions with fewer inputs and without exiting the displayed app user interface), which additionally, reduces power usage and improves battery life of the device by enabling the user to use the device more quickly and efficiently.

In some embodiments, such as in FIG. 6GG, in accordance with the determination that the touch input satisfies the first criteria, the electronic device generates (782), at the electronic device, a first tactile output corresponding to the touch input satisfying the first criteria, and in response to receiving the further input, the electronic device generates (784), at the electronic device, a second tactile output corresponding to the intensity of the contact increasing above the intensity threshold, such as in FIG. 6II. In other words, in some embodiments, such as in FIGS. 6FF-6JJ, tactile feedback is provided twice by the electronic device: once when the indication of the first system user interface is displayed in response to the touch-and-hold input (such as in FIG. 6GG), and another time when the intensity of the contact exceeds the intensity threshold and the full first system user interface is displayed (such as in FIG. 6II). Thus, while the system user interface indication is displayed, detecting a hard press on the touch sensitive surface (e.g., a touch sensitive display) optionally results in a further tactile feedback, such as a vibration of the electronic device. The above-described manner of providing tactile feedback to the user allows the electronic device to provide additional user feedback, assuring the user that an intended input to the electronic device was accomplished, thereby reducing cognitive load associated with interacting with the device, which makes the user-device interface more efficient, which further reduces power usage and improves battery life of the device by enabling the user to use the device more quickly and efficiently. Additionally, the tactile feedback increases accessibility of the electronic device by users with certain physical (e.g., audio-visual) impairments.

In some embodiments, such as in FIG. 6KK, in response to receiving the touch input (786), and in accordance with a determination that the touch input satisfies second criteria, wherein the second criteria include a requirement that the contact is detected in the predefined region of the touch-sensitive surface and that an intensity of the contact exceeds an intensity threshold before the time threshold in order for the second criteria to be met, such as in FIG. 6LL, the electronic device displays (788), on the display, the first system user interface without displaying the first indication that further input of the first type detected at the touch sensitive surface will cause the device to display the first system user interface such as in FIGS. 6LL and 6MM. In other words, in some embodiments, receiving a hard press (e.g., 606 in FIG. 6LL, a stationery contact having an intensity greater than an intensity threshold) instead of a touch and hold input in the predefined region of the touch sensitive surface results in displaying the system user interface without displaying the indication that a further input will cause the device to display the system user interface. For example, a hard press detected on the top region of the touch sensitive display results in displaying the notification center user interface, while a hard press detected on the bottom region of the touch sensitive display results in displaying the control center user interface. In some embodiments, such hard presses display their resulting system user interfaces without waiting for the touch-and-hold time threshold to be satisfied. The above-described manner of displaying the system user interface allows the electronic device to provide the user more expedient access to the system user interface and easier control of the device (e.g., without the need to first wait for the system user interface indication), which simplifies the interaction between the user and the device and enhances the operability of the device and makes the user-device interface more efficient (e.g., by performing actions with fewer inputs and without exiting the displayed app user interface), which additionally, reduces power usage and improves battery life of the device by enabling the user to use the device more quickly and efficiently.

In some embodiments, such as in FIGS. 6PP and 6QQ, in response to receiving the touch input (790) and in accordance with a determination that the touch input does not satisfy the first criteria or the second criteria because the contact is detected outside of the predefined region of the touch-sensitive surface, and that the intensity of the contact exceeds the intensity threshold, the electronic device displays (792), on the display, a second user interface, not the first system user interface, associated with the first user interface. In other words, in some embodiments, such as in FIGS. 6PP and 6QQ, if a hard press is detected in the center region (e.g., outside 616 and 618) of the touch sensitive surface (e.g., 604) while the electronic device is displaying a watch face user interface (e.g., 602), the hard press (e.g., 606) is neither a touch and hold input (thus failing to satisfy the criteria associated with detecting a touch and hold input) nor detected in the predefined region on the touch sensitive surface (thus failing to satisfy the criteria associated with detecting a input in the predefined region). As a result, the electronic device optionally displays a watch face editing user interface (e.g., a user interface that allows the user to scroll through watch faces and/or edit those watch faces). The above-described manner of interacting with the watch face user interface allows the user easier access and reconfiguration of different watch face user interfaces, simplifies the interaction between the user and the device and enhances the operability of the device and makes the user-device interface more efficient (e.g., by performing actions with fewer inputs and without exiting the displayed app user interface), which additionally, reduces power usage and improves battery life of the device by enabling the user to use the device more quickly and efficiently.

In some embodiments, such as in FIG. 6LL, in response to receiving the touch input and in accordance with the determination that the touch input satisfies the second criteria, the electronic device generates (794), at the electronic device, a tactile output corresponding to the intensity of the contact increasing above the intensity threshold. In other words, in some embodiments, such as in FIG. 6LL, receiving a hard press instead of a touch and hold input (e.g., 606) in the predefined regions (e.g., 616 or 618) of the touch sensitive surface that results in displaying the full first system user interface (e.g., 614) also results in the electronic device generating a tactile feedback, such as a vibration of the electronic device, when the intensity of the contact reaches the intensity threshold (e.g., 622) and the full first system user interface is displayed, as shown in Fig. MM. The above-described manner of providing tactile feedback to the user allows the electronic device to provide additional user feedback, assuring a user that an intended input to the electronic device was accomplished, thereby reducing cognitive load associated with interacting with the device, which makes the user-device interface more efficient, which further reduces power usage and improves battery life of the device by enabling the user to use the device more quickly and efficiently. Additionally, the tactile feedback increases accessibility of the electronic device by users with certain physical (e.g., audio-visual) impairments.

It should be understood that the particular order in which the operations in FIGS. 7A-7H have been described is merely exemplary and is not intended to indicate that the described order is the only order in which the operations could be performed. One of ordinary skill in the art would recognize various ways to reorder the operations described herein. The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7H are, optionally, implemented by components depicted in FIGS. 1A-1B. For example, displaying operations 702, 708 and 710, and receiving operation 704 are, optionally, implemented by event sorter 170, event recognizer 180, and event handler 190. Event monitor 171 in event sorter 170 detects a contact on touch screen 604, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to improve the delivery to users of invitational content or any other content (e.g., health and fitness related content) that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of health or fitness-related services, the present technology can be configured to allow users to select to "opt in" or "opt out" of participation in the collection of personal information data during registration for services or anytime thereafter. In another example, users can select not to provide health-associated data for targeted content delivery services. In yet another example, users can select to limit the length of time health-associated data is maintained or entirely prohibit the development of a baseline health or fitness profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and a touch-sensitive surface:
displaying, on the display, a user interface that includes a respective user interface element;
while displaying the user interface on the display, receiving a touch input comprising a contact detected on the touch-sensitive surface; and
in response to receiving the touch input:
in accordance with a determination that the touch input satisfies first criteria, wherein the first criteria include a requirement that the contact continues to be detected in a predefined region of the touch-sensitive surface for longer than a time threshold, displaying, on the display, a first indication that further input of a first type detected at the touch sensitive surface will cause the device to display a first system user interface; and
in accordance with a determination that the touch input does not satisfy the first criteria because the contact did not continue to be detected for longer than the time threshold, performing an operation in the user interface, including interacting with the respective user interface element displayed in the user interface, in accordance with the touch input without displaying, on the display, the first indication.

2. The method in claim 1, wherein the electronic device displays the first indication in accordance with the determination that the touch input satisfies the first criteria regardless of whether the user interface is an application user interface or a wake screen of the electronic device.

3. The method in claim 1, wherein the first type of further input is a swipe input, the method further comprising:
while displaying the first indication, receiving a further input comprising the swipe input detected on the touch-sensitive surface; and
in response to receiving the further input, displaying, on the display, the first system user interface.

4. The method in claim 1, wherein the first system user interface comprises one or more system affordances for controlling one or more functions of the electronic device.

5. The method in claim 1, wherein the first system user interface comprises one or more representations of one or more notifications at the electronic device.

6. The method in claim 4, further comprising:
while displaying the first system user interface with the one or more system affordances, receiving a second touch input comprising a second contact detected on the touch-sensitive surface; and
in response to receiving the second touch input:
in accordance with a determination that the second touch input satisfies second criteria, operating the first system user interface in a reconfiguration mode in which the one or more system affordances are repositionable relative to other system affordances;
in accordance with a determination that the second touch input does not satisfy the second criteria, operating the first system user interface in a standard mode in which the one or more system affordances are not repositionable relative to other system affordances.

7. The method in claim 1, further comprising in response to receiving the touch input and in accordance with the determination that the touch input does not satisfy the first criteria:
in accordance with the user interface being an application user interface, performing an operation in the application user interface in accordance with the touch input; and
in accordance with the user interface being a wake screen user interface:
in accordance with a determination that the touch input includes a swipe input, displaying, on the display, the first system user interface; and
in accordance with a determination that the touch input does not include a swipe input, performing an operation in the wake screen user interface in accordance with the input.

8. The method in claim 7, further comprising in response to receiving the touch input and in accordance with the determination that the user interface is the wake screen user interface and that the touch input does not include a swipe input:
in accordance with a determination that the touch input is a tap input, performing an operation in the wake screen user interface in accordance with the tap input.

9. The method in claim 7, further comprising in response to receiving the touch input and in accordance with the determination that the user interface is an application user interface:
in accordance with a determination that the touch input is a tap input, performing an operation in the application user interface in accordance with the tap input.

10. The method in claim 1, further comprising:
while displaying the first indication that further input of the first type detected at the touch sensitive surface will cause the device to display the first system user interface, detecting liftoff of the contact from the touch-sensitive surface; and
in response to detecting the liftoff of the contact, ceasing displaying the first indication without performing an operation in the user interface.

11. The method in claim 1, further comprising in accordance with the determination that the touch input satisfies the first criteria, generating, at the electronic device, a tactile output corresponding to the touch input satisfying the first criteria.

12. The method in claim 1, wherein the predefined region of the touch-sensitive surface comprises a top region or a bottom region of the touch sensitive surface.

13. The method in claim 12, wherein the top region of the touch sensitive surface is larger than the bottom region of the touch sensitive surface.

14. The method in claim 12, wherein:
in accordance with a determination that the electronic device is configured for operating on a first hand of a user, the top region of the touch-sensitive surface is located at a first position on the electronic device and the bottom region of the touch-sensitive surface is located at a second position on the electronic device, and
in accordance with a determination that the electronic device is configured for operating on a second hand of the user, different than the first hand, the top region of the touch-sensitive surface is located at the second position on the electronic device and the bottom region of the touch-sensitive surface is located at the first position on the electronic device.

15. The method in claim 12, wherein:
in accordance with a determination that the contact is detected in the bottom region of the touch-sensitive surface, the first system user interface comprises one or more system affordances for controlling one or more functions of the electronic device, and
in accordance with a determination that the contact is detected in the top region of the touch-sensitive surface, the first system user interface comprises one or more representations of one or more notifications at the electronic device.

16. The method in claim 12, further comprising in accordance with the determination that the touch input does not satisfy the first criteria because the contact was detected outside of the top and bottom regions of the touch-sensitive surface, performing an operation in the user interface in accordance with the touch input.

17. The method in claim 12, further comprising:
while displaying the user interface on the display, receiving, via the touch-sensitive surface, an indication of an object detected near the touch-sensitive surface but not on the touch-sensitive surface; and
in response to receiving the indication of the object and in accordance with a determination that the object satisfies second criteria, wherein the second criteria include a requirement that the object continues to be detected near the top or bottom regions of the touch-sensitive surface, but not on the touch-sensitive surface, for longer than the time threshold, displaying, on the display, the first indication that further input of the first type detected at the touch sensitive surface will cause the device to display the first system user interface.

18. The method in claim 1, further comprising in response to receiving the touch input and in accordance with the determination that the touch input satisfies the first criteria, obscuring display of the user interface.

19. The method in claim 1, wherein the first type of further input comprises an increase in an intensity of the contact above an intensity threshold, the method further comprising:
while displaying the first indication, receiving a further input comprising the increase of the intensity of the contact above the intensity threshold; and
in response to receiving the further input, displaying, on the display, the first system user interface.

20. The method in claim 19, further comprising:
in accordance with the determination that the touch input satisfies the first criteria, generating, at the electronic device, a first tactile output corresponding to the touch input satisfying the first criteria; and
in response to receiving the further input, generating, at the electronic device, a second tactile output corresponding to the intensity of the contact increasing above the intensity threshold.

21. The method in claim 1, further comprising in response to receiving the touch input:
in accordance with a determination that the touch input satisfies second criteria, wherein the second criteria include a requirement that the contact is detected in the predefined region of the touch-sensitive surface and that an intensity of the contact exceeds an intensity threshold before the time threshold in order for the second criteria to be met, displaying, on the display, the first system user interface without displaying the first indication that further input of the first type detected at the touch sensitive surface will cause the device to display the first system user interface.

22. The method in claim 21, further comprising, in response to receiving the touch input:
in accordance with a determination that the touch input does not satisfy the first criteria or the second criteria because the contact is detected outside of the predefined region of the touch-sensitive surface, and that the intensity of the contact exceeds the intensity threshold, displaying, on the display, a second user interface, not the first system user interface, associated with the first user interface.

23. The method in claim 21, further comprising in response to receiving the touch input and in accordance with the determination that the touch input satisfies the second criteria, generating, at the electronic device, a tactile output corresponding to the intensity of the contact increasing above the intensity threshold.

24. An electronic device, comprising:
one or more processors;
memory; and
one or more programs, wherein the one or more programs are stored in the memory and configured to be executed by the one or more processors, the one or more programs including instructions for:
displaying, on a display, a user interface that includes a respective user interface element;
while displaying the user interface on the display, receiving a touch input comprising a contact detected on a touch-sensitive surface; and
in response to receiving the touch input:
in accordance with a determination that the touch input satisfies first criteria, wherein the first criteria include a requirement that the contact continues to be detected in a predefined region of the touch-sensitive surface for longer than a time threshold, displaying, on the display, a first indication that further input of a first type detected at the touch sensitive surface will cause the device to display a first system user interface; and
in accordance with a determination that the touch input does not satisfy the first criteria because the contact did not continue to be detected for longer than the time threshold, performing an operation in the user interface including interacting with the respective user interface element displayed in the user interface in accordance with the touch input without displaying, on the display, the first indication.

25. A non-transitory computer readable storage medium storing one or more programs, the one or more programs comprising instructions, which when executed by one or more processors of an electronic device, cause the electronic device to:
display, on a display, a user interface that includes a respective user interface element;
while displaying the user interface on the display, receive a touch input comprising a contact detected on a touch-sensitive surface; and
in response to receiving the touch input:
in accordance with a determination that the touch input satisfies first criteria, wherein the first criteria include a requirement that the contact continues to be detected in a predefined region of the touch-sensitive surface for longer than a time threshold, display, on the display, a first indication that further input of a first type detected at the touch sensitive surface will cause the device to display a first system user interface; and
in accordance with a determination that the touch input does not satisfy the first criteria because the contact did not continue to be detected for longer than the time threshold, perform an operation in the user interface including interacting with the respective user interface element displayed in the user interface in accordance with the touch input without displaying, on the display, the first indication.

26. The electronic device in claim 24, wherein the electronic device displays the first indication in accordance with the determination that the touch input satisfies the first criteria regardless of whether the user interface is an application user interface or a wake screen of the electronic device.

27. The electronic device in claim 24, wherein the first type of further input is a swipe input, the one or more programs further including instructions for:
while displaying the first indication, receiving a further input comprising the swipe input detected on the touch-sensitive surface; and
in response to receiving the further input, displaying, on the display, the first system user interface.

28. The electronic device in claim 24, wherein the first system user interface comprises one or more system affordances for controlling one or more functions of the electronic device.

29. The electronic device in claim 24, wherein the first system user interface comprises one or more representations of one or more notifications at the electronic device.

30. The electronic device in claim 28, the one or more programs further including instructions for:
while displaying the first system user interface with the one or more system affordances, receiving a second touch input comprising a second contact detected on the touch-sensitive surface; and
in response to receiving the second touch input:
in accordance with a determination that the second touch input satisfies second criteria, operating the first system user interface in a reconfiguration mode in which the one or more system affordances are repositionable relative to other system affordances;
in accordance with a determination that the second touch input does not satisfy the second criteria, operating the first system user interface in a standard mode in which the one or more system affordances are not repositionable relative to other system affordances.

31. The electronic device in claim 24, the one or more programs further including instructions for in response to receiving the touch input and in accordance with the determination that the touch input does not satisfy the first criteria:
in accordance with the user interface being an application user interface, performing an operation in the application user interface in accordance with the touch input; and
in accordance with the user interface being a wake screen user interface:
in accordance with a determination that the touch input includes a swipe input, displaying, on the display, the first system user interface; and in accordance with a determination that the touch input does not include a swipe input, performing an operation in the wake screen user interface in accordance with the input.

32. The electronic device in claim 31, the one or more programs further including instructions for in response to receiving the touch input and in accordance with the determination that the user interface is the wake screen user interface and that the touch input does not include a swipe input:
 in accordance with a determination that the touch input is a tap input, performing an operation in the wake screen user interface in accordance with the tap input.

33. The electronic device in claim 31, the one or more programs further including instructions for in response to receiving the touch input and in accordance with the determination that the user interface is an application user interface:
 in accordance with a determination that the touch input is a tap input, performing an operation in the application user interface in accordance with the tap input.

34. The electronic device in claim 24, the one or more programs further including instructions for:
 while displaying the first indication that further input of the first type detected at the touch sensitive surface will cause the device to display the first system user interface, detecting liftoff of the contact from the touch-sensitive surface; and
 in response to detecting the liftoff of the contact, ceasing displaying the first indication without performing an operation in the user interface.

35. The electronic device in claim 24, the one or more programs further including instructions for in accordance with the determination that the touch input satisfies the first criteria, generating, at the electronic device, a tactile output corresponding to the touch input satisfying the first criteria.

36. The electronic device in claim 24, wherein the predefined region of the touch-sensitive surface comprises a top region or a bottom region of the touch sensitive surface.

37. The electronic device in claim 36, wherein the top region of the touch sensitive surface is larger than the bottom region of the touch sensitive surface.

38. The electronic device in claim 36, wherein:
 in accordance with a determination that the electronic device is configured for operating on a first hand of a user, the top region of the touch-sensitive surface is located at a first position on the electronic device and the bottom region of the touch-sensitive surface is located at a second position on the electronic device, and
 in accordance with a determination that the electronic device is configured for operating on a second hand of the user, different than the first hand, the top region of the touch-sensitive surface is located at the second position on the electronic device and the bottom region of the touch-sensitive surface is located at the first position on the electronic device.

39. The electronic device in claim 36, wherein:
 in accordance with a determination that the contact is detected in the bottom region of the touch-sensitive surface, the first system user interface comprises one or more system affordances for controlling one or more functions of the electronic device, and
 in accordance with a determination that the contact is detected in the top region of the touch-sensitive surface, the first system user interface comprises one or more representations of one or more notifications at the electronic device.

40. The electronic device in claim 36, the one or more programs further including instructions for in accordance with the determination that the touch input does not satisfy the first criteria because the contact was detected outside of the top and bottom regions of the touch-sensitive surface, performing an operation in the user interface in accordance with the touch input.

41. The electronic device in claim 36, the one or more programs further including instructions for:
 while displaying the user interface on the display, receiving, via the touch-sensitive surface, an indication of an object detected near the touch-sensitive surface but not on the touch-sensitive surface; and
 in response to receiving the indication of the object and in accordance with a determination that the object satisfies second criteria, wherein the second criteria include a requirement that the object continues to be detected near the top or bottom regions of the touch-sensitive surface, but not on the touch-sensitive surface, for longer than the time threshold, displaying, on the display, the first indication that further input of the first type detected at the touch sensitive surface will cause the device to display the first system user interface.

42. The electronic device in claim 24, the one or more programs further including instructions for in response to receiving the touch input and in accordance with the determination that the touch input satisfies the first criteria, obscuring display of the user interface.

43. The electronic device in claim 24, wherein the first type of further input comprises an increase in an intensity of the contact above an intensity threshold, the one or more programs further including instructions for:
 while displaying the first indication, receiving a further input comprising the increase of the intensity of the contact above the intensity threshold; and
 in response to receiving the further input, displaying, on the display, the first system user interface.

44. The electronic device in claim 43, the one or more programs further including instructions for:
 in accordance with the determination that the touch input satisfies the first criteria, generating, at the electronic device, a first tactile output corresponding to the touch input satisfying the first criteria; and
 in response to receiving the further input, generating, at the electronic device, a second tactile output corresponding to the intensity of the contact increasing above the intensity threshold.

45. The electronic device in claim 24, the one or more programs further including instructions for in response to receiving the touch input:
 in accordance with a determination that the touch input satisfies second criteria, wherein the second criteria include a requirement that the contact is detected in the predefined region of the touch-sensitive surface and that an intensity of the contact exceeds an intensity threshold before the time threshold in order for the second criteria to be met, displaying, on the display, the first system user interface without displaying the first indication that further input of the first type detected at the touch sensitive surface will cause the device to display the first system user interface.

46. The electronic device in claim 45, the one or more programs further including instructions for, in response to receiving the touch input:

in accordance with a determination that the touch input does not satisfy the first criteria or the second criteria because the contact is detected outside of the predefined region of the touch-sensitive surface, and that the intensity of the contact exceeds the intensity threshold, displaying, on the display, a second user interface, not the first system user interface, associated with the user interface.

47. The electronic device in claim 45, the one or more programs further including instructions for in response to receiving the touch input and in accordance with the determination that the touch input satisfies the second criteria, generating, at the electronic device, a tactile output corresponding to the intensity of the contact increasing above the intensity threshold.

48. The electronic device in claim 24, wherein the electronic device displays the first indication in accordance with the determination that the touch input satisfies the first criteria regardless of whether the user interface is an application user interface or a wake screen of the electronic device.

49. The non-transitory computer readable storage medium in claim 25, wherein the first type of further input is a swipe input, the one or more programs further including instructions that, when executed by the one or more processors of the electronic device, cause the electronic device to perform:
while displaying the first indication, receiving a further input comprising the swipe input detected on the touch-sensitive surface; and
in response to receiving the further input, displaying, on the display, the first system user interface.

50. The non-transitory computer readable storage medium in claim 25, wherein the first system user interface comprises one or more system affordances for controlling one or more functions of the electronic device.

51. The non-transitory computer readable storage medium in claim 25, wherein the first system user interface comprises one or more representations of one or more notifications at the electronic device.

52. The non-transitory computer readable storage medium in claim 50, the one or more programs further including instructions that, when executed by the one or more processors of the electronic device, cause the electronic device to perform:
while displaying the first system user interface with the one or more system affordances, receiving a second touch input comprising a second contact detected on the touch-sensitive surface; and
in response to receiving the second touch input:
in accordance with a determination that the second touch input satisfies second criteria, operating the first system user interface in a reconfiguration mode in which the one or more system affordances are repositionable relative to other system affordances;
in accordance with a determination that the second touch input does not satisfy the second criteria, operating the first system user interface in a standard mode in which the one or more system affordances are not repositionable relative to other system affordances.

53. The non-transitory computer readable storage medium in claim 25, the one or more programs further including instructions that, when executed by the one or more processors of the electronic device, cause the electronic device to perform in response to receiving the touch input and in accordance with the determination that the touch input does not satisfy the first criteria:
in accordance with the user interface being an application user interface, performing an operation in the application user interface in accordance with the touch input; and
in accordance with the user interface being a wake screen user interface:
in accordance with a determination that the touch input includes a swipe input, displaying, on the display, the first system user interface; and
in accordance with a determination that the touch input does not include a swipe input, performing an operation in the wake screen user interface in accordance with the input.

54. The non-transitory computer readable storage medium in claim 53, the one or more programs further including instructions that, when executed by the one or more processors of the electronic device, cause the electronic device to perform in response to receiving the touch input and in accordance with the determination that the user interface is the wake screen user interface and that the touch input does not include a swipe input:
in accordance with a determination that the touch input is a tap input, performing an operation in the wake screen user interface in accordance with the tap input.

55. The non-transitory computer readable storage medium in claim 53, the one or more programs further including instructions that, when executed by the one or more processors of the electronic device, cause the electronic device to perform in response to receiving the touch input and in accordance with the determination that the user interface is an application user interface:
in accordance with a determination that the touch input is a tap input, performing an operation in the application user interface in accordance with the tap input.

56. The non-transitory computer readable storage medium in claim 25, the one or more programs further including instructions that, when executed by the one or more processors of the electronic device, cause the electronic device to perform:
while displaying the first indication that further input of the first type detected at the touch sensitive surface will cause the device to display the first system user interface, detecting liftoff of the contact from the touch-sensitive surface; and
in response to detecting the liftoff of the contact, ceasing displaying the first indication without performing an operation in the user interface.

57. The non-transitory computer readable storage medium in claim 25, the one or more programs further including instructions that, when executed by the one or more processors of the electronic device, cause the electronic device to perform in accordance with the determination that the touch input satisfies the first criteria, generating, at the electronic device, a tactile output corresponding to the touch input satisfying the first criteria.

58. The non-transitory computer readable storage medium in claim 25, wherein the predefined region of the touch-sensitive surface comprises a top region or a bottom region of the touch sensitive surface.

59. The non-transitory computer readable storage medium in claim 58, wherein the top region of the touch sensitive surface is larger than the bottom region of the touch sensitive surface.

60. The non-transitory computer readable storage medium in claim 58, wherein:
in accordance with a determination that the electronic device is configured for operating on a first hand of a user, the top region of the touch-sensitive surface is located at a first position on the electronic device and the bottom region of the touch-sensitive surface is located at a second position on the electronic device, and in accordance with a determination that the electronic device is configured for operating on a second hand of the user, different than the first hand, the top region of the touch-sensitive surface is located at the second position on the electronic device and the bottom region of the touch-sensitive surface is located at the first position on the electronic device.

61. The non-transitory computer readable storage medium in claim 58, wherein:

in accordance with a determination that the contact is detected in the bottom region of the touch-sensitive surface, the first system user interface comprises one or more system affordances for controlling one or more functions of the electronic device, and in accordance with a determination that the contact is detected in the top region of the touch-sensitive surface, the first system user interface comprises one or more representations of one or more notifications at the electronic device.

62. The non-transitory computer readable storage medium in claim 58, the one or more programs further including instructions that, when executed by the one or more processors of the electronic device, cause the electronic device to perform in accordance with the determination that the touch input does not satisfy the first criteria because the contact was detected outside of the top and bottom regions of the touch-sensitive surface, performing an operation in the user interface in accordance with the touch input.

63. The non-transitory computer readable storage medium in claim 58, the one or more programs further including instructions that, when executed by the one or more processors of the electronic device, cause the electronic device to perform:

while displaying the user interface on the display, receiving, via the touch-sensitive surface, an indication of an object detected near the touch-sensitive surface but not on the touch-sensitive surface; and in response to receiving the indication of the object and in accordance with a determination that the object satisfies second criteria, wherein the second criteria include a requirement that the object continues to be detected near the top or bottom regions of the touch-sensitive surface, but not on the touch-sensitive surface, for longer than the time threshold, displaying, on the display, the first indication that further input of the first type detected at the touch sensitive surface will cause the device to display the first system user interface.

64. The non-transitory computer readable storage medium in claim 25, the one or more programs further including instructions that, when executed by the one or more processors of the electronic device, cause the electronic device to perform in response to receiving the touch input and in accordance with the determination that the touch input satisfies the first criteria, obscuring display of the user interface.

65. The non-transitory computer readable storage medium in claim 25, wherein the first type of further input comprises an increase in an intensity of the contact above an intensity threshold, the one or more programs further including instructions that, when executed by the one or more processors of the electronic device, cause the electronic device to perform:

while displaying the first indication, receiving a further input comprising the increase of the intensity of the contact above the intensity threshold; and in response to receiving the further input, displaying, on the display, the first system user interface.

66. The non-transitory computer readable storage medium in claim 65, the one or more programs further including instructions that, when executed by the one or more processors of the electronic device, cause the electronic device to perform:

in accordance with the determination that the touch input satisfies the first criteria, generating, at the electronic device, a first tactile output corresponding to the touch input satisfying the first criteria; and in response to receiving the further input, generating, at the electronic device, a second tactile output corresponding to the intensity of the contact increasing above the intensity threshold.

67. The non-transitory computer readable storage medium in claim 25, the one or more programs further including instructions that, when executed by the one or more processors of the electronic device, cause the electronic device to perform in response to receiving the touch input:

in accordance with a determination that the touch input satisfies second criteria, wherein the second criteria include a requirement that the contact is detected in the predefined region of the touch-sensitive surface and that an intensity of the contact exceeds an intensity threshold before the time threshold in order for the second criteria to be met, displaying, on the display, the first system user interface without displaying the first indication that further input of the first type detected at the touch sensitive surface will cause the device to display the first system user interface.

68. The non-transitory computer readable storage medium in claim 67, the one or more programs further including instructions that, when executed by the one or more processors of the electronic device, cause the electronic device to perform, in response to receiving the touch input:

in accordance with a determination that the touch input does not satisfy the first criteria or the second criteria because the contact is detected outside of the predefined region of the touch-sensitive surface, and that the intensity of the contact exceeds the intensity threshold, displaying, on the display, a second user interface, not the first system user interface, associated with the user interface.

69. The non-transitory computer readable storage medium in claim 67, the one or more programs further including instructions that, when executed by the one or more processors of the electronic device, cause the electronic device to perform in response to receiving the touch input and in accordance with the determination that the touch input satisfies the second criteria, generating, at the electronic device, a tactile output corresponding to the intensity of the contact increasing above the intensity threshold.

\* \* \* \* \*